US011852505B2

(12) United States Patent
Brown et al.

(10) Patent No.: US 11,852,505 B2
(45) Date of Patent: Dec. 26, 2023

(54) CRITICAL ENVIRONMENT MONITORING SYSTEM

(71) Applicant: Johnson Controls Tyco IP Holdings LLP, Milwaukee, WI (US)

(72) Inventors: Julie J. Brown, Yardley, PA (US); Renee R. Jacobs, Leawood, KS (US); Fawn R. Staerkel, Phoenix, AZ (US); Rachel D. M. Ellerman, Shorewood, WI (US); Tyler Brown, Milford, CT (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/408,014

(22) Filed: Aug. 20, 2021

(65) Prior Publication Data

US 2021/0381861 A1 Dec. 9, 2021

Related U.S. Application Data

(63) Continuation-in-part of application No. 17/024,376, filed on Sep. 17, 2020, now Pat. No. 11,698,205, and (Continued)

(51) Int. Cl.
*G08B 21/18* (2006.01)
*G01D 21/02* (2006.01)
(Continued)

(52) U.S. Cl.
CPC ........... *G01D 21/02* (2013.01); *G08B 21/182* (2013.01); *G08B 21/22* (2013.01); *G08B 21/245* (2013.01)

(58) Field of Classification Search
CPC . F24F 11/38; F24F 11/30; F24F 11/64; G08B 21/182

See application file for complete search history.

(56) References Cited

U.S. PATENT DOCUMENTS 6,711,470 B1 3/2004 Hartenstein et al.
6,968,294 B2 11/2005 Gutta et al.
(Continued)

FOREIGN PATENT DOCUMENTS

CA 2957726 A1 3/2016
CA 3043996 A1 2/2018
(Continued)

OTHER PUBLICATIONS

International Search Report and Written on PCT/US2020/051302, dated Mar. 5, 2021,28 pages.
(Continued)

*Primary Examiner* — Mohammad Ali
*Assistant Examiner* — Vincent W Chang
(74) *Attorney, Agent, or Firm* — Foley & Lardner LLP

(57) ABSTRACT

A critical environment monitoring system including a sensor array structured to provide sensor data indicative of temperature, pressure, and humidity in an interior space, and one or more processing circuits comprising one or more memory devices coupled to one or more processors that provides a graphical user interface displaying a compliance standard temperature received from a standard setting body and a temperature value, a compliance standard pressure received from the standard setting body and a pressure value, and a compliance standard humidity received from the standard setting body and a humidity value. The processing circuit also generates an alert in response to one of the temperature value being outside the compliance standard temperature, the pressure value being outside the compliance standard pressure, or the humidity value being outside the compliance standard humidity, records criticality information, and receives a log of actions taken.

18 Claims, 29 Drawing Sheets

Related U.S. Application Data a continuation-in-part of application No. 17/024,404, filed on Sep. 17, 2020, and a continuation-in-part of application No. PCT/US2020/051302, filed on Sep. 17, 2020, and a continuation-in-part of application No. 17/024,387, filed on Sep. 17, 2020.

(60) Provisional application No. 62/902,338, filed on Sep. 18, 2019.

(51) Int. Cl.
*G08B 21/22* (2006.01)
*G08B 21/24* (2006.01)

(56) References Cited

U.S. PATENT DOCUMENTS

| | | | |
|---|---|---|---|
| 7,069,333 B1 | 6/2006 | Morris et al. | |
| 8,727,981 B2 | 5/2014 | Bechtel et al. | |
| 9,105,071 B2 | 8/2015 | Fletcher et al. | |
| 9,189,750 B1 | 11/2015 | Narsky | |
| 9,447,985 B2 | 9/2016 | Johnson | |
| 9,644,857 B1 | 5/2017 | Ashgriz et al. | |
| 9,817,383 B1* | 11/2017 | Sinha | G05B 15/02 |
| 10,037,821 B2 | 7/2018 | Johnson et al. | |
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 2002/0138327 A1 | 9/2002 | Mello et al. | |
| 2004/0111313 A1 | 6/2004 | Ingman | |
| 2004/0260594 A1 | 12/2004 | Maddox, Jr. | |
| 2007/0225849 A1 | 9/2007 | Norbeck | |
| 2008/0033674 A1 | 2/2008 | Nikovski et al. | |
| 2009/0150022 A1 | 6/2009 | McMillin et al. | |
| 2010/0107070 A1 | 4/2010 | Devineni et al. | |
| 2010/0114385 A1 | 5/2010 | Dempster et al. | |
| 2010/0286937 A1 | 11/2010 | Hedley et al. | |
| 2011/0088000 A1 | 4/2011 | Mackay | |
| 2011/0112854 A1 | 5/2011 | Koch et al. | |
| 2011/0178977 A1 | 7/2011 | Drees | |
| 2011/0279861 A1 | 11/2011 | Scheller | |
| 2012/0185728 A1 | 7/2012 | Guo et al. | |
| 2013/0231792 A1 | 9/2013 | Ji et al. | |
| 2014/0052644 A1 | 2/2014 | Ott | |
| 2014/0074730 A1 | 3/2014 | Arensmeier et al. | |
| 2014/0156085 A1 | 6/2014 | Modi et al. | |
| 2014/0172479 A1 | 6/2014 | Gallagher et al. | |
| 2014/0297229 A1* | 10/2014 | Izumo | G01G 23/48 702/189 |
| 2015/0041550 A1 | 2/2015 | Honda | |
| 2015/0056909 A1* | 2/2015 | Chien | F24F 11/30 454/187 |
| 2015/0178865 A1 | 6/2015 | Anderson et al. | |
| 2015/0261229 A1 | 9/2015 | Roy | |
| 2015/0269641 A1 | 9/2015 | Roy | |
| 2015/0332007 A1 | 11/2015 | Rosebraugh | |
| 2016/0054018 A1 | 2/2016 | Motodani et al. | |
| 2016/0066068 A1* | 3/2016 | Schultz | F24F 11/30 340/870.07 |
| 2016/0117646 A1 | 4/2016 | Lerick et al. | |
| 2016/0203036 A1 | 7/2016 | Mezic et al. | |
| 2016/0216721 A1 | 7/2016 | Michalski et al. | |
| 2016/0247168 A1* | 8/2016 | Pappalardo | G06F 16/29 |
| 2016/0335731 A1* | 11/2016 | Hall | H04L 67/01 |
| 2017/0011318 A1 | 1/2017 | Vigano et al. | |
| 2017/0038945 A1* | 2/2017 | Beaulieu | F24F 11/30 |
| 2017/0364870 A1 | 12/2017 | Merg et al. | |
| 2018/0087970 A1* | 3/2018 | Schechter | G01K 1/024 |
| 2018/0100663 A1 | 4/2018 | Crimins et al. | |
| 2018/0107990 A1 | 4/2018 | Beadles | |
| 2018/0195752 A1* | 7/2018 | Sasaki | F24F 11/80 |
| 2018/0299840 A1 | 10/2018 | Sinha et al. | |
| 2018/0365621 A1 | 12/2018 | Merg et al. | |
| 2019/0025809 A1 | 1/2019 | Bhattacharya et al. | |
| 2019/0041882 A1 | 2/2019 | Noboa et al. | |
| 2019/0156298 A1 | 5/2019 | Ethington et al. | |
| 2019/0170603 A1 | 6/2019 | Gupte et al. | |
| 2019/0186766 A1* | 6/2019 | Maslekar | F24F 11/61 |
| 2019/0346417 A1 | 11/2019 | Benefield | |
| 2019/0360716 A1 | 11/2019 | Ozaki | |
| 2019/0385025 A1 | 12/2019 | McMichael et al. | |
| 2020/0041161 A1 | 2/2020 | Murakami et al. | |
| 2020/0132327 A1 | 4/2020 | Samuni et al. | |
| 2020/0227159 A1* | 7/2020 | Boisvert | G16H 40/20 |
| 2020/0240662 A1 | 7/2020 | Picardi et al. | |
| 2020/0348038 A1 | 11/2020 | Risbeck et al. | |
| 2020/0377197 A1 | 12/2020 | Ramaswamy et al. | |
| 2020/0387802 A1 | 12/2020 | Wandall | |
| 2020/0393181 A1 | 12/2020 | Yang et al. | |
| 2021/0003308 A1 | 1/2021 | Venne | |
| 2021/0010693 A1 | 1/2021 | Gamroth et al. | |
| 2021/0010701 A1 | 1/2021 | Nesler et al. | |
| 2021/0011443 A1 | 1/2021 | McNamara et al. | |
| 2021/0011444 A1 | 1/2021 | Risbeck et al. | |
| 2021/0025809 A1* | 1/2021 | Munn | G01N 17/004 |
| 2021/0193309 A1 | 6/2021 | Boisvert et al. | |
| 2021/0373519 A1 | 12/2021 | Risbeck et al. | |
| 2021/0390804 A1 | 12/2021 | Rajamanickam et al. | |
| 2021/0390807 A1 | 12/2021 | Chaurasia et al. | |
| 2021/0390812 A1 | 12/2021 | Chaurasia et al. | |
| 2021/0391089 A1 | 12/2021 | Eswara et al. | |
| 2021/0394112 A1 | 12/2021 | Isobe et al. | |
| 2021/0398659 A1 | 12/2021 | Sharma et al. | |
| 2021/0398690 A1 | 12/2021 | Gibson et al. | |
| 2021/0398691 A1 | 12/2021 | Dhamija et al. | |
| 2022/0060856 A1 | 2/2022 | Wellig et al. | |
| 2022/0102007 A1 | 3/2022 | Palanivel et al. | |
| 2022/0203287 A1 | 6/2022 | Wenger et al. | |
| 2022/0203288 A1 | 6/2022 | Wenger et al. | |
| 2022/0205962 A1 | 6/2022 | Vanderkoy | |
| 2022/0207215 A1 | 6/2022 | Liu et al. | |
| 2022/0254483 A1 | 8/2022 | Boisvert et al. | |
| 2022/0277851 A1 | 9/2022 | Wellig | |
| 2022/0282886 A1 | 9/2022 | Hriljac et al. | |
| 2022/0305438 A1 | 9/2022 | Wenger et al. | |
| 2022/0305881 A1 | 9/2022 | Neu et al. | |
| 2022/0373209 A1 | 11/2022 | Ko | |
| 2022/0404056 A1 | 12/2022 | Bloemer et al. | |

FOREIGN PATENT DOCUMENTS

| | | |
|---|---|---|
| CN | 112639633 A | 4/2021 |
| EP | 3 186 687 A4 | 7/2017 |
| EP | 3 497 377 A1 | 6/2019 |
| WO | WO-2021/258116 A1 | 12/2021 |

OTHER PUBLICATIONS

Mei et al., "Model predictive control for optimizing indoor air temperature and hum?ty in a direct expansion air conditioning system," The 27th Chinese Control and Decision Conference, Qingdao, 2015, pp. 2491-2496.

Mirakhorli et al., "Occupancy behavior based model predictive control for building indoor climate—A critical review," Energy and Buildings, vol. 129, 2016, pp. 499-513.

Oldewurtel et al., "Energy Efficient Building Climate Control using Stochastic Model Predictive Control and Weather Predictions," 2010 American Control Conference, Baltimore, MD, USA, Jun. 30-Jul. 2, 2010, pp. 5100-5105.

Parisio et al., "A scenario-based predictive control approach to building HVAC management systems," 2013 IEEE International Conference on Automation Science and Engineering (CASE), Madison, WI, USA, 2013, pp. 428-435.

Kelly et al., "Detecting Faults in Building Air Handling Units—A Background Study for Developing Intelligent Agents for Optimizing Building HVAC Systems" (https://nvlpubs.nist.gov/nistpubs/TechnicalNotes/N IST.TN .1831.pdf) 2014, (40 pages).

International Preliminary Report on Patentability PCT Appl. Ser. No. PCT/US2020/051302 dated Mar. 31, 2022 (20 pages).

(56) References Cited

OTHER PUBLICATIONS

Park Assist, "A comforting stress-free experience: For patients and visitors alike," https://www.parkassist.com/who-we-serve/healthcare/, retrieved from the internet May 12, 2022, (3 pages).

Park Assist, "Park Finder" https://www.parkassist.com/solutions-2/inx/inx-standard/park-finder/, retrieved from the internet May 12, 2022, (3 pages).

Pointr, "Indoor Navigation Guide visitors with personalised AR indoor navigation via Bluetooth beacons," https://www.pointr.tech/solutions/location-based-services/indoor-navigation, retrieved from the internet May 12, 2022, (13 pages).

Pointr, "Smart Hospital Solutions, Analytics & Software," https://www.pointr.tech/smart-hospital, retrieved from the internet May 12, 2022, (25 pages).

Tagnos, "Operational Intelligence: Patient, Staff & Equipment Dashboards," https://www.tagnos.com/tagnos-platform/operational-intelligence/, retrieved from the internet May 12, 2022, (3 pages).

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

\* cited by examiner

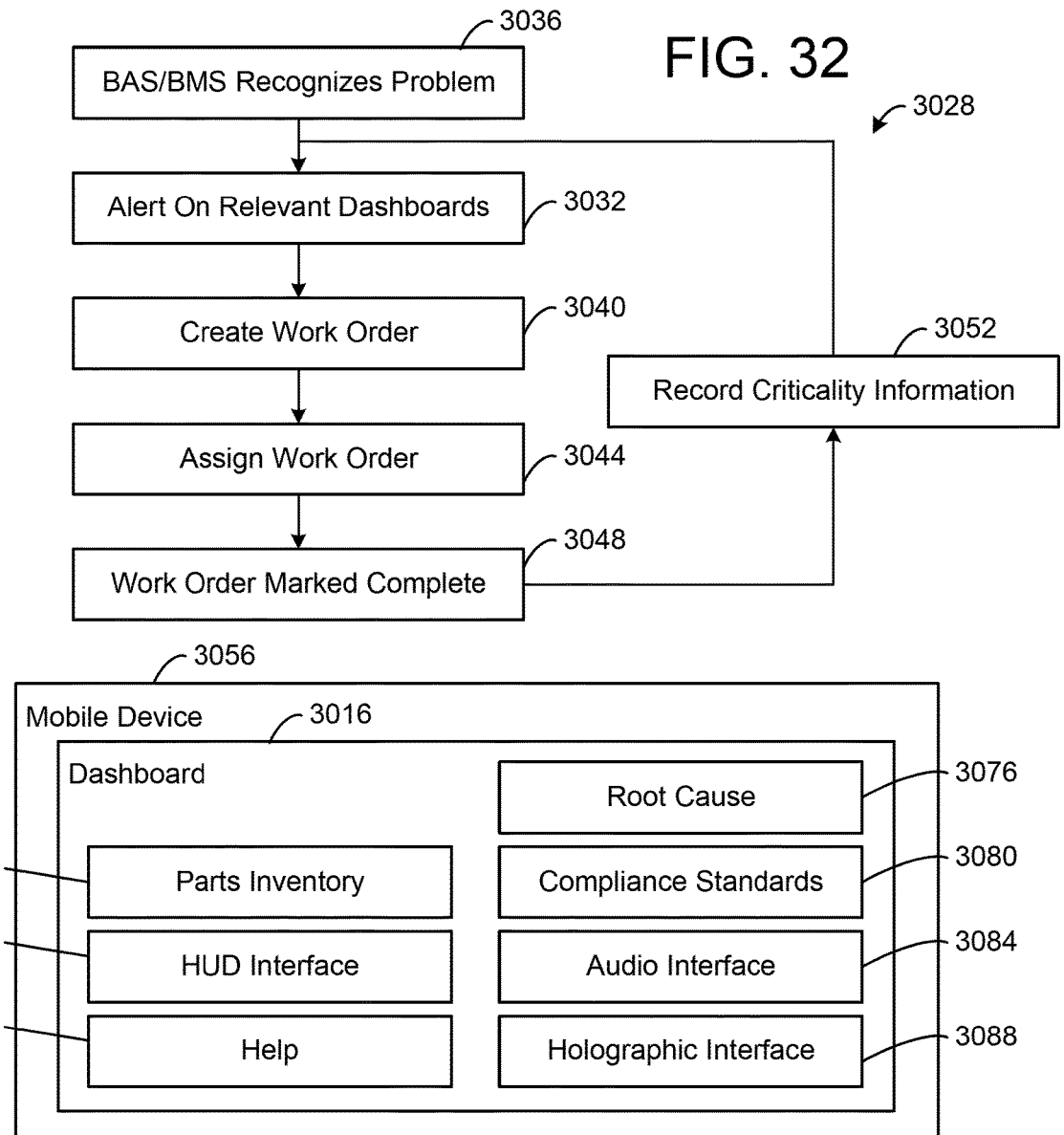

CRITICAL ENVIRONMENT MONITORING SYSTEM

CROSS-REFERENCE TO RELATED PATENT APPLICATIONS

The present application is a continuation-in-part of U.S. patent application Ser. No. 17/024,387 filed on Sep. 17, 2020, a continuation-in-part of U.S. patent application Ser. No. 17/024,404 filed on Sep. 17, 2020, a continuation-in-part of U.S. patent application Ser. No. 17/024,376 filed on Sep. 17, 2020, a continuation-in-part of P.C.T. Patent Application No. PCT/US2020/051302 filed on Sep. 17, 2020, all of which claim priority to and the benefit of U.S. Provisional Patent Application No. 62/902,338, filed Sep. 18, 2019. All are incorporated herein by reference in their entirety.

BACKGROUND

The present disclosure relates to systems and methods of controlling temperature, humidity, and pressure (TPH) within a room and/or a building. In some cases, TPH for a room and/or a building is monitored and checked for compliance with regulations or process controls. Regulations may include standards set by governmental or non-governmental entities and compliance may be checked by a compliance officer. Checks for compliance of TPH may be checked randomly or on a set routine or schedule and can affect the ability of the building to continue operation (e.g., an out of compliance hospital may be inhibited from providing patient care).

In some embodiments, particularly for a building that serves as a hospital, The Joint Commission (TJC) may administer the compliance checks. In some such embodiments, if the hospital building or a room within the building (e.g., a patient room, an operating room, etc.) is found to be out of compliance, a finding is identified and reported to the Centers for Medicare and Medicaid Services (CMS), who then perform an independent inspection of the building or room. A finding may impact the hospital's ratings, funding, etc., and correcting compliance issues may be expensive and time consuming. Over time, if a hospital regularly fails CMS inspections and/or multiple rooms or devices of the building are regularly non-compliant, a deemed status of the hospital may be lost. The loss of deemed status can result in the withholding of Medicare and/or Medicaid reimbursement to the hospital. In a hospital setting, response to issues affecting TPH in a timely manner is critical. A system for monitoring TPH and related factors could improve a hospital's ability to pass inspections and maintain a healthy environment for patient care.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One embodiment of the present disclosure is a critical environment monitoring system that includes a sensor array structured to provide sensor data indicative of temperature, pressure, and humidity in an interior space, and one or more processing circuits comprising one or more memory devices coupled to one or more processors. The one or more memory devices are configured to store instructions thereon that, when executed by the one or more processors, cause the one or more processors to: provide, based on the sensor data from the sensor array, a graphical user interface displaying: a compliance standard temperature received from a standard setting body and a temperature value based on the sensor data, a compliance standard pressure received from the standard setting body and a pressure value based on the sensor data, and a compliance standard humidity received from the standard setting body and a humidity value based on the sensor data; generate an alert in response to at least one of: the temperature value being outside the compliance standard temperature, the pressure value being outside the compliance standard pressure, or the humidity value being outside the compliance standard humidity; and record criticality information related to the generated alert.

In some embodiments, the one or more memory devices are further configured to store instructions thereon that, when executed by the one or more processors, cause the one or more processors to generate a compliance report document including the generated alert and criticality information related to the generated alert.

In some embodiments, the compliance report includes individual room based compliance information.

In some embodiments, the graphical user interface further displays a history of the compliance standard temperature, the temperature value, the compliance standard pressure, the pressure value, the compliance standard humidity, and the humidity value over time.

In some embodiments, the one or more memory devices are further configured to store instructions thereon that, when executed by the one or more processors, cause the one or more processors to: receive a compliance report format from the standard setting body; automatically identify the alert and associated criticality information; and automatically generate a compliance report using the compliance report format, and including the identified alert and associated criticality information.

In some embodiments, the one or more memory devices are further configured to store instructions thereon that, when executed by the one or more processors, cause the one or more processors to receive a log of actions taken in response to the generated alert, wherein the log of actions includes at least one of a time, a location, or a diagnostic information.

In some embodiments, the graphical user interface uses a color coding to identify compliance issues.

In some embodiments, the critical environment monitoring system further includes a wall mounted display panel or a mobile device, wherein the graphical user interface is presented using the wall mounted display panel of the mobile device.

In some embodiments, the sensor array includes an occupancy sensor and the alert is generated at least in part based on information received from the occupancy sensor.

Another embodiment of the present disclosure is a critical environment monitoring system that includes a sensor array structured to provide sensor data indicative of temperature, pressure, and humidity in an interior space, and a graphical user interface configured to display: a compliance standard temperature received from a standard setting body and a temperature value based on the sensor data, a compliance standard pressure received from the standard setting body and a pressure value based on the sensor data, and a compliance standard humidity received from the standard setting body and a humidity value based on the sensor data. The critical environment monitoring system is configured to generate an alert in response to one of: the temperature value being outside the compliance standard temperature, the pressure value being outside the compliance standard pressure, or the humidity value being outside the compliance standard humidity; and generate a compliance report document including the generated alert and criticality information related to the generated alert.

In some embodiments, the critical environment monitoring system is configured to receive a log of actions taken in response to the generated alert, and the log of actions includes at least one of a time, a location, or a diagnostic information.

In some embodiments, the critical environment monitoring system is configured to record criticality information related to the generated alert.

In some embodiments, the compliance report includes individual room based compliance information.

In some embodiments, the graphical user interface further displays a history of the compliance standard temperature, the temperature value, the compliance standard pressure, the pressure value, the compliance standard humidity, and the humidity value over time.

In some embodiments, the critical environment monitoring system is configured to receive a compliance report format from the standard setting body; automatically identify the alert and associated criticality information; and automatically generate a compliance report using the compliance report format, and including the identified alert and associated criticality information.

In some embodiments, the graphical user interface uses a color coding to identify compliance issues.

In some embodiments, the critical environment monitoring system further includes a wall mounted display panel or a mobile device, wherein the graphical user interface is presented using the wall mounted display panel of the mobile device.

In some embodiments, the sensor array includes an occupancy sensor and the alert is generated at least in part based on information received from the occupancy sensor.

Another embodiment of the present disclosure is a non-transitory computer-readable storage media having computer-executable instructions stored thereon that, when executed by one or more processors, cause the one or more processors to perform operations including: receiving sensor data from a sensor array; generating, based on the sensor data, a graphical user interface displaying: a compliance standard temperature received from a standard setting body and a temperature value based on the sensor data, a compliance standard pressure received from the standard setting body and a pressure value based on the sensor data, and a compliance standard humidity received from the standard setting body and a humidity value based on the sensor data; generating an alert in response to one of: the temperature value being outside the compliance standard temperature, the pressure value being outside the compliance standard pressure, or the humidity value being outside the compliance standard humidity, recording criticality information related to the generated alert; receiving a log of actions taken in response to the generated alert; and generating a compliance report document including the generated alert and criticality information related to the generated alert.

In some embodiments, receiving sensor data from the sensor array includes receiving occupancy sensor data and the alert is generated at least in part based on the occupancy sensor data.

Another embodiment of the present disclosure is a building management system (BMS). The BMS includes a sensor array structured to provide sensor data indicative of temperature, pressure, and humidity in an interior space and one or more memory devices having instructions stored thereon that, when executed by one or more processors, cause the one or more processors to perform operations including receiving the sensor data from the sensor array, generating, based on the sensor data, trend data indicative of the temperature, pressure, and humidity of the interior space over a period of time, generating, based on the trend data, a prediction of future trend data for the interior space, comparing at least one of the sensor data or the prediction to a compliance standard, and initiating an automated response process in response to a determining that at least one of the sensor data or the prediction does not meet the compliance standard.

In some embodiments, the operations further include determining a confidence level for the prediction, and comparing the confidence level to a predetermined threshold. In some embodiments, the automated response process is initiated when the confidence level is greater than or equal to the predetermined threshold.

In some embodiments, the operations further include generating a report summarizing the trend data and providing a time range when the sensor data is predicted to not meet the compliance standard.

In some embodiments, the automated response process includes controlling one or more primary building devices to affect at least one of the temperature, pressure, or humidity of the interior space based on the compliance standard.

In some embodiments, the automated response process includes generating a notification that indicates at least one building device associated with the at least one of the sensor data or the prediction that does not meet the compliance standard and transmitting the notification to a user device.

In some embodiments, the automated response process includes generating a work order for at least one building device associated with the at least one of the sensor data or the prediction that does not meet the compliance standard and transmitting the work order to at least one of a remote system or a user device.

In some embodiments, generating the prediction includes executing a predictive model to generate a first prediction of future trend data and determining, based on the first prediction of future trend data, a second prediction indicating a future compliance issue for a building device.

In some embodiments, the sensor data is first sensor data, the operations further include controlling one or more primary building devices based on at least one of the sensor data or the prediction, receiving second sensor data from the sensor array, comparing the second sensor data to the compliance standard to determine a reward value, and updating the predictive model based on the reward value.

In some embodiments, the operations further include training the predictive model using historical temperature, pressure, and humidity data for the interior space.

Another embodiment of the present disclosure is a method for maintaining compliance of building equipment. The method includes receiving sensor data from a sensor array located in an area of a building, generating, based on the sensor data, trend data indicative of the temperature, pressure, and humidity of the area over a period of time, generating, based on the trend data, a prediction of future trend data for the area, comparing at least one of the sensor data or the prediction to a compliance standard, and initiating an automated response process in response to a determining that at least one of the sensor data or the prediction does not meet the compliance standard. The automated response including a preemptive action that controls a heating, ventilation, or air conditioning system based on the trend data to maintain the temperature, pressure, and humidity within the compliance standard.

In some embodiments, the method further includes determining a confidence level for the prediction and comparing the confidence level to a predetermined threshold. In some embodiments, the automated response process is initiated when the confidence level is greater than or equal to the predetermined threshold.

In some embodiments, the method further includes generating a report summarizing the trend data and providing a time range when the sensor data is predicted to not meet the compliance standard.

In some embodiments, the automated response process includes controlling one or more primary building devices to affect at least one of the temperature, pressure, or humidity of the area based on the compliance standard.

In some embodiments, the automated response process includes generating a notification that indicates at least one building device associated with the at least one of the sensor data or the prediction that does not meet the compliance standard and transmitting the notification to a user device.

In some embodiments, the automated response process includes generating a work order for at least one building device associated with the at least one of the sensor data or the prediction that does not meet the compliance standard and transmitting the work order to at least one of a remote system or a user device.

In some embodiments, generating the prediction includes executing a predictive model to generate a first prediction of future trend data and determining, based on the first prediction of future trend data, a second prediction indicating a future compliance issue for a building device.

In some embodiments, the sensor data is first sensor data and the method further includes controlling one or more primary building devices based on at least one of the sensor data or the prediction, receiving second sensor data from the sensor array, comparing the second sensor data to the compliance standard to determine a reward value, and updating the predictive model based on the reward value.

In some embodiments, the method further includes training the predictive model using historical temperature, pressure, and humidity data for the area.

Yet another embodiment of the present disclosure is a non-transitory computer-readable storage media having computer-executable instructions stored thereon that, when executed by one or more processors, cause the one or more processors to perform operations that include receiving sensor information over time from a sensor array located in an interior space of a building, receiving operational parameters from one or more primary building devices, generating trend data indicative of the temperature, pressure, and humidity of the interior space over a period of time using a machine learning engine that receives the sensor information and the operational parameters, generating a future trend prediction of future trend data for the interior space using the machine learning engine, comparing the future trend prediction to a compliance standard, generating a predicted future compliance issue based on the comparison of the future trend prediction to the compliance standard, determining a confidence level for the predicted future compliance issue, and in response to a determination that the confidence level is greater than or equal to a predetermined threshold, initiating an automated response process.

In some embodiments, the automated response process includes at least one of transmitting a notification to a user device, generating a work order for one or more building devices associated with the predicted future compliance issue, or controlling the more or more building device to prevent the predicted future compliance issue.

Another embodiment is a building management system (BMS) for heating, ventilation, or air conditioning (HVAC) parameters in a building. The BMS includes one or more processing circuits including one or more memory devices coupled to one or more processors. The one or more memory devices store instructions thereon that, when executed by the one or more processors, cause the one or more processors to query a training data storage and receive training data, institute a policy with a machine learning engine and train the policy using the training data, receive temperature, pressure, and humidity (TPH) sensor data from one or more sensors, determine a fault based on the TPH sensor data, provide the TPH sensor data and the fault to the policy of the machine learning engine and output a corrective action to resolve the fault, generate a work order for a user based on the TPH sensor data, the determined fault, and the corrective action, and provide the work order to a user interface.

In some embodiments, the one or more memory devices store instructions thereon that, when executed by the one or more processors, cause the one or more processors to adjust HVAC building equipment based on the provided work order.

In some embodiments, the user interface includes a first user profile and a second user profile. In some embodiments, the one or more memory devices store instructions thereon that, when executed by the one or more processors, cause the one or more processors to generate a first dashboard associated with the first user profile and a second dashboard associated with the second user profile, provide a first subset of information from the work order to the first dashboard, and provide a second subset of information from the work order to the second dashboard.

In some embodiments, the one or more memory devices store instructions thereon that, when executed by the one or more processors, cause the one or more processors to update the second dashboard based on an action entered on the first dashboard.

In some embodiments, the work order is stored within the one or more memory devices. In some embodiments, the one or more memory devices store instructions thereon that, when executed by the one or more processors, cause the one or more processors to update the work order from either the first dashboard or the second dashboard.

In some embodiments, the one or more memory devices store instructions thereon that, when executed by the one or more processors, cause the one or more processors to assign the work order to the second dashboard from the first dashboard.

In some embodiments, the BMS system further includes an application structured to access one of the first user profile or the second user profile and display the associated dashboard on a human machine interface, the associated dashboard displaying at least one of the TPH sensor data or the work order.

In some embodiments, the human machine interface includes a mobile device, a wall mounted panel, a monitor, a tablet, a kiosk, an augmented reality device, a virtual reality device, or a wearable device.

In some embodiments, the one or more memory devices store instructions thereon that, when executed by the one or more processors, cause the one or more processors to retrieve a fault causation template, map a plurality of operational parameters relating to an associated HVAC device to the fault causation template, map the corrective action to the fault causation template, and provide a populated fault causation template to the user interface.

In some embodiments, the one or more memory devices store instructions thereon that, when executed by the one or more processors, cause the one or more processors to receive a notification that the work order has been completed, the notification including the determined fault and a fault solution, wherein the fault solution is either the corrective action or a different action, and train the policy with the machine learning engine by providing the determined fault and the fault solution to the machine learning engine.

In some embodiments, the machine learning engine includes at least one of a neural network, a reinforcement learning scheme, a model-based control scheme, a linear regression algorithm, a decision tree, a logistic regression algorithm, and a Naïve Bayes algorithm.

Another embodiment is a building management system (BMS) for heating, ventilation, or air conditioning (HVAC) parameters in a building. The BMS includes one or more processing circuits including one or more memory devices coupled to one or more processors. The one or more memory devices store instructions thereon that, when executed by the one or more processors, cause the one or more processors to receive temperature, pressure, and humidity (TPH) sensor data from one or more sensors, generate a work order using a machine learning engine that receives the TPH sensor data and fault information and outputs a recommended action, receive first credentials for a first user and grant access to a first user profile including a first dashboard including first information based at least in part on the TPH sensor data and the work order, receive second credentials for a second user and grant access to a second user profile including a second dashboard including second information based at least in part on the TPH sensor data and the work order, and provide communication between the first dashboard and the second dashboard.

In some embodiments, the first dashboard displays one or more customizable features to satisfy a first set of preferences of the first user and selectively displays the first information according to a type of the first user profile, the type of the first user profile indicating a first amount of detail regarding the TPH sensor data and the work order that can be provided to the first dashboard. In some embodiments, the second dashboard displays the customizable features to satisfy a second set of preferences of the second user and selectively displays the second information according to a type of the second user profile, the type of the second user profile indicating a second amount of detail regarding the TPH sensor data and the work order that can be provided to the second dashboard.

In some embodiments, the one or more memory devices store instructions thereon that, when executed by the one or more processors, cause the one or more processors to adjust HVAC building equipment based on the work order.

In some embodiments, providing communication between the first dashboard and the second dashboard includes at least one of updating the second dashboard based on an action entered on the first dashboard, updating the work order from either the first dashboard or the second dashboard, and assigning the work order to the second dashboard from the first dashboard.

In another embodiment, a building management system (BMS) for heating, ventilation, or air conditioning (HVAC) parameters in a building includes one or more processing circuits comprising one or more memory devices coupled to one or more processors, the one or more memory devices configured to store instructions thereon. When executed by the one or more processors, the instructions cause the one or more processors to: receive temperature, pressure, and humidity (TPH) sensor data from one or more sensors, receive a scheduling request for a building room via an application dashboard, the scheduling request including a reservation time, a reservation date, and requested TPH setpoints, receive a work order including a fault code affecting the availability of the building room, determine if the building room is unavailable based on the work order, determine a required time to achieve the requested TPH setpoints based on the scheduling request and the work order, provide the required time and a scheduling confirmation to the application dashboard, and adjust HVAC equipment in the building to achieve the TPH setpoints prior to the reservation date and time.

In some embodiments, determining a required time to adjust the requested TPH setpoints includes determining a set of preconditioning parameters to be implemented in the building room prior to the reservation date and time and determining the required time based on at least one of a time for preconditioning parameters to be performed and a time for TPH levels to adjust to the TPH setpoints.

In some embodiments, the preconditioning parameters include at least one of an ultra-violet (UV) soak system, a fumigation system, a sanitization system, an air removal system, and an air filtration system.

In some embodiments, the application dashboard includes a scheduling interface configured to receive the required time and the scheduling confirmation, adjust the required time to achieve the requested TPH setpoints, update at least one of the reservation time, the reservation date, and the request for the building room, and adjust the preconditioning parameters implemented.

In some embodiments, the one or more memory devices store instructions thereon that, when executed by the one or more processors, cause the one or more processors to determine that the required time to achieve the requested TPH setpoints prior to the reservation date and time creates a scheduling conflict within the BMS, update the application dashboard based on the scheduling conflict, and provide the application dashboard with at least one of a new reservation time and a new reservation date such that the HVAC equipment can be adjusted prior to the reservation date and time.

In some embodiments, the user is one of a chief compliance officer, a facilities manager, an operating room administrator, a health care professional or a facilities technician.

In some embodiments, the one or more memory devices store instructions thereon that, when executed by the one or more processors, cause the one or more processors to receive an indication that the work order has been completed and updating the user interface to indicate that the work order has been completed.

In some embodiments, generating the work order includes generating a set of data including the fault and at least one of the corrective action, a time of the fault, and a location of the fault.

In some embodiments, the one or more memory devices store instructions thereon that, when executed by the one or more processors, cause the one or more processors to provide assistance functionality to the user interface, receive a request for assistance from the user interface via the assistance functionality, and provide additional information related to the corrective action to the user interface.

In some embodiments, the one or more memory devices store instructions thereon that, when executed by the one or more processors, cause the one or more processors to provide an alert in the building in response to determining the fault, wherein the alert includes at least one of a visual alert, an audible alert, a fault indication, and corrective action indication.

In some embodiments, the first dashboard or the second dashboard or both are configured to operate within a heads up display (HUD), and provide a list of inventory parts currently available for addressing the work order.

In some embodiments, the first dashboard or the second dashboard or both are configured to display regulations and codes related to TPH compliance, display information related to an interrelation of TPH of one or more building zones in the building, and display the TPH sensor data and the work order at least in part with color-coded formatting to indicate an intensity of the work order.

In some embodiments, the first dashboard or the second dashboard or both includes at least one of an audio interface, a visual interface, a touch screen interface, and a holographic interface, and a visual indicator proximate to the first dashboard or the second dashboard or both configured to indicate a compliance level of the TPH sensor data.

Another embodiment of the present disclosure is a building management system (BMS) for monitoring and controlling heating, ventilation, or air conditioning (HVAC) parameters in a building. The BMS includes one or more processing circuits including one or more memory devices coupled to one or more processors, the one or more memory devices configured to store instructions thereon that, when executed by the one or more processors, cause the one or more processors to initialize a predictive model for predicting temperature, pressure, and humidity within a target area and an adjacent area of the building, receive target area data from a target area sensor array configured to measure temperature, pressure, and humidity of the target area, receive adjacent area data from an adjacent area sensor array configured to measure temperature, pressure, and humidity of the adjacent area, execute the predictive model based on the target area data and the adjacent area data to generate a prediction of future temperature, pressure, and humidity within the target area, and control operation of HVAC equipment to maintain the temperature, pressure, and humidity of the target area within a compliance standard.

In some embodiments, the one or more memory devices are further configured to store instructions thereon that, when executed by the one or more processors, cause the one or more processors to receive updated target area data from the target area sensor array, receive updated adjacent area data from the adjacent area sensor array, and prior to executing the predictive model, update the predictive model based on the updated target area data and the updated adjacent area data.

In some embodiments, the one or more memory devices are further configured to store instructions thereon that, when executed by the one or more processors, cause the one or more processors to train the predictive model using historical data including at least temperature, pressure, and humidity for the target area and the adjacent area.

In some embodiments, the one or more memory devices are further configured to store instructions thereon that, when executed by the one or more processors, cause the one or more processors to identify compliance issues by comparing the predicted future temperature, pressure, and humidity of the target area with the compliance standard.

In some embodiments, the one or more memory devices are further configured to store instructions thereon that, when executed by the one or more processors, cause the one or more processors to generate a notification in response to identifying compliance issues, the notification indicating one of the predicted future temperature, pressure, or humidity of the target area that is non-compliant, and transmit the notification to a user device.

In some embodiments, the one or more memory devices are further configured to store instructions thereon that, when executed by the one or more processors, cause the one or more processors to receive access control data from one or more door sensor associated with the target area or the adjacent area, wherein the predictive model is executed based on the access control data in addition to the target area data and the adjacent area data.

In some embodiments, at least one of the target area sensor array or the adjacent area sensor array are calibrated by comparing the target area data or the adjacent area data with corresponding sensor data from a calibration unit.

Another embodiment of the present disclosure is a building management system (BMS) for monitoring and controlling heating, ventilation, or air conditioning (HVAC) parameters in a building. The BMS includes one or more processing circuits including one or more memory devices coupled to one or more processors, the one or more memory devices configured to store instructions thereon that, when executed by the one or more processors, cause the one or more processors to receive door sensor data for a space within the building, the door sensor data indicating a position of one or more doors located in the space, receive temperature, pressure, and humidity data from a sensor array positioned within the space, execute a predictive model using the door sensor data and the temperature, pressure, and humidity data to predict future temperature, pressure, and humidity data for the space, and control operation of HVAC equipment associated with the space based on the predicted future temperature, pressure, and humidity data.

In some embodiments, the one or more memory devices are further configured to store instructions thereon that, when executed by the one or more processors, cause the one or more processors to receive updated temperature, pressure, and humidity data from the sensor array, and prior to executing the predictive model, update the predictive model based on the updated temperature, pressure, and humidity data.

In some embodiments, the one or more memory devices are further configured to store instructions thereon that, when executed by the one or more processors, cause the one or more processors to train the predictive model using historical temperature, pressure, and humidity for the space.

In some embodiments, the one or more memory devices are further configured to store instructions thereon that, when executed by the one or more processors, cause the one or more processors to identify compliance issues by comparing the predicted future temperature, pressure, and humidity with a compliance standard.

In some embodiments, the one or more memory devices are further configured to store instructions thereon that, when executed by the one or more processors, cause the one or more processors to generate a notification in response to identifying compliance issues, the notification indicating one of the predicted future temperature, pressure, or humidity of the space that is non-compliant, and transmit the notification to a user device.

In some embodiments, the sensor array is calibrated by comparing the received temperature, pressure, and humidity data with corresponding sensor data from a calibration unit.

In some embodiments, the sensor array is removably coupled to the BMS such that the sensor array can be removed and replaced with a calibrated sensor array.

Yet another embodiment of the present disclosure is a system that includes a room sensor positioned in a room and structured to measure temperature, pressure, or humidity within the room, a calibration system including a calibrated sensor corresponding to the room sensor, and one or more processing circuits including one or more memory devices coupled to one or more processors, the one or more memory devices configured to store instructions thereon that, when executed by the one or more processors, cause the one or more processors to communicate with the room sensor and control operation of a heating/cooling system, receive information from the calibration system, and automatically recalibrate the room sensor based on the information received from the calibration system.

In some embodiments, the calibration system includes a calibration schedule set by a manufacturer of the room sensor.

In some embodiments, the system further includes an interface associated with the room, wherein the one or more memory devices are further configured to store instructions thereon that, when executed by the one or more processors, cause the one or more processors to communicate wirelessly with the calibration system, and send display information to the interface regarding calibration of the room sensor.

In some embodiments, the calibration system wirelessly communicates with the one or more processing circuits, and wherein the calibration system automatically initiates a calibration routine.

In some embodiments, the calibration system is structured to communicate with a mobile device, and wherein the mobile device is structured to communicate with the one or more processing circuits and the calibration system to execute a calibration routine.

In some embodiments, the system further includes a second sensor positioned in the room, wherein the calibration system is in communication with the second sensor and uses measurements obtained by the second sensor to calibrate the room sensor.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

Objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 32 is a schematic representation of a method for updating dashboard via the dashboard system of FIG. 31, according to some embodiments.

FIG. 33 is a schematic representation of a mobile device hosting a dashboard, according to some embodiments.

DETAILED DESCRIPTION

Figure 1:
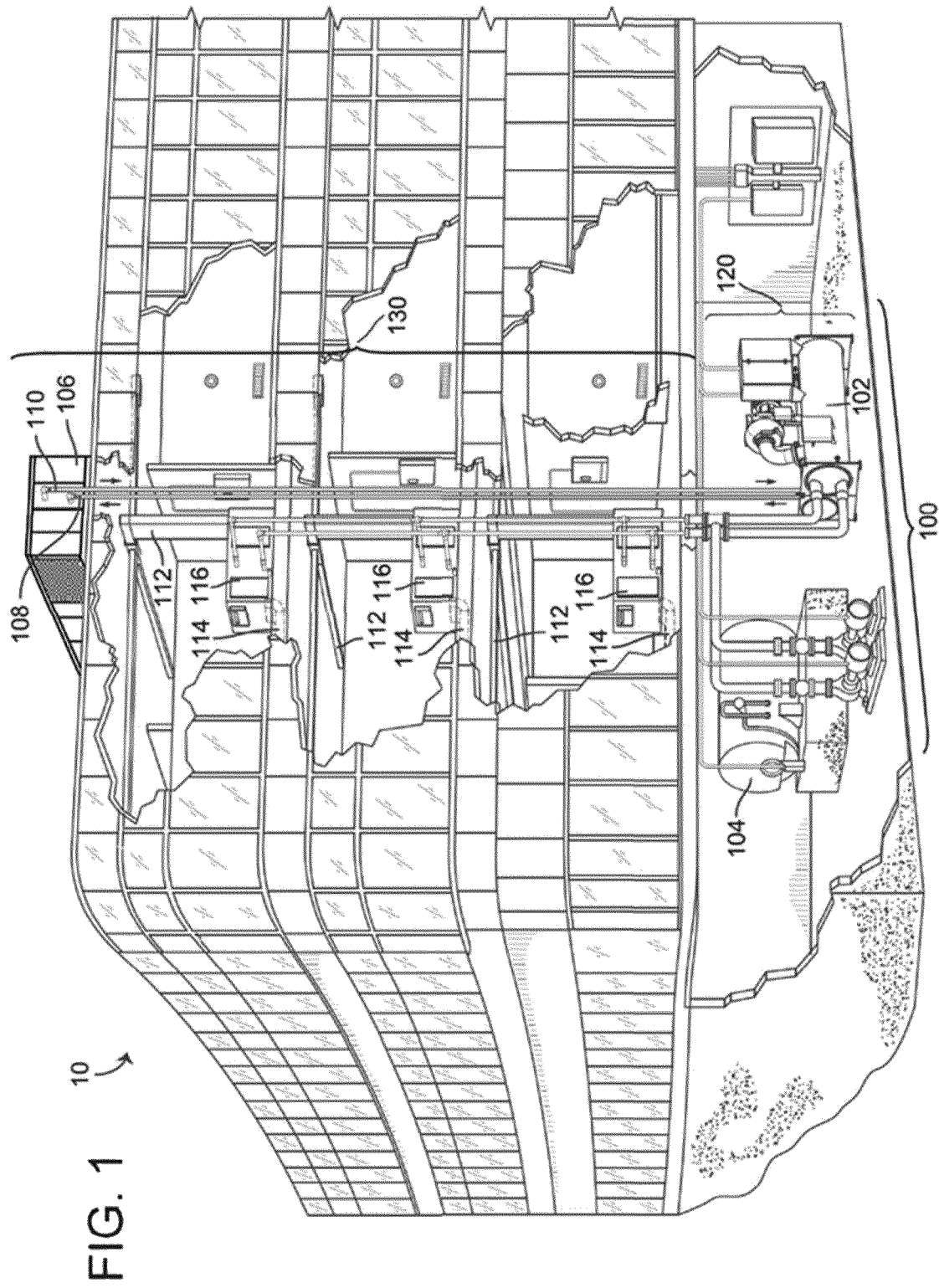
FIG. 1 is a drawing of a building equipped with a HVAC system, according to some embodiments.

Referring generally to the FIGURES, a system and methods for trend analysis and data management for a BMS are shown, according to some embodiments. More specifically, the system and methods described herein can be implemented to monitor parameters of areas within a building or other facility (e.g., a hospital), in order to identify potentially compliance issues. As described herein, compliance issues may generally refer to any indication of non-compliance, where one or more parameters of an area or a building do not meet a set of compliance standards (e.g., standard or predetermined values). The parameters generally include at least temperature, pressure, and humidity (TPH) of a room, area, or building.

In some embodiments, the systems and methods described herein may be applied to rooms or spaces within a hospital or another industrial building where TPH must be monitored and checked for compliance with regulations or process controls. As described above, compliance regulations may include standards set by governmental or non-governmental entities and compliance may be checked by a compliance officer. Checks for compliance of TPH may be checked randomly or on a set routine or schedule and can affect the ability of the building to continue operation (e.g., an out of compliance hospital may be inhibited from providing patient care). In some cases, a third party may administer the compliance checks and/or may establish compliance standards.

The systems and methods described herein may continually monitor TPH measurements from any number of rooms or areas within a building (e.g., a hospital). The TPH data may be used to generate trend data that indicated TPH measurements for a room or area over time. In some embodiments, the trend data may be analyzed using a predictive model to predict future non-compliance issues. Additionally, in some embodiments, TPH data from one or more sensors can be compared to a compliance standard to detect compliance issues in real-time. If a room or building falls out of compliance, or if future non-compliance is predicted, automated response process can be implemented. In this regard, the systems and methods described herein for trend analysis and data management can help a facility (e.g., a hospital) maintain compliance standards to decrease downtime due to compliance issues and, in some cases, to decrease or avoid equipment faults. Additional features and advantages of the present disclosure are described in greater detail below.

With continued general reference to the FIGURES, systems and methods are disclosed that improve comfortability for building occupants while maintaining appropriate levels of temperature, pressure, and humidity. In some embodiments, hospitals and/or clinics may need to conform to certain design criteria (e.g., American Society of Heating, Refrigerating and Air-Conditioning Engineers (ASHRAE) standard 170-2017, etc.) with regards to their HVAC systems to minimize infection, maintain staff comfort and contribute to an environment of patient care. These design criteria may require one or more building zones of the hospital or clinic to maintain temperature, pressure, and humidity (TPH) within a certain range or ranges. There exists a need to maintain TPH within these ranges while simultaneous providing comfortability to the building occupants, energy efficiency, and optimization in the HVAC system.

ASHRAE Standards Overview

Rooms in hospitals may require special design considerations due to intensified infection concerns (e.g., the spread of a contagious disease, etc.), high air change rates, special equipment, unique procedures, high internal loads and the presence of immunocompromised patients. However, these special considerations may be particularly important for hospital operating rooms (ORs), where their purpose is to minimize infection, maintain staff comfort and contribute to an environment of patient care.

In some embodiments, *ANSI/ASHRAE/ASHE Standard 170, Ventilation of Health Care Facilities*, is considered a critical standard of heating, ventilation, and air conditioning (HVAC) health-care ventilation design. The intent of the standard may be to provide comprehensive guidance, including a set of minimum requirements that define ventilation system design that helps provide environmental control for comfort, asepsis, and odor in health-care facilities. In some embodiments, it is adopted by code-enforcing agencies.

The standard may define minimum design requirements only, and due to the wide diversity of patient population and variations in their vulnerability and sensitivity, these standards may not guarantee an OR environment that will sufficiently provide comfort and control of airborne contagions and other elements of concern. When selecting the temperature and relative humidity combination to be incorporated into the design, these standard minimums and the desires of the surgical staff may need to be taken into consideration. In some embodiments, the ASHRAE *HVAC Design Manual for Hospitals and Clinics* discloses the inability to maintain low OR temperature as the primary complaint by surgeons to facility engineers.

With continued general reference to the FIGURES, a system and methods for monitoring and controlling the environment within various areas of a building are shown, according to some embodiments. More specifically, the system and methods described herein can be implemented to monitor parameters of areas within a building or other facility (e.g., a hospital), in order to identify and correct potential compliance issues. As described herein, compliance issues may generally refer to any indication of non-compliance, where one or more parameters of an area or a building do not meet a set of compliance standards (e.g., standard or predetermined values). The parameters generally include at least temperature, pressure, and humidity (TPH) of a room, area, or building.

In some embodiments, the systems and methods described herein may be applied to rooms or spaces within a hospital or another industrial building where TPH must be monitored and checked for compliance with regulations or process controls. As described above, compliance regulations may include standards set by governmental or non-governmental entities and compliance may be checked by a compliance officer. Checks for compliance of TPH may be checked randomly or on a set routine or schedule and can affect the ability of the building to continue operation (e.g., an out of compliance hospital may be inhibited from providing patient care). In some cases, a third party may administer the compliance checks and/or may establish compliance standards.

The systems and methods described herein may continually monitor TPH measurements from any number of rooms or areas within a building (e.g., a hospital). The TPH data may be used to identify and/or predict non-compliance issues. In some embodiments, sensor data from a security system or other subsystem of a building may be utilized to further improve TPH prediction. Predicted TPH for areas within the building can be utilized to control HVAC equipment to maintain the TPH values within compliance standards. In this regard, the systems and methods described herein can help a facility (e.g., a hospital) maintain compliance standards to decrease downtime due to compliance issues and, in some cases, to decrease or avoid equipment faults.

Additionally, in some embodiments, adjacent areas can greatly impact the TPH of one another. For example, a room can lose heat through a wall or ceiling to another, adjacent room. In another example, the pressure of a room may decrease suddenly when opening a door, and the pressure of an adjacent area (e.g., a room, a hallway) may suddenly increase proportionally. Accordingly, the systems and methods described herein can help to predict and minimize the impact of adjacent spaces through the use of sensor arrays and predictive models. The sensor arrays may be regularly calibrated to ensure accurate measurements. Additional features and advantages of the present disclosure are described in greater detail below.

Building with Building Systems

Figure 2:
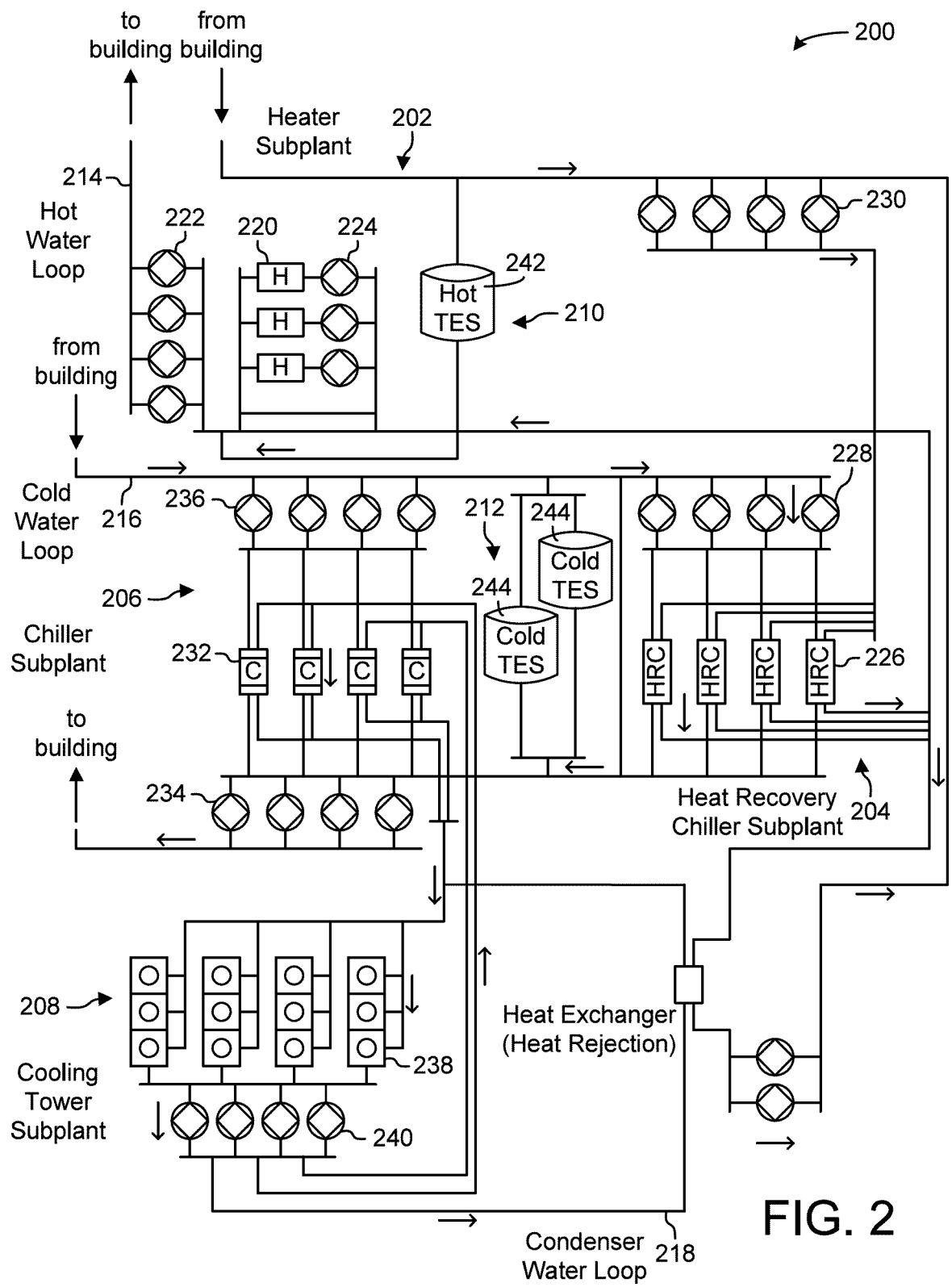
FIG. 2 is a block diagram of a waterside system that may be used in conjunction with the building of FIG. 1, according to some embodiments.
Figure 3:
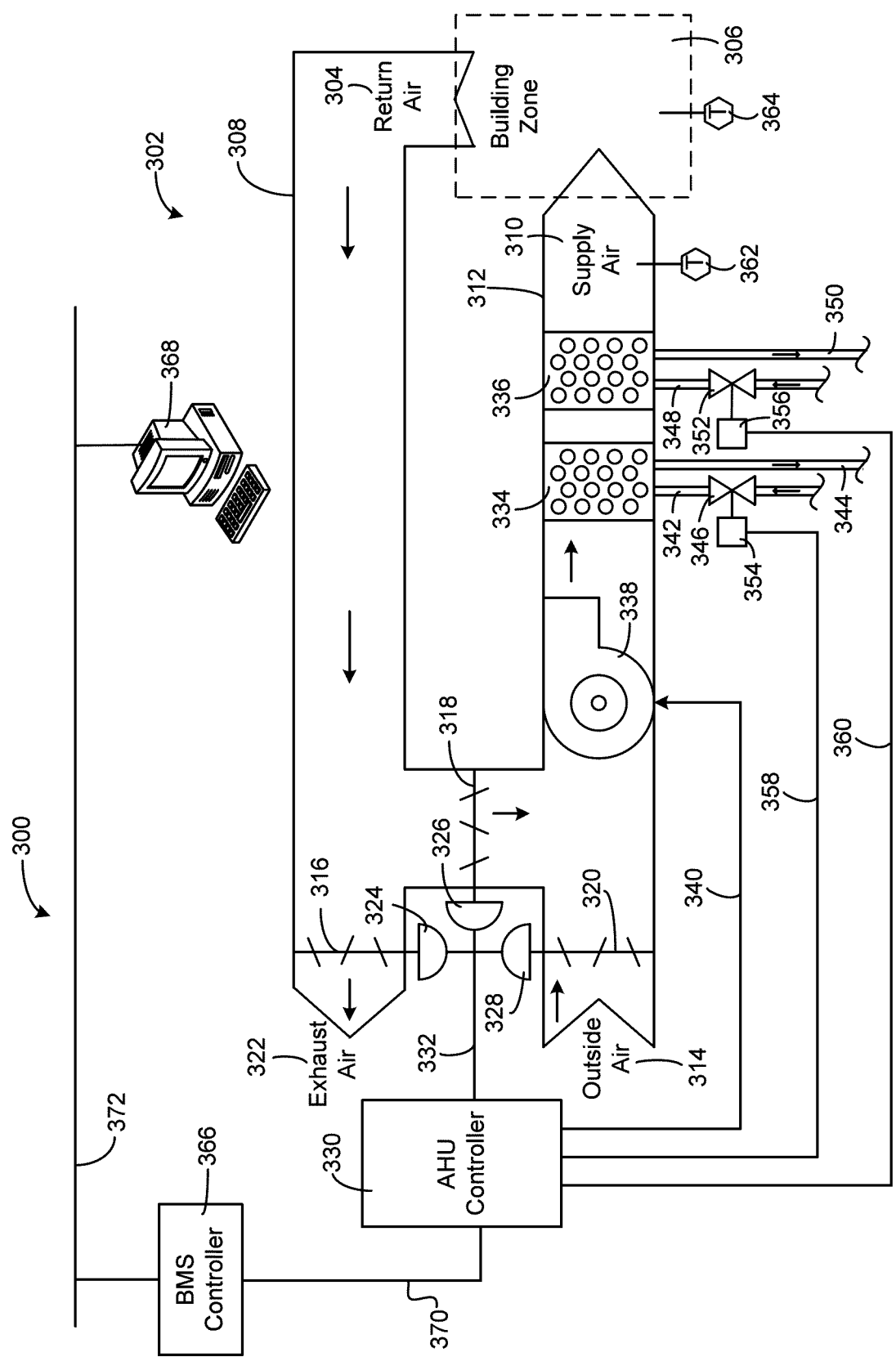
FIG. 3 is a block diagram of an airside system that may be used in conjunction with the building of FIG. 1, according to some embodiments.
Figure 4:
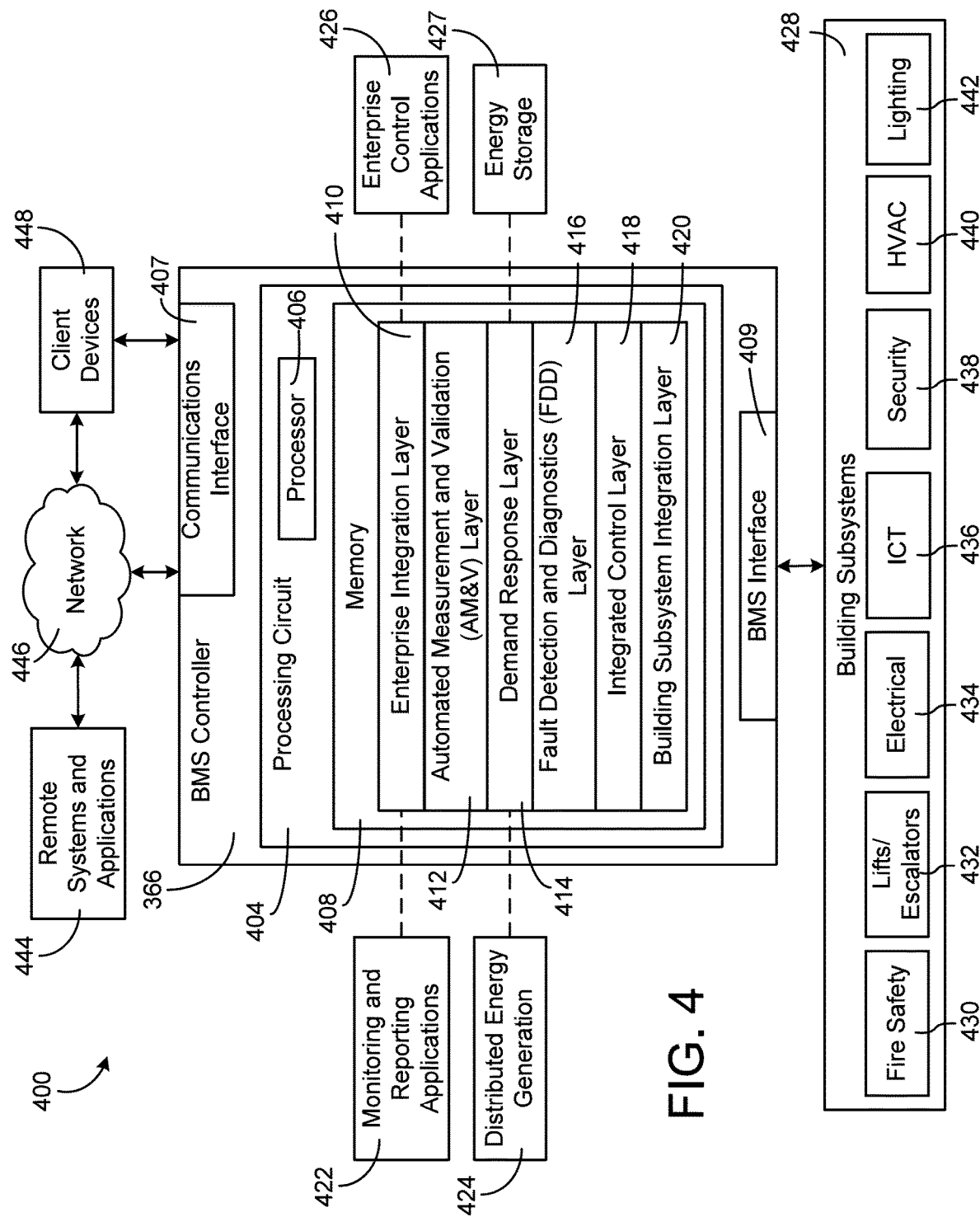
FIG. 4 is a block diagram of a building management system (BMS) that may be used to monitor and/or control the building of FIG. 1, according to some embodiments.
Figure 5:
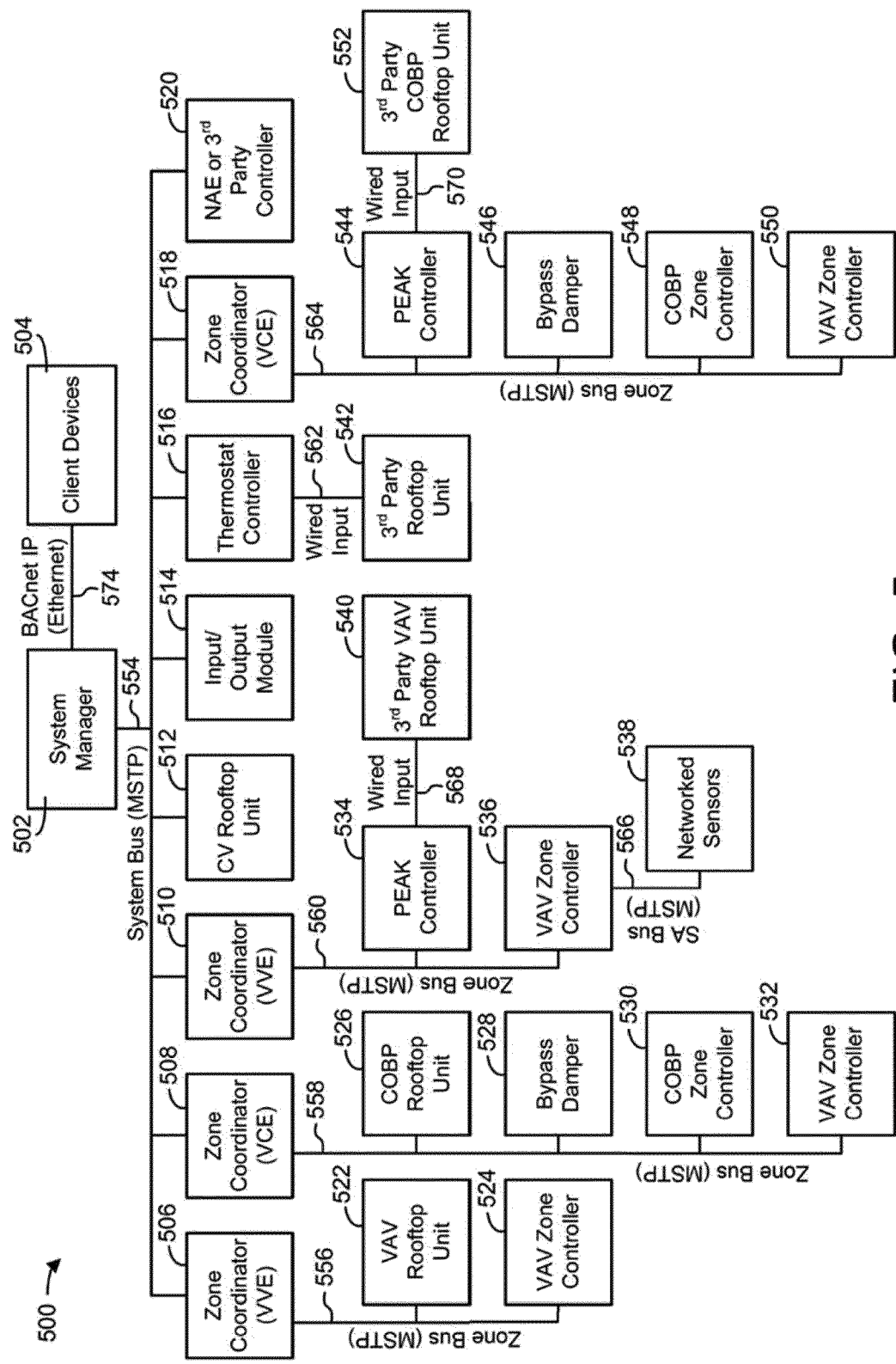
FIG. 5 is a block diagram of another building management system (BMS), according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 (e.g., a hospital) equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

As shown in FIG. 5, a BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Trend Analysis and Data Management

Figure 6:
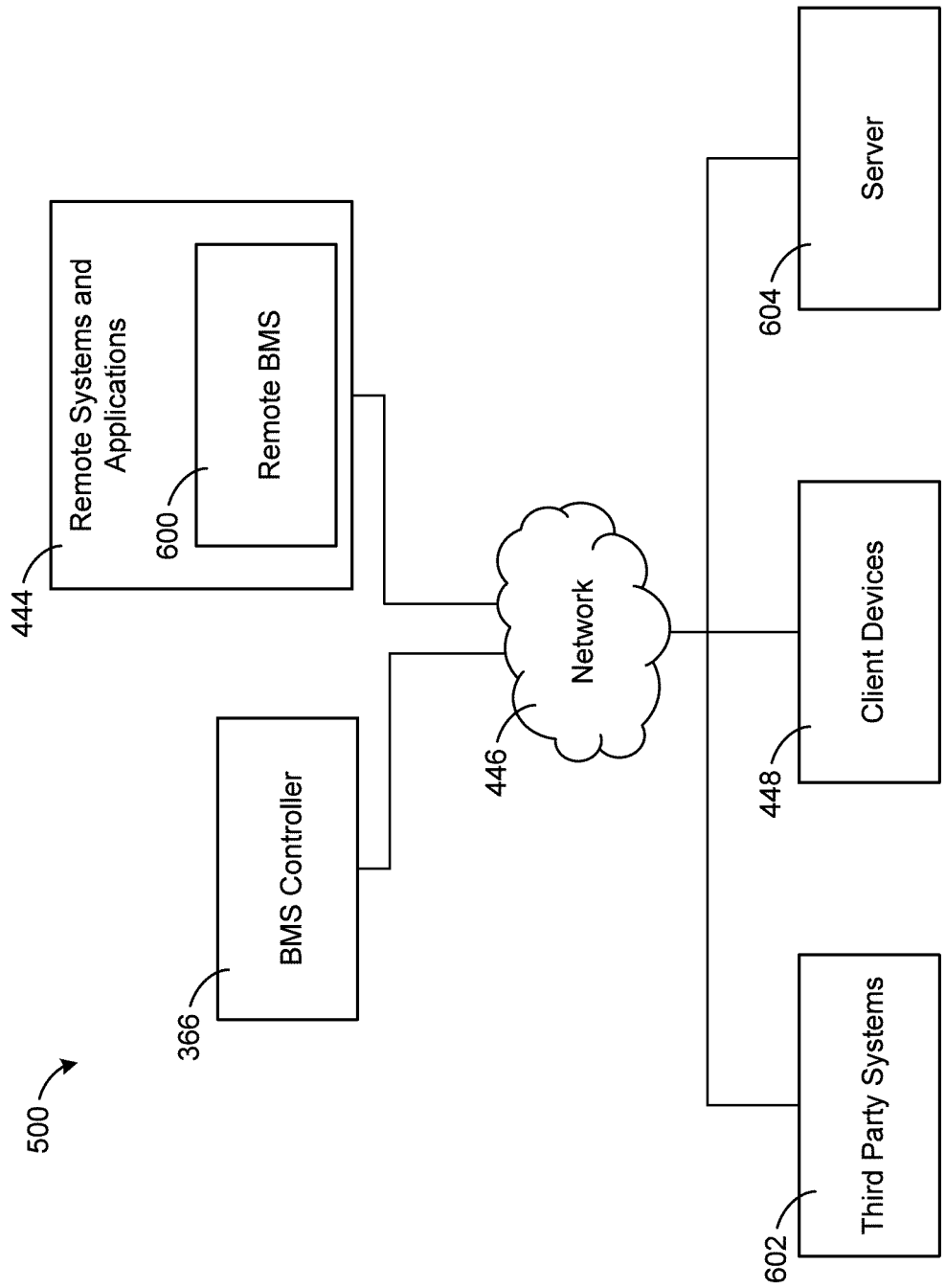
FIG. 6 is a block diagram of a data management system for the BMS of FIG. 4 and one or more remote systems, according to some embodiments.

As shown in FIG. 6, a block diagram of a data management system 500 for the BMS 400 and one or more remote system or applications 444 is shown, according to some embodiments. As shown, the system 500 centers around the network 446, as briefly described above. The network 446 can be any sort of local or wide-area network (e.g., LAN, WAN, WLAN, MAN, CAN, etc.) that allows the components of the system 500 to exchange information (i.e., data). In some embodiments, the network 446 is an internal network or intranet (e.g., an internal BMS network). In other embodiments, the network 446 the Internet or other similar external network. In some such embodiments, components of the system 500 may communicate via the network 446 using a virtual private network (VPN) or other similar connection.

As also described above, the BMS controller 366 and one or more remote systems and applications 444 may be communicably coupled via the network 446. In the example of the system 500 shown in FIG. 6, the remote systems and applications 444 can include at least one remote BMS or BMS controller, shown as a remote BMS 600, although it will be appreciated that the BMS controller 366 can interface with any number of external or remote systems. Accordingly, the network 446 allows the BMS controller 366 to exchange data with the remote BMS 600. In embodiments, the remote BMS 600 is a secondary BMS or BMS controller for a building that is also served by the BMS 400, or the remote BMS 600 is a BMS or BMS controller for another building managed by a single entity. For example, the remote BMS 600 may be a BMS for a second building of a campus or facility, or may be a BMS for a building at a location that is remote from the building served by BMS 400. In these examples, both the BMS controller 366 and the remote BMS 600 can be accessed or "linked" by a single entity, such as a facility or site manager or management system.

Also communicably coupled to the BMS controller 366 and/or the remote BMS 600 via the network 446 are third party systems 602. The third party systems 602 can include any remote and/or external systems that are not necessarily part of the BMS 400. In other words, the third party systems 602 are generally systems that are hosted, maintained, or otherwise operated by computing devices and/or users outside of an organization associated with the BMS 400 (e.g., the BMS controller 366 and the remote systems and applications 444).

In one example, the third party systems 602 may include an external website, server, or system associated with a utilities provider (e.g., to provide electricity, water, etc.). In this example, the utility provider's system may exchange data relating to utility rates, usage, etc. In another example, such as when the system 500 and/or the BMS 400 are implemented in a hospital, the third party systems 602 can include at least The Joint Commission (TJC) and the Centers for Medicare & Medicaid Services (CMS) to allow for communication between a network of hospitals and the regulating bodies. Accordingly, as described in greater detail below, the third party systems 602 can access operational data via the network 446 to perform compliance checks. It will be appreciated that in other embodiments, the third party systems 602 include any other systems that are not operated by the same organization as the BMS 400.

The system 500 is also shown to include client devices 448. As described above, the client devices 448 can include one or more individual client or user devices (e.g., client device 368). The client devices 448 generally allow a user to interact with the BMS controller 366 and/or the remote systems and applications 444. The client devices 448 can include one or more devices such as tablets, computers, smart phones, access points, interactive wall panels, augmented reality devices, smart watches, virtual reality devices, glasses, commercial human machine interfaces, etc., that provide an interface for a user.

In some embodiments, one or more large scale memory devices in the form of servers 604 are also communicably coupled to the network 446. The servers 604 can be implemented in a variety of ways. For example, the servers 604 may include one or more network devices such as a network engine or a controller similar to the BMS controller 366. The servers 604 may also be workstations, personal computers, or another type of device similar to the client device 368 discussed above with server software installed thereon. The servers 604 may also be implemented using one or more on-premises server computers and/or one or more remote cloud-based server computers. In this sense, the servers 604 may be distributed across a variety of physical hardware devices.

Figure 7:
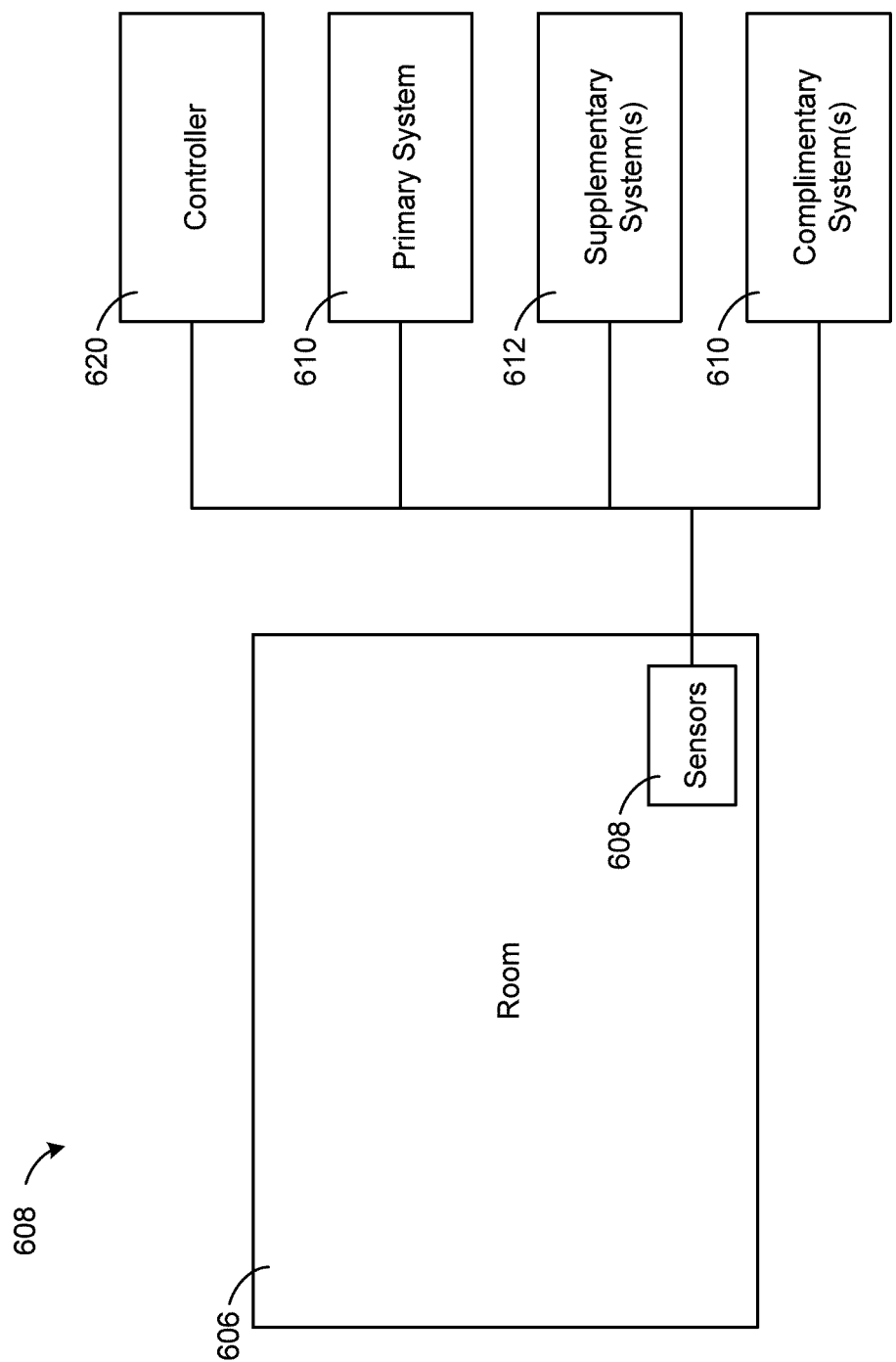
FIG. 7 is a block diagram of a room including a sensor array, according to some embodiments.

Referring now to FIG. 7, a block diagram of a room 606 including a sensor array 608 is shown, according to some embodiments. The room 606 is generally any defined area within a building that is fitted with one or more sensors for measuring parameters within the room 606. Accordingly, the room 606 may be any room of a building that is served by the BMS 400. In this regard, the room 606 may also include one or more building devices associated with any of the building subsystems 428, such as fire safety devices, HVAC devices, lighting devices, etc. In some embodiments, the room 606 can be any space for which TPH performance or compliance is desirable. In some embodiments, the room 606 is an operating room, a patient room, or a common area of a hospital. In some embodiments, the room 606 is a clean room for an industrial, food processing, or pharmaceutical process.

The sensor array 608 can include any number of sensors for measuring any of a variety of parameters associated with the room 606 and/or the building subsystem devices associated with the room 606. The sensor array 608 can include, for example, humidity sensors, temperature sensors, pressure sensors, and other sensors. In some embodiments, the sensor array 608 includes fire/smoke alarms, door sensors, occupancy sensors, thermal cameras, air quality sensors, and/or other sensors that measure factors indicative of an environment within the room 606. In some embodiment, such as when the room 606 is an operating room or a patient room in a hospital, the sensor array 608 includes any sensors that are necessary to ensure patient comfort and safety, and to monitor/maintain an environment that meets compliance standards for hospitals. In general, the sensor array 608 includes sensors configured to measure at least a temperature, a pressure, and a humidity (TPH) of the room 606.

As shown in FIG. 7, a primary system 610 and a supplementary system 612 are communicably coupled to the sensor array 608. In this manner, the primary system 610 and/or the supplementary system 612 may receive sensor data from the sensor array 608. In general, the primary system 610 and/or the supplementary system 612 are structured to control an environment within the room 606. Accordingly, the primary system 610 and/or the supplementary system 612 can include at least a portion of any of the building subsystems 428 described above. The primary system 610 and/or the supplementary system 612 may be configured to affect at least a temperature, pressure, and humidity of the room 606. In other words, the primary system 610 and/or the supplementary system 612 can affect or control the environment within the room 606.

In some embodiments, the primary system 610 includes HVAC equipment (e.g., of the HVAC subsystem 440) capable of affecting the environment of the room 606 (e.g., by controlling or adjusting the temperature, pressure, and humidity). For example, the primary system 610 can include at least the waterside system 120 and/or the airside system 130 discussed above. In some embodiments, the primary system 610 is a single component (e.g., a heater, a chiller, an AHU, a pump, etc.), while in other embodiments, the primary system 610 can include any number of devices (e.g., one or more devices of the HVAC subsystem 440, described above) or systems (e.g., the HVAC system servicing a group of rooms collectively).

The supplementary system 612 is generally an additional (e.g., backup) system that supplements or replaces the primary system 610. In this regard, the supplementary system 612 can include one or more devices that are functionally similar to, or identical to, the devices of the primary system 610. For example, if the primary system 610 includes an AHU (e.g., the AHU 106) and one or more chillers (e.g., the chiller 102), then supplementary system may also include a similarly sized AHU and chillers.

In some embodiments, one or more complementary systems 614 are also associated with the room 606, and thereby coupled to the sensor array 608. The complementary systems 608 can generally include any additional subsystems (e.g., of the building subsystems 428) or building devices that are not included in the primary system 610 or the supplementary system 612. In some embodiments, the complementary systems 608 include any subsystems or devices that are not associated with controlling or monitoring the environment within the room 606, and more specifically the temperature, pressure, and humidity of the room 606. For example, the complementary systems 608 can include a fire suppression system, a security system, a utility system (e.g., electricity, gas, etc.), and/or any another system related to the operation of the room 606.

Figure 8:
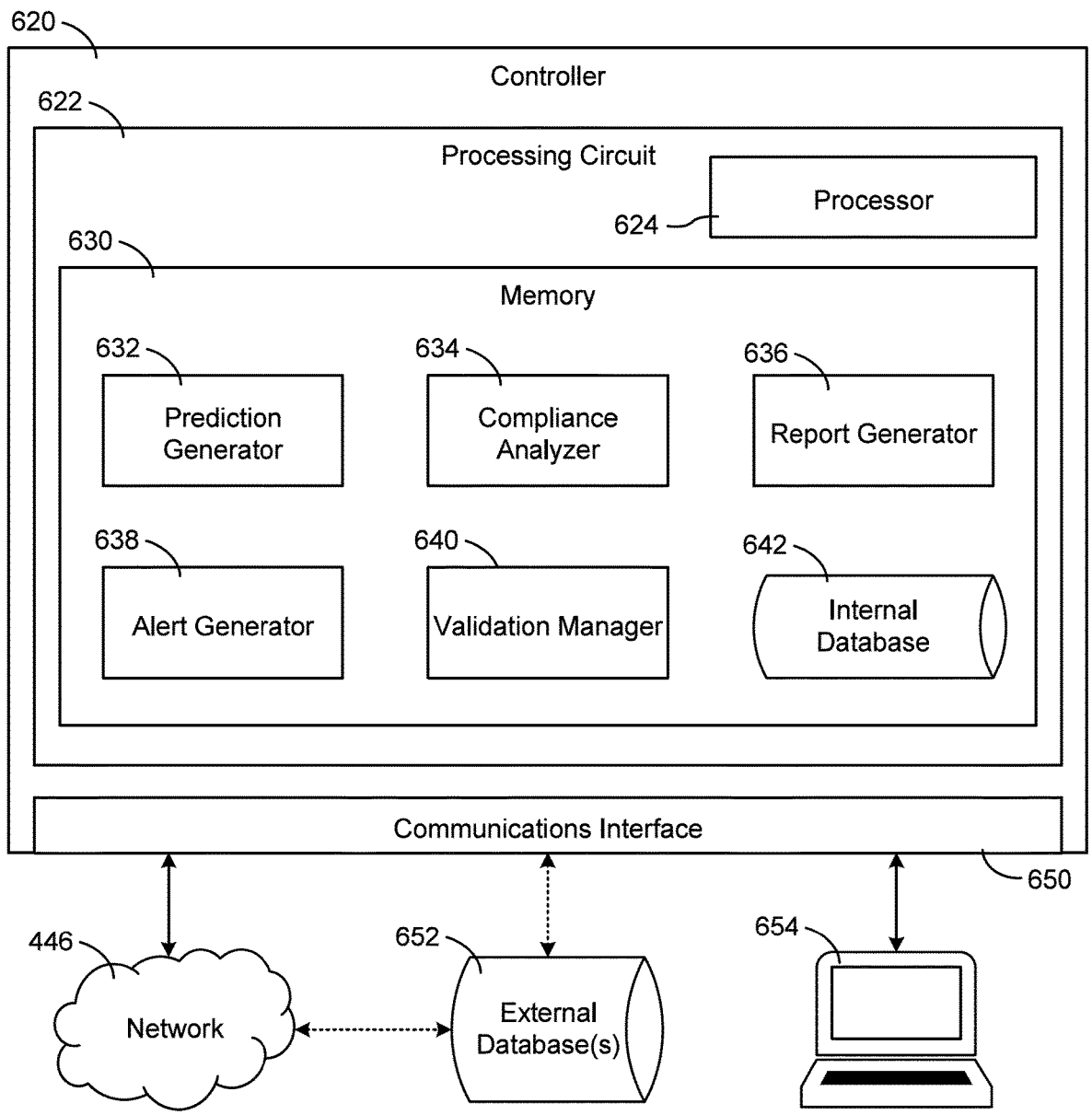
FIG. 8 is a block diagram of a controller for trend analysis and data management, according to some embodiments.

As shown in FIG. 8, a block diagram of a controller 620 for trend analysis, data management, and report facilitation is shown, according to some embodiments. In general, the controller 620 can automatically monitor parameters of a room (e.g., the room 606) or rooms of a building over time, and generate reports that improve a compliance review process. As described above, for example, parameters such as temperature, pressure, and humidity (TPH) of a room or rooms can be monitored to detect non-compliance. In a hospital setting, for example, predetermined compliance standards may be set by The Joint Commission (TJC) or by the Centers for Medicare & Medicaid Services (CMS), and the controller 620 may at least partially automate the process of monitoring TPH for rooms or areas of the hospital based on the predetermined compliance standards and compiling compliance reports. Additionally, the controller 620 may determine that one or more parameters (e.g., TPH) of a room are falling out of compliance, or may become non-compliant in the near future, and can take appropriate actions to avoid non-compliance.

The controller 620 is communicably coupled to the sensor array 608 and the primary system 610, the supplementary system 612, and the complementary systems 608. In this regard, the controller 620 may receive data regarding one or more parameters of the room 606 from the sensor array 608, analyze or process the data, and control one or more of the primary system 610, the supplementary system 612, or the complementary systems 608 based on the data. In some embodiments, the controller 620 may also receive operating data from any of the primary system 610, the supplementary system 612, or the complementary systems 608. In embodiments, the controller 620 may be coupled to the sensor array 608, the primary system 610, the supplementary system 612, or the complementary systems 608 either directly (e.g., through a wired connection) or indirectly (e.g., via the network 446).

The controller 620 may exchange data with any of the sensor array 608, the primary system 610, the supplementary system 612, or the complementary systems 608 via a communications interface 650. The communications interface 650 may be configured to facilitate the exchange (i.e., sending and receiving) of data between the controller 620 and one or more other components. For example, the communications interface 650 may be configured to exchange data via the network 446 and may include appropriate interfaces for communicating on the network 446. For example, the communications interface 650 may include a wired and/or wireless interface for connecting the controller 620 to the Internet, or to an intranet. In some embodiments, the communications interface 650 provides an interface between the controller 620 any one or more the building subsystems 428, or other components of the BMS 400. In this regard, the communications interface 650 can include a BACnet interface in addition to other types of communications interfaces (e.g., Modbus, LonWorks, DeviceNet, XML, etc.).

In some embodiments, the communications interface 650 facilitates communication between the controller 620 and one or more external databases 652. In some such embodiments, data may be exchanged directly with external databases 652, or indirectly through the network 446. The external databases 652 can be implemented in a variety of ways. For example, the external databases 652 may include one or more memory devices or remote storage devices. The external databases 652 may also include workstations, personal computers, servers (e.g., the servers 604), etc., and may include one or more on-premises server computers/databases and/or one or more cloud-based databases. In this sense, the external databases 652 may be distributed across a variety of physical hardware devices.

As shown, the communications interface 650 also facilitates communication between the controller 620 and at least one user device 654. The user device 654 may be any electronic device that allows a user to interact with the controller 620 through a user interface. Examples of user devices include, but are not limited to, mobile phones, electronic tablets, laptops, desktop computers, workstations, and other types of electronic devices. The user device 654 may be similar to the client device 368 and/or the client devices 448, as described above. The user device 654 may display graphical user interfaces or other data on a display, thereby enabling a user to easily view data and interact with the controller 620.

Still referring to FIG. 8, the controller 620 includes a processing circuit 622, which further includes a processor 624 and memory 630. It will be appreciated that these components can be implemented using a variety of different types and quantities of processors and memory. The processing circuit 622 can be communicably connected to the communications interface 650 such that processing circuit 622 and the components thereof can send and receive data via the communications interface 650. The processor 624 can be implemented as a general purpose processor, an application specific integrated circuit (ASIC), one or more field programmable gate arrays (FPGAs), a group of processing components, or other suitable electronic processing components.

The memory 630 (e.g., memory, memory unit, storage device, etc.) can include one or more devices (e.g., RAM, ROM, Flash memory, hard disk storage, etc.) for storing data and/or computer code for completing or facilitating the processes, layers and modules described in the present application. The memory 630 can be or include volatile memory or non-volatile memory. The memory 630 can include database components, object code components, script components, or any other type of information structure for supporting the activities and information structures described in the present application. According to an example embodiment, the memory 630 is communicably connected to the processor 624 via the processing circuit 622 and includes computer code for executing (e.g., by the processing circuit 622 and/or the processor 624) one or more processes described herein.

In some embodiments, the controller 620 is implemented within a single computer (e.g., one server, one housing, etc.). In other embodiments the controller 620 can be distributed across multiple servers or computers (e.g., that can exist in distributed locations). In some embodiments, the controller 620 is embodied in the BMS 400 as described above, and accordingly, the processing circuit 622, the processor 624, and/or the memory 630 may be similar to or the same as the processing circuit 404, the processor 406 and/or the memory 408 as described above. Additionally, in such embodiments, the components of the memory 630, described below, may be embodied in the BMS 400. In other embodiments, the controller 620 is a stand-alone device or component not embodied in the BMS 400, and therefore includes its own dedicated processing circuit 622, processor 624, and/or memory 630. In yet other embodiments, the controller 620 is embodied as a portion of the BMS 400, a differently arranged BMS, or a building automation system (BAS), and accordingly may share a processing circuit, processor, and/or memory with any of these other BMSs or BASs.

The memory 630 is shown to include a data manager 632. The data manager 632 may be configured for a variety of functions including exchanging data via the communications interface 650, aggregating received data, and managing data storage. More particularly, the data manager 632 may be configured to receive data from building equipment and sensors (e.g., the sensor array 608), and in some cases may preprocess the data (e.g., reformatting the data, removing outliers, time stamp the data, etc.). In some embodiments, the data received by the data manager 632 from the sensor array 608 includes at least TPH data for an area of a building (e.g., the room 606).

In some embodiments, the data manager 632 can aggregate data received from one or more sensors or devices. For example, a building with multiple rooms may include multiple sensor arrays, such as described below with respect to FIG. 9. Accordingly, the data manager 632 may aggregate data received from these multiple sensor arrays in order to provide a complete data set for a building. In some embodiments, the data manager 632 receives data from one or more other controllers or BMSs (e.g., the remote BMS 600), and aggregates data from multiple systems. In this manner, a user (e.g., in a supervisory role) may be provided with an overview of data from all of the buildings or sites managed by a single organization.

In some embodiments, receiving data (e.g., TPH data) from multiple sources or systems (e.g., a network of hospitals) can provide for a more robust data set that can be used to better understand problems and better maintain TPH compliance. In some embodiments, where the controller 620 predicts future non-compliance issues, as described below, the shared data can improve the accuracy of predictive models and therefore improve response of the controller 620 to TPH changes or issues.

In some embodiments, either prior to or after aggregating data from multiple sources, the data manager 632 can validate the data. Data validation may include, for example, ensuring that appropriate data is received, checking the data's type and structure, etc. It will be appreciated that any number of data validation rules may be applied based on individual implementations of the controller 620. Accordingly, the data manager 632 can validate any received data based on any number of validation rules.

In some embodiments, the data manager 632 is also configured to manage data storage and retrieval (i.e., data management). The data manager 632 may be configured to store received data in an internal database 642, for example. The internal database 642 may be a partition in the memory 630 or may be a separate memory device that is internal to the controller 620 and/or the BMS 400. In some embodiments, the data manager 632 may transmit data to one or more of the external databases 652, as previously described. In this regard, the data manager 632 may also retrieve data from either the internal database 642 or the external databases 652 for additional processing or analysis. The data management implemented by the data manager 632 is described in greater detail below at least with respect to FIG. 9.

The memory 630 is also shown to include a prediction generator 634. The prediction generator 634 is generally configured to analyze the previously received data to identify trends. In generally, the prediction generator 634 analyzes at least TPH data corresponding to a room (e.g., the room 606), area, or building. As described above, TPH data may include important parameters that indicate the environmental conditions of a room or area. TPH may be of particular importance for certain buildings, such as hospital, pharmaceutical produces, food preparation facilities, data centers, etc., that must maintain certain TPH to meet compliance standards.

The prediction generator 634 may be configured to generate trend data based on previously received sensor data corresponding to at least TPH of a room or building. In this regard, the prediction generator 634 may generate individual trend data for each room of a building. The sensor data may be analyzed to generate a trend in real time, or the prediction generator 634 may receive historical data from a database (e.g., the internal database 642 and/or the external databases 652) via the data manager 632. In either case, trend data is generated that indicates the TPH values of the room (e.g., the room 606) at a plurality of previous time steps. In other words, the trend data is time series data corresponding to TPH values for a room of a building.

In some embodiments, the prediction generator 634 implements a predictive model to generate a prediction of future trend data. The predictive model can be any suitable type of neural network, machine learning model, or other artificial intelligence system. In some embodiments, the predictive model may include a model based predictive engine based on previous data, decision trees, and other algorithms. The predictive model is generally selected or designed for a specific installation or building. For example, an artificial intelligence system may be structured to learn the specific TPH dynamics of a hospital area (e.g., patient rooms, operating rooms, commons paces, etc.). The prediction generator 634 may also be configured to continuously update the predictive model based on real-time senor data. In some embodiments, the predictive model is dynamically modified using a reinforcement learning schema to improve the accuracy of trend data predictions over time. In some embodiments, an initial policy is implemented within the predictive model based on historical data queried from the trend data, and the policy is updated over time using real time sensor data from the sensor array 608 and other information to learn the specific installation and improve functionality.

The memory 630 is also shown to include a compliance analyzer 636. The compliance analyzer 636 is structured to identify TPH compliance issues and compare information received from the sensor array 608 to compliance standards established by the TJC and the CMS. The compliance analyzer 636 is also generally configured to predict future non-compliance and thereby can initiate preventative maintenance to avoid compliance problems. The predictions of future compliance can be based on simple trend data, model predictive control, or artificial intelligence (e.g., neural networks, etc.). Accordingly, the functionality of the compliance analyzer 636 may closely intertwined with the prediction generator 634 in order to determine compliance.

In some embodiments, the compliance analyzer 636 can query a remote database (e.g., the external databases 652) or server (e.g., the servers 604) to retrieve stored compliance standards. In some such embodiments, the compliance analyzer 636 may query a third party system (e.g., the third party systems 602) in order to receive the most up-to-date compliance standards. For example, the compliance analyzer 636 may receive compliance standards directly from a server or website associated with TJC. In some embodiments, the compliance analyzer 636 may query an external system or database at a regular time interval, to maintain accurate compliance standards. As such, the compliance analyzer 636 may provide enhanced compliance analysis over other systems and methods by avoiding out-of-date standards. However, in certain other embodiments, compliance standards may be manually entered (e.g., by a user).

In some embodiments, the compliance analyzer 636 analyzes real-time or near real-time data received from one or more sensors (e.g., the sensor array 608) to detect compliance issues. In such embodiments, the compliance analyzer 636 may compare the TPH measurements from the sensor array 608 to a range of acceptable TPH values, as identified by the compliance standards. The TPH trend data for a room and/or building may be used to identify potential future non-compliance issues. TPH values that fall outside of an acceptable range may indicate non-compliance. In some embodiments, the compliance analyzer 636 may analyze actual trend data or predicted trend data generated by the prediction generator 634 to identify compliance issues. In such embodiments, the compliance analyzer 636 can predict future compliance issues based on the actual or predicted trend data.

In some embodiments, the compliance analyzer 636 may determine and/or initiate one or more automated response processes based on an indication of non-compliance or based on a prediction of future non-compliance. The automated response processes may include corrective actions that may be implemented to correct or prevent compliance issues. For example, the compliance analyzer 636 may cause the controller 620 to initiate operations of the supplementary system 612 to supplement or replace operations of the primary system 610. In some embodiments, the compliance analyzer 636 can initiate the generation of a work order indicating that a repair to equipment (e.g., of the primary system 610) may be required. In some such embodiments, the controller 620 may even automatically schedule maintenance or repairs for affected equipment.

In some embodiments, an indication of non-compliance or a prediction of future compliance issues may cause an alert generator 640 to generate an alarm or a notification. The alarm or notification may be provided (e.g., transmitted) to a user, a group of users, an outside or third party system, a vendor of a component, or another entity suitable to address an issue or problem that caused the generation of the alarm or notification. For example, the alert generator 640 may generate an alert or notification that indicates a room, building, or equipment that is out of compliance, or is at risk of falling out of compliance. The alert or notification may be automatically transmitted (e.g., via text message, voice call, email, push notification, etc.) to a device associated with a user (e.g., a facilities manager) or a group of users (e.g., a maintenance team) to indicate the users to the potential issue. In this regard, the alert generator 640 may be configured to query a database or remote system to identify communication information for one or more users (e.g., phone numbers, emails, etc.) to facilitate the transmission of an alert.

Still referring to FIG. 8, the memory 630 is also shown to include a report generator 638. The report generator 638 is structured to generate a report indicative of compliance status of TPH and other factors. In some embodiments, the report generator 638 may determine a preferred report format from a third party system (e.g., CMS or TJC) including an indication of information required to show compliance and including a preferred format for the arrangement of the information. The report generator 638 may receive the report format and automatically populate a form or report to satisfy the compliance reporting requirements of the third party system. The generation of a compliance report is described in greater detail below with respect to FIG. 11.

Figure 9:
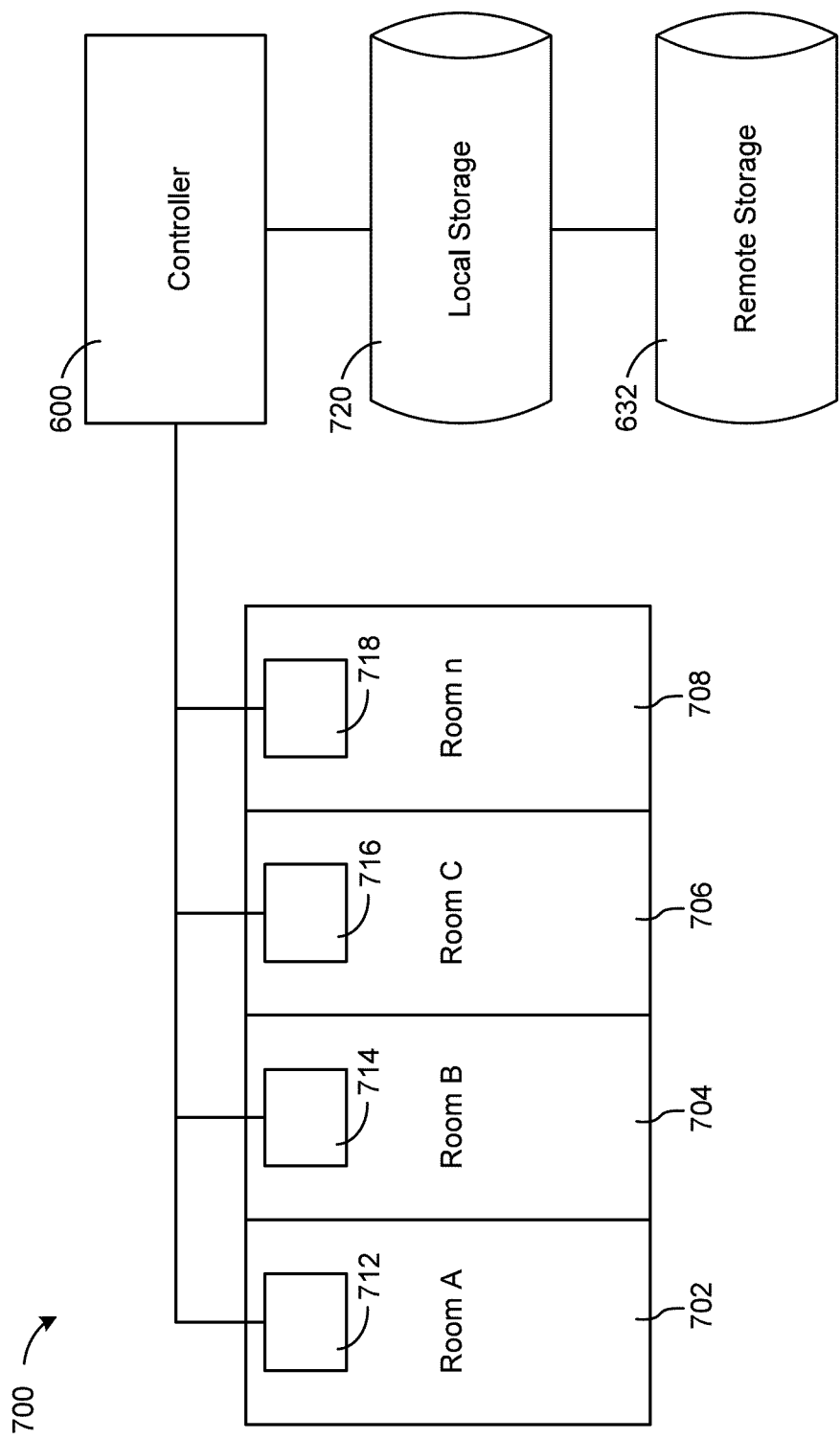
FIG. 9 is a block diagram of a data management system for a building, according to some embodiments.

Referring now to FIG. 9, a block diagram of a data management system 700 for a building is shown, according to some embodiments. The system 700 may be implemented in a building served by the BMS 400, for example, and may allow for the storage and retrieval of any sort of operational data associated with a building. Data management is an especially important issue for a large scale BAS and/or BMS (e.g., the BMS 400). For example, compliance inspectors (e.g., a TJC inspector) may need to access to operational data (e.g., TPH for a room of the building) from varying historical time periods. In some embodiments, when a compliance issue has arisen, it can be useful to have access to historical operational data (e.g., operating parameters of HVAC equipment, control parameters and inputs, TPH logs, down times, corrective actions taken, etc.) in order to prevent future compliance issues, or to show that appropriate steps were taken to correct the compliance issue. The data management provided by the system 700 allows data (e.g., TPH data) to be accessed smoothly and quickly in the event of a compliance finding. The availability of a rich set of data allows the controller to better assess a root cause problem and provide a work order for fixing the problem quickly and efficiently.

As shown, the controller 620 is structured to receive data from sensor arrays 712-718 positioned in rooms 702-708. Each of the sensor arrays 712-718 may be similar or identical to the sensor array 608, described above. In this regard, each of the sensor arrays 712-718 may include any number of sensors for measuring parameters associated with an environment within a corresponding room. The sensor arrays 712-718 can include, for example, humidity sensors, temperature sensors, pressure sensors, fire/smoke alarms, door sensors, occupancy sensors, thermal cameras, air quality sensors, and/or other sensors that measure factors indicative of an environment within a room. Similarly, each of the rooms 702-708 may be similar or identical to the room 606. In some embodiments, the rooms 702-708 represent rooms or areas within a hospital (e.g., patient rooms, operating rooms, etc.). In some embodiments, the room 606 is a clean room for an industrial, food processing, or pharmaceutical process.

In some embodiments, the data measured by the sensor arrays 712-718 and subsequently transmitted to the controller 620 can include information related to an environment of a corresponding room (e.g., at least TPH measurements). In some embodiments, the controller 620 can also receive data corresponding to components of an HVAC system (e.g., HVAC system 440). In this regard, the controller 620 can not only record TPH measurements for a room (e.g., one of the rooms 702-708), but can also record operational data or operational states of HVAC equipment associated with the room (e.g., control outputs sent to a chiller or an air handling unit).

Information or data received by the controller 620 can subsequently be stored in local storage 720. The local storage 720 may include an integrated or removable storage/memory device that is local to a building served by the system 700 and/or the BMS 400. In one example, the local storage 720 may be the same as, or functionally equivalent to, the internal database 642 described above. As also described above, the data is generally at least TPH data corresponding to each of the rooms 702-708. In some embodiments, the data includes any operating parameters or environmental parameters related to system compliance.

In some embodiments, the data is maintained in the local storage 720 for a first predetermined time period (e.g., 24 hours, 30 days, 1 year, etc.). The first predetermined time period may be previously defined such as by a user or system manager, or may be automatically determined to provide rich data sets quickly, to facilitate the analysis of system parameters for operations or compliance. Storing data in the local storage 720 for at least the first predetermined time period can allow for fast and thorough access (e.g., by the components of controller 620) to a large set of stored information. For example, locally stored data may be accessed more quickly than remotely stored data, and is thereby more readily available for analysis by controller 620. In some cases, the local storage 720 allows for real-time data access to facilitate the analyses performed by controller 620, as described with respect to FIGS. 10-13. In this regard, the data stored in the local storage 720 may be used to determine automated or semi-automated control decisions, or other response processes.

In some embodiments, locally stored data may also be more robust than remotely stored data. For example, data stored in the local storage 720 may include raw and/or preprocessed sensor data that includes a very large number of data points, time steps, or values. In some cases, this sensor data may need to be compressed, modified, or otherwise altered to reduce the data size for remote storage (e.g., to save space), resulting in less robust data sets. In some embodiments, the local storage 720 also allows a user (e.g., of user device 654) to quickly and easily access these full, robust data sets in order to make operational adjustments, control decisions, analyze compliance or efficiency, etc.

After the first predetermined time period, at least a portion of the data can be assembled into packets and transmitted to remote storage 730 (e.g., the external databases 652) for long term storage. Similar to the local storage 720, the remote storage 730 may include any storage or memory device that is remote from a building that includes the rooms 702-708 and/or the controller 620. In one example, the remote storage 730 may be the same as, or functionally equivalent to, the external databases 652 described above. The long term data storage in the form of the remote storage 730 can maintain the data packets for accessibility upon request for a second predetermined time period (e.g., 1 year, 10 years, three TJC inspection periods, etc.). In some embodiments, the first time period is at least two compliance inspections cycles, as established by TJC, or about three months, and the second predetermine time period is at least one year. In some embodiments, the second predetermined time period is at least three years. Other time periods are contemplated and the time periods may be set based on the individual needs of a system or building, or may be determined by TJC or CMS.

Figure 10:
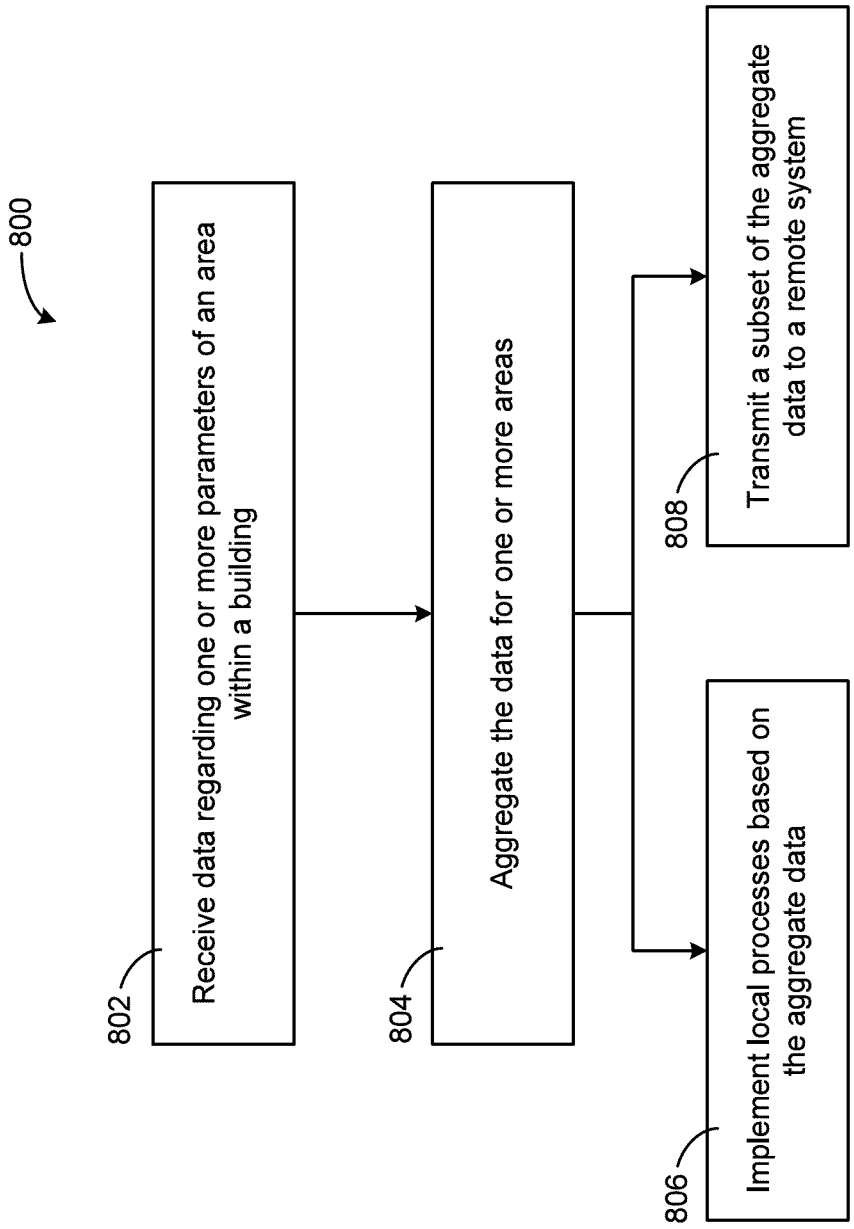
FIG. 10 is a flow diagram of a process for aggregating data from one or more areas of a building, according to some embodiments.

FIG. 10 is a flow diagram of a process 800 for aggregating data from one or more areas of a building or among multiple buildings, according to some embodiments. The process 800 can be implemented by the controller 620, for example. Data, typically including at least TPH data for a room or rooms of a building, can be received and aggregated from a network of buildings (e.g., hospitals) to improve control algorithms and predictive models, and can also be sold or used as a data source. In some embodiments, such as in a hospital setting, the aggregated information can include relevant patient outcomes correlated to TPH compliance, and other TPH related information gathered by a network of hospitals. It will be appreciated that certain steps of the process 800 may be optional and, in some embodiments, the process 800 may be implemented using less than all of the steps.

At step 802, data relating to one or more parameters of an area (e.g., a room) within a building is received. As described above with respect to FIG. 6, for example, data may include a variety of measurements captured by one or more sensors of a sensor array that indicate at least the TPH of a room. In some embodiments, the data may be received directly from a sensor array (e.g., the sensor array 608), but in other embodiments, the data may be received via a user input to a user device (e.g., a tablet or computer). In some embodiments, data may be received from a plurality of sensor arrays (e.g., the sensor arrays 712-718) corresponding to a plurality of rooms (e.g. the rooms 702-708) of a building (e.g., a hospital). In some embodiments, data is received from multiple buildings, BMSs, and/or building subsystems.

At step 804, the received data is aggregated for one or more areas or buildings. In some embodiments, data from one or more buildings, BMSs, and/or subsystems may be aggregated for a site or organization. For example, a single organization may own, operate, or monitor a plurality of buildings and may aggregate data received from each of the buildings. In another example, TPH data received from multiple hospitals may be aggregated into a single data set. In any case, data from multiple sources (e.g., sensor arrays, controllers, BMSs, etc.) may be aggregated to produce a complete data set for an organization or building.

At step 806, one or more local process can be implemented based on the aggregate data. The local process can include any of the processes described below with respect to FIGS. 10-13, for example. Local processes may include, for example, processing, analyzing, and/or storing the data to determine trend data and to identify or predict compliance issues. In some embodiments, such as for a hospital or a group of hospitals, the aggregate data can also be analyzed (e.g., by the controller 620) to statistically correlate patient outcomes to the aggregate data. For example, aggregate TPH data may be analyzed to determine an impact or correlation between a room TPH and a patient outcome.

At step 808, a subset of the aggregate data may be transmitted to a remote system. In some embodiments, the step 808 may be implemented concurrently with the step 806. In other embodiments, one of the steps 806 or the steps 808 may be implemented before the other. The subset of aggregate data may include a copy of at least a portion of the aggregate data, for example. In some embodiments, the subset of aggregate data may be transmitted to an external or remote system for oversight or additional monitoring. In some embodiments, the subset of aggregate data may be sold to a third party. For example, the data may be sold to an insurance company to negotiate a reduced insurance rate based on demonstrated compliance and correlated successful patient outcomes. Accordingly, for a hospital, a compliance cost savings may be calculated based at least in part on the aggregate information and the historical statistics. In some embodiments, a price of the aggregated data may be determined (e.g., by the controller 620) prior to sale. In this regard, the sale of aggregate data may increase revenue and/or decrease operating costs for a system.

In some embodiments, the aggregate data can be utilized to determine the trends or tendencies of individual users, or of groups of users. For example, in a hospital setting, the aggregate data may provide insight into the tendencies of a particular surgeon by comparing the TPH setpoints of an operating room with the surgeon's success rate. In another example, the aggregate data may be utilized to automatically set the TPH setpoints of a room based on the schedule of a user. For example, a schedule for an area or room (e.g., a patient room, an operating room) may indicate when the space will be in use, and may also define TPH setpoint for the period of use. In this example, a user (e.g., a nurse) may manually input (e.g., via user device 654) particular TPH parameters or setpoints, along with a start and a stop time, and the system (e.g., controller 620) may automatically control HVAC equipment based on the setpoints during the predetermined time period. In other embodiments, a third party scheduling system may be queried (e.g., via a secure interface) to determine an area's schedule and corresponding setpoints.

In some embodiments, the aggregate data can identify operational dependencies. For example, the aggregate data may be purchased by a manufacturer of HVAC equipment to improve future equipment designs, and to identify how equipment interacts to affect an environment. In some embodiments, the aggregate data can be used to improve efficiency. A hospital, for example, could use the aggregate data to improve energy efficiency by identifying TPH trends, or a company that constructs or designs hospitals could utilize the aggregate data to improve future building design and efficiency. Additionally, the aggregate data could be used to identify user preferences. For example, in a retail environment, the data could be used to determine comfortable TPH settings to improve a customer's experience.

Figure 11:
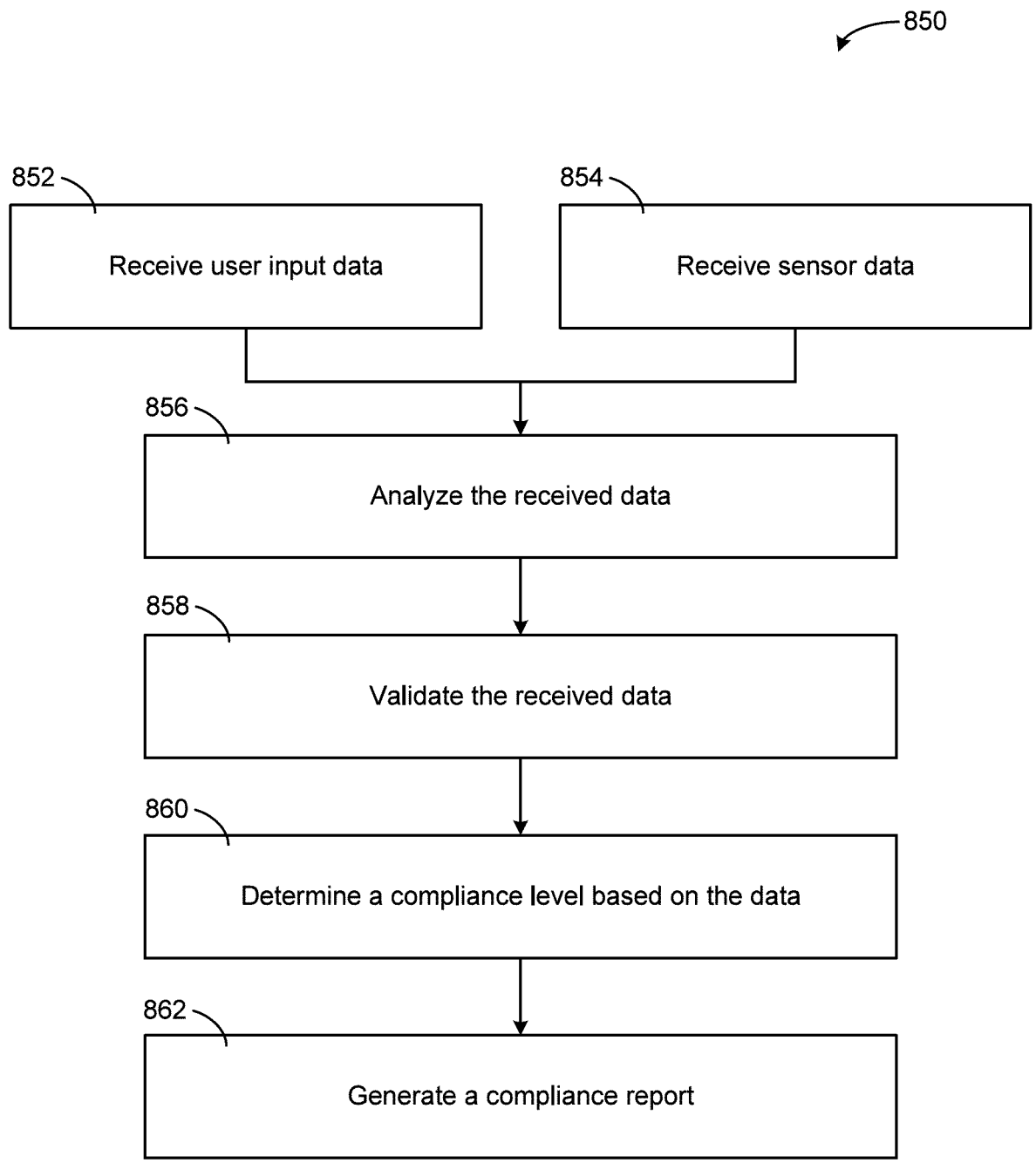
FIG. 11 is a flow diagram of a process for analyzing data for at least one area of a building, according to some embodiments.

FIG. 11 is a flow diagram of a process 850 for analyzing data for at least one area of a building, according to some embodiments. The process 850 can be implemented by the controller 620, for example. In general, the process 850 follows the flow of data, typically TPH data, for a room or building. In other words, the process 850 may provide a high-level overview of TPH data analysis for a room or building. It will be appreciated that certain steps of the process 850 may be optional and, in some embodiments, the process 850 may be implemented using less than all of the steps.

At step 852, data is received via a user input to a user device. As described above, for example, the user device (e.g., user device 654) may include a personal computer, a smart phone, a tablet, etc., that provides a user interface for accepting user inputs. In general, the user inputs include TPH values for a room of a building. Accordingly, the user interface presented via the user device may allow the user to indicate a room number, building, floor, or other identifier for the room. In one example, for a hospital, a user such as a nurse may manually enter TPH measurements via a portable user device (e.g., a table) when entering a room. The data may subsequently be automatically uploaded to a database and/or the controller 620.

At step 854, sensor data is received from a sensor array (e.g., the sensor array 608). In some embodiments, the step 854 may be implemented concurrently with the step 852. In other embodiments, one of the steps 852 or the steps 854 may be implemented before the other. It will also be appreciated that, in some cases, the step 852 is an optional step, and that no data may be received via user input. As described above with respect to FIG. 6, for example, sensor data may include a variety of measurements captured by one or more sensors of a sensor array (e.g., the sensor array 608) that indicate at least the TPH of a room. In some embodiments, data may be received from a plurality of sensor arrays (e.g., the sensor arrays 712-718) corresponding to a plurality of rooms (e.g. the rooms 702-708) of a building (e.g., a hospital).

At step 856, the received data is validated. It will be appreciated that any number of data validation rules may be applied based on individual implementations. Validation may include, for example, ensuring that appropriate data is received, checking the data's type and structure, etc. In some embodiments, validation includes converting data from a first format to a second format. In some embodiments, validation includes checking for corrupt data.

At step 858, the received data is analyzed. As briefly described above, analyzing the data may include comparing the data to compliance standards to determine if one or more parameters are out of compliance. A non-compliant parameter may indicate a problem with building equipment associated with the parameter. For example, non-compliant room temperature may indicate a faulty AHU. In this regard, the data may be analyzed in real-time to detect compliance issues as they occur. In some embodiments, TPH data is analyzed by comparing the TPH to acceptable ranges of values, as defined by a compliance governing body. For example, an acceptable humidity range for a patient room may be 40-60%. If TPH indicates a humidity outside of this range, the room may be non-compliant.

In some embodiments, data analysis include generating trend data for the room or building. As previously described, the trend data may indicating TPH measurements for the room or building at a plurality of time intervals of a period of time. The trend data may also be utilized to predict future compliance issues. For example, a downward trend in temperature values may indicate that a heater is struggling to provide an appropriate amount of warm air. Accordingly, predicted future trend data may be used to predict future compliance. The analysis of the data is described in greater detail below with respect to FIG. 12.

At step 860, a compliance level is determined for the room, building, system, etc., based on the data. In some embodiments, the compliance level simply indicates where one or more parameters of the TPH data are within a compliance range by comparing the measured TPH data and/or the trend data to a compliance standard, as described above. In such embodiments, the compliance level indicates whether or not the room, building, or equipment is completely compliant. In some embodiments, the compliance level for a room or building may be presented using a range. For example, the compliance level may be assigned a letter grade (e.g., A through F) or a color (e.g., green, yellow, red). In this case, the compliance level may be determined based on multiple parameters. For example, if a single one of the TPH value is non-compliant, the compliance level may be "yellow" while a "red" level may indicate that two more TPH values are non-compliant. In another example, a building may be assigned a compliance grade of a C if a certain percentage of rooms are non-compliant.

At step 862, a compliance report is generated. As described above, for example, the report generator 638 may generate a compliance report that summarizes TPH compliance for one or more rooms monitored by the controller 620. In some embodiments, the compliance report format is received/retrieved from a from a third party system (e.g., CMS or TJC), and can include an indication of information required to show compliance and a preferred format for the arrangement of the information. The report may include, for example, an indication of TPH for one or more rooms of a building, and may also indicate a time stamp associated with the TPH measurements. In some cases, the report may also include notes (e.g., input by a user) and/or an indication of a corrective action that was implemented in the event of non-compliance. The compliance report may be automatically populated with relevant data to satisfy the compliance reporting requirements of the third party system.

In some embodiments, the compliance report is separated into different sections detailing rooms by type, use, or other organizations categories, as desired by the third party system. In some embodiments, the report can include compliance problems identified and the corrective action taken to maintain parameter (e.g., TPH) within compliance. The report can include predictive information and preventative maintenance performed to maintain the TPH in compliance.

In some embodiments, the compliance report is generated in a portable document format (PDF), although it will be appreciated that any suitable format may be used. The compliance report may be generated dynamically, in response to a user request, or may be generated at a regular time interval. Accordingly, in some cases, previously generated reports may be stored in a database (e.g., the internal database 642 or the external databases 652). In some embodiments, the compliance report may be automatically or manually distributed to an inspector (e.g., via a third party system). In some such embodiments, the controller 620 may be configured to allow a third party system (e.g., the third party systems 602) to query information directly from the report generator 638 and the internal database 642. In some embodiments, the third party system may access compliance reports from the external databases 652.

Figure 12:
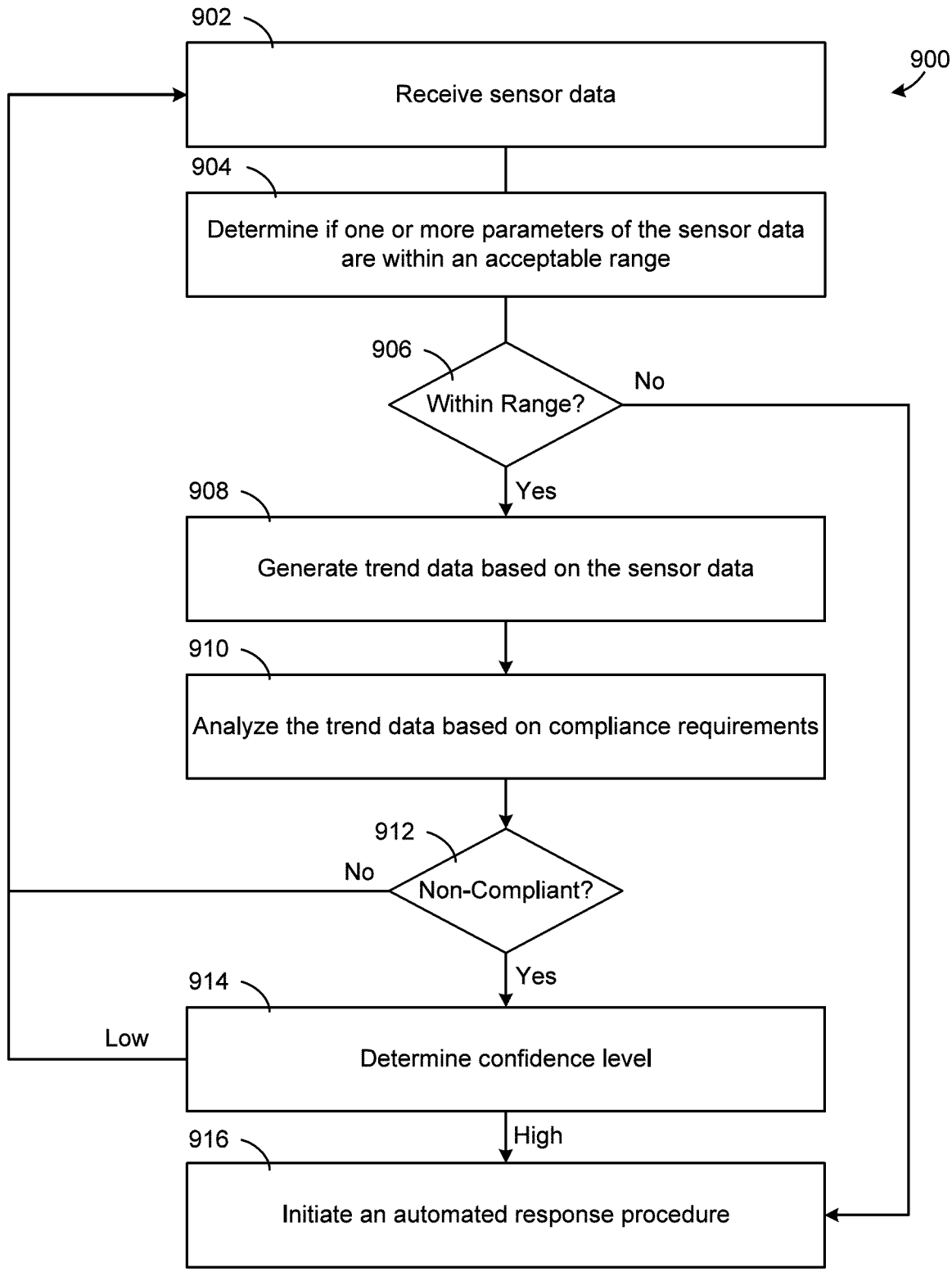
FIG. 12 is a flow diagram of a process for monitoring compliance of a BMS subsystem, according to some embodiments.

FIG. 12 is a flow diagram of a process 900 for monitoring compliance of a BMS subsystem, according to some embodiments. Like the other processes described herein, the process 900 can be implemented by the controller 620. When implemented by a controller such as the controller 620, the process 900 may, beneficially, automate at least a portion of the steps required to determine compliance for a building and/or a BMS. Additionally, the process 1900 may allow for the prediction of potential compliance issues, which may in turn allow for preemptive maintenance or corrective actions to avoid these compliance issues. Accordingly, by implementing the process 900, a system (e.g., the BMS 400) may experience less down time due to compliance issues or equipment problems and may maintain compliance for longer periods of time. In this regard, the process 900 may provide a better and safer experience for occupants of a building (e.g., patients in a hospital). It will be appreciated that certain steps of the process 900 may be optional and, in some embodiments, the process 900 may be implemented using less than all of the steps.

At step 902, sensor data is received. In some embodiments, step 902 may be substantially similar to the steps 802, 852, and/or 854, as described above. In other words, the sensor data may relate to one or more parameters of an area (e.g., a room) within a building, and generally includes at least TPH measurements for the room. The sensor data may be received from a sensor array (e.g., the sensor array 608) located within a particular room (e.g., the room 606). In some embodiments, the data may be received directly from a sensor array (e.g., the sensor array 608), but in other embodiments, the data may be received via a user input to a user device (e.g., a tablet or computer).

At step 904, the sensor data is analyzed to determine if one or more parameters are within an acceptable range. In some embodiments, the range of acceptable parameters includes ranges for each of TPH for a room. The range may be determined by a compliance standard received or retrieved from a third party such as TJC or CMS. In this regard, the range may indicate an upper and a lower threshold feature for each of the TPH for a room. If the sensor data for the room indicates a TPH within the range, the sensor data or room may be deemed compliant and the process 900 may continue to the step 908. In the event that one or more of the TPH is not within a corresponding range, the sensor data or room may be deemed non-compliant. Accordingly, the process 900 may continue to the step 916, described in detail below.

In some embodiments, compliance standards are received from a remote database (e.g., the external databases 652) or server (e.g., the servers 604) associate with a governing body such as TJC or CMS. In this regard, the compliance standards may be continuously or dynamically updated. For example, new compliance standards may be retrieved at a regular time interval to maintain accurate compliance standards. In another example, compliance standards stored or referenced by the controller 620 may be updated in response to TJC or CMS updating the compliance standards. In other embodiments, compliance standards may be manually entered (e.g., by a user).

At step 908, trend data is generated based on the sensor data. As described above, the trend data generally indicates the TPH values of the room (e.g., the room 606) for each of a plurality of previous time steps over a time period. In other words, the trend data is time series data corresponding to TPH values for a room or area of a building. In some embodiments, the trend data is generated using historical sensor data that is retrieved from a database (e.g., the internal database 642 or the external databases 652). In this regard, the trend data may be dynamically generated or updated as new sensor data is received.

In some embodiments, a predictive model is used to generate a prediction of future trend data. The predictive model can be any suitable type of neural network, machine learning model, or other artificial intelligence system. The model predictive is generally selected or designed for a specific installation (i.e., a particular building), and may be configured for the TPH dynamics of the particular building. In some embodiments, the predicative model (e.g., an artificial intelligence system) may be structured to learn the specific TPH dynamics of a building over time. In this regard, the predicative model may also be dynamically or continuously updated as new senor data is received. In some embodiments, as described in greater detail below, the predictive model is dynamically modified using a reinforcement learning schema to improve the accuracy of trend data predictions over time. The generation of a prediction of future trend data and/or future compliance issues is described in greater detail with respect to FIG. 13.

At step 910, the trend data is analyzed based on the compliance standards. In other words, the trend data and predicted trend data may be analyzed to determine if one or more parameters (e.g., one of TPH) is trending in a manner that indicates future compliance issues. Predicted trend data, for example, may indicate whether one or more of TPH could become non-compliant in the near future (e.g., within a future time period). In some embodiments, the trend data may be analyzed using a machine learning algorithm, a neural network, an artificial intelligence system, as described below with respect to FIG. 13, or by another method to generate a prediction of future compliance for a room or building. If future non-compliance is predicted based on the trend data, the process 900 may continue to the step 914. If the TPH for the room or building is predicted to remain compliant, at least for a predefined future time period, then the process 900 may restart back at the step 902.

At step 914, a confidence level is calculated for the compliance determination. The confidence level may generally indicate an accuracy of the predicated future compliance. In other words, a high confidence level may indicate that the prediction is likely correct, whereas a low confidence level may indicate that the predication may be incorrect. In embodiments, the confidence level may be represented as a percentage (e.g., where 100% indicates a completely accurate prediction), a number value, etc. In such embodiments, the confidence level may be compared to a threshold, where a prediction with a confidence level over the threshold is assumed to be correct and a prediction with a confidence level below the threshold is assumed to be incorrect. In the first case, with a high confidence level, the process 900 may continue to step 916. If the confidence level is determined to be too low, the process 900 may restart at the step 902.

At step 916, automated response processes are initiated. As described above, the automated response processes may include corrective actions that may be implemented to correct non-compliance or to prevent predicted compliance issues. In some embodiments, the automated response processes include controlling building equipment (e.g., HVAC equipment) in order to affect at least one of the TPH for a room or building. For example, the automated response process may include adjusting a setpoint, increasing the output of a building device, activating additional equipment to supplement a primary device, etc. In some embodiments, controlling the building equipment may include activating (e.g., controlling) one or more supplementary or complementary systems in order to provide additional capacity or additional functionality to a primary system. For example, if a component of a primary system fails, which causes a compliance issue, a supplementary system that is substantially similar to the primary system may be active to correct the issue. In any case, the equipment may be controlled to bring the TPH for the room back into compliance.

In some embodiments, the automated response processes include the generation of a work order. The work order may indicate that a repair to equipment may be required to correct or prevent compliance issues. In some embodiments, the work order may indicate at least an identifier associated with affected equipment, and in some cases may indicate a type of service to be performed. In some embodiments, the automated response processes may also include scheduling maintenance or repairs for affected equipment. The work order and/or maintenance request can be transmitted to a separate work order or maintenance system, or may be transmitted directly to one or more users (e.g., maintenance technicians). In this regard, the work order may allow for the one or more users to initiate additional response processes to mitigate and/or quickly resolve compliance issues.

In some embodiments, the automated response processes include the generation of an alarm or a notification. The alarm or notification may be provided (e.g., transmitted) to a user, a group of users, an outside or third party system, a vendor of a component, or another entity suitable to address an issue or problem that caused the generation of the alarm or notification. In some embodiments, the alert or notification may indicate detected or predicted compliance issues and may even indicate a room, building, or equipment associated with the issue. The alert or notification may be automatically transmitted (e.g., via text message, voice call, email, push notification, etc.) to a device associated with a user (e.g., a facilities manager) or a group of users (e.g., a maintenance team) to indicate the users to the potential issue.

In some embodiments, the automated response process includes generating a report. The report may be similar to a compliance report, as described above. The report may indicate, for example, a summary of the trend data and/or the trend data analysis. In some cases, the report may also indicate a location or indicator of a room or building that is non-compliant. When a compliance issue is predicted based on trend data, rather than detected from sensor data, the report may also include an indication of when the compliance issue may occur. In some embodiments, the report includes a time range or an indication of a time period when the compliance issues are expected to occur.

Figure 13:
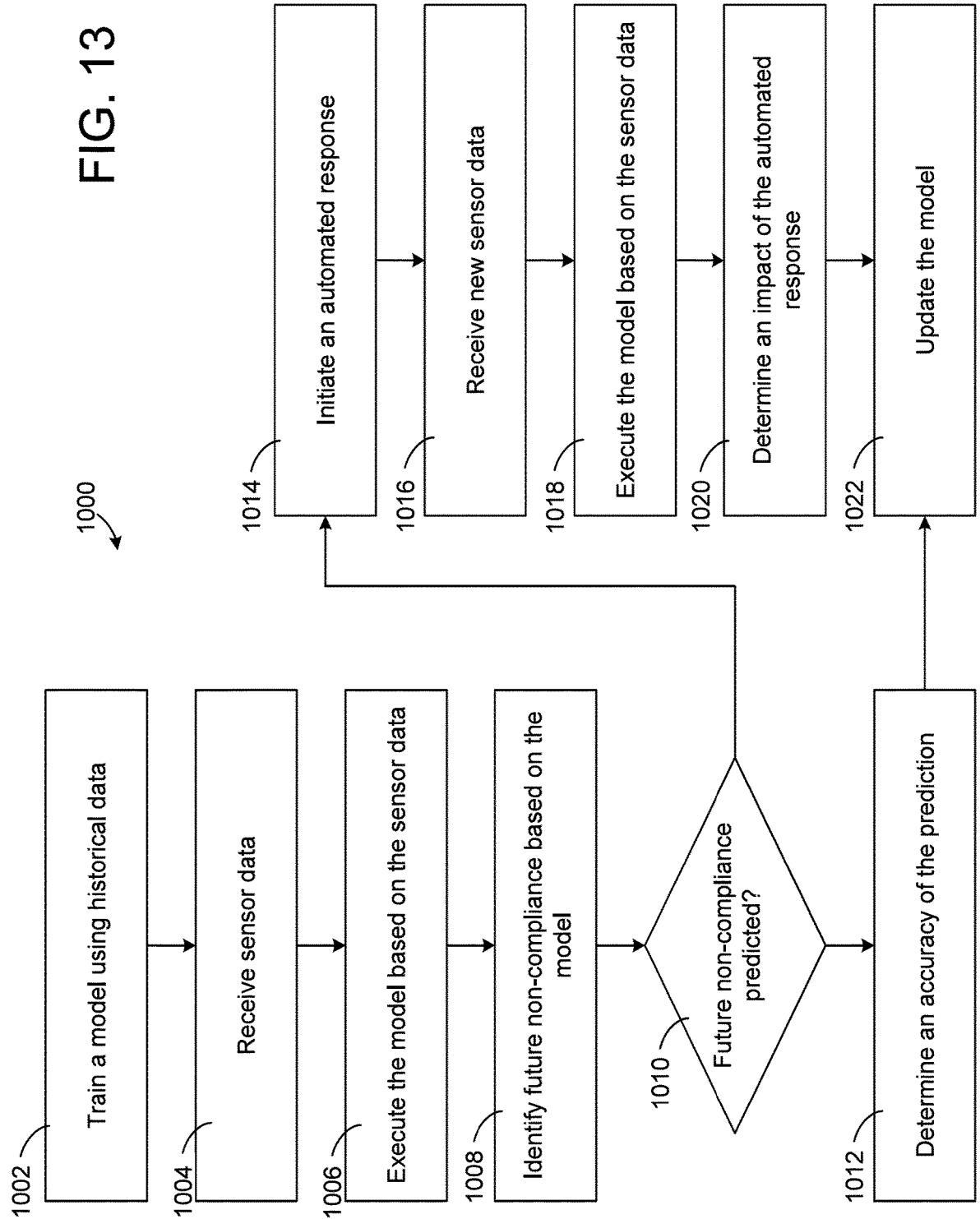
FIG. 13 is a flow diagram of a process for predicting non-compliance of BMS subsystems using a predictive model, according to some embodiments.

FIG. 13 is a flow diagram of a process 1000 for predicting non-compliance of BMS subsystems using a predictive model, according to some embodiments. Like the other processes described herein, the process 1000 can be implemented by the controller 620. Generally, the process 1000 facilitates the prediction of potential, future compliance issues by analyzing sensor data using a predictive model. As describe above, the predictive model described herein can be any suitable type of neural network, machine learning model, or other artificial intelligence system. The model predictive is generally selected or designed for a specific installation (i.e., a particular building), and may be configured for the TPH dynamics of the particular building. In some embodiments, the predicative model (e.g., an artificial intelligence system) may be structured to learn the specific TPH dynamics of a building over time.

By predicting compliance issues early, equipment associated with non-compliant parameters may be repaired, maintained, or adjusted to prevent the compliance issues. This may result in less down time for the equipment and, in some cases, reduced repair costs. Additionally, preventing future compliance issues may help a facility or organization avoid costly penalties, increased insurance, etc. In some cases, such as in a hospital setting, decreased compliance issues may also lead to more positive patient outcomes and an overall better patient experience. It will be appreciated that certain steps of the process 1000 may be optional and, in some embodiments, the process 1000 may be implemented using less than all of the steps.

At step 1002, a predictive model is trained using historical data. The historical data may include any previous recorded data corresponding to parameters of a room or building, including at least TPH data. The historical data may be retrieved from a database (e.g., the internal database 642 and/or the external databases 652) when initializing the model for training. In some embodiments, the historical data is divided into a training set and a test set, where the training set is used to train and tune the model (e.g., the weights and other parameters of the model) to identify compliance issues and/or to predict future trend data. The test set may be used to validate the training of the model and/or to further fine-tune the model.

At step 1004, sensor data is received. In some embodiments, the step 1002 may be substantially similar to any of the steps 802, 852, 854, and/or 902 as described above. In other words, the sensor data may relate to one or more parameters of an area (e.g., a room) within a building, and generally includes at least TPH measurements for the room. The sensor data may be received from a sensor array (e.g., the sensor array 608) located within a particular room (e.g., the room 606). In some embodiments, the data may be received directly from a sensor array (e.g., the sensor array 608), but in other embodiments, the data may be received via a user input to a user device (e.g., a tablet or computer).

At step 1006, the predictive model is executed using the sensor data. The sensor data may be fed into the trained predictive model to generate an output data set. The output of the model can be predicted future trend data and/or predicted future sensor data values. In some embodiments, the output includes at least predicted future TPH values (i.e., the trend data). In this regard, the predictive model may also be executed based on previously received and/or analyzed sensor data, and/or other historical TPH data. The predicted future trend data generally indicates predicted values for at least one of a temperature, pressure, or humidity (TPH) for a room or building at one or more future time steps of a time horizon. In some embodiments, the predictive model may also generate and/or indicate a confidence score for the prediction. Similar to the step 914, above, the confidence score may indicate a likelihood of the prediction coming to fruition. In other words, the confidence score may indicate how reliable a prediction may be.

At step 1008, future compliance is predicted based on the predictive model. Future compliance may be predicted by analyzing the predicted trend data in a similar manner to the step 910, above. For example, the future trend data can be analyzed to determine if the predicted TPH trend data is moving towards the upper and/or lower limits of a threshold range. As described above, acceptable compliance values may be determined from previously received compliance standards. In this regard, the predicted trend data may be compared to the compliance standards to determine if, at any point in a future time period, the trend data (e.g., one of TPH) is predicted to exceed the compliance standards.

In some embodiments, the predicted trend data is passed through a second predictive model to identify potential compliance issues. In this case, the second model may be configured to identify predictors of future non-compliance based on predicted trend data and/or sensor data. Accordingly, the second model may output a prediction of compliance (e.g., a compliance level). In some embodiments, a confidence level for the prediction at the step 1006 may also be utilized to determine future compliance. For example, a high confidence score, which indicates a high likelihood of the prediction, may be used while a low confidence score, indicating uncertainty in the prediction, may be ignored. In some embodiments, the confidence score for the prediction may be compared to a threshold, where only confidence scores above the threshold are determined to be usable. If future compliance issues are predicted, the process 1000 may continue to the step 1014. If no compliance issues are predicted, the process 1000 may continue to the step 1012.

At step 1012, the accuracy of the prediction is determined. The accuracy may be determined by analyzing subsequently received sensor data to determine if, in fact, compliance issues were avoided. In some embodiments, an expert user may manually review predictions and associated confidence values, and/or sensor data to determine whether the predictive model is making accurate predictions. It will be appreciated, however, that other methods of determining the accuracy of the predictive model are contemplated herein. In some embodiments, a high accuracy value may indicate that the predictive model is making very accurate predictions. For example, if the prediction indicates that there is a low likelihood for compliance issues, and no compliance issues occur within a future time period, then the prediction may be highly accurate. A low accuracy value may indicate that the prediction was incorrect, and the model may need to be adjusted.

At step 1014, an automated response process is initiated. In this regard, the step 1014 may be substantially similar to the step 916, described above. The automated response process may include, for example, controlling building equipment (e.g., an HVAC device) to adjust an output, such as by increasing capacity, changing a setpoint, activating a second (e.g., supplementary) system, etc. In some embodiments, the automated response process includes automatically generating a work order and/or scheduling maintenance or repairs. In some embodiments, the automated response process may be as simple as generating and transmitting an alert or a notification.

At step 1016, new sensor data is received. The step 1016 may be substantially similar to the step 1004, in some cases. In other words, the new sensor data generally includes the same type of data received at the step 1004, however, the new sensor data is received after initiating a response process at the step 1014. In some embodiments, this means that the new sensor data may be associated with TPH values collected after equipment is repaired or after one or more devices are controlled to affect an out.

At step 1018, the predictive model is executed using the new sensor data, in a manner similar to the step 1006. In this regard, the predictive model may generate new predicted trend data based on the new sensor data. Subsequently, at the step 1020, the new predicted trend data can be analyzed (e.g., compared to a compliance standard) to determine an impact of the automated response process. In some embodiments, the analysis determines whether the new predicted trend data is improved over the trend data predicted at the step 1006. In this regard, the analysis of the new trend data may determine whether predicted future compliance issues have been resolved. For example, if the previously predicted trend data indicates predicted future non-compliance and the new predicted trend data does not, the automated response process may be deemed as having a positive impact. More generally, the new trend data may be analyzed to determine whether the automated response process has a positive or a negative impact with respect to prevent future compliance issues.

At step 1022, the predictive model is updated. Updating the model may increase the speed and accuracy of the model over time, by comparing the accuracy of a prediction to an actual result or by identifying positive or negative impacts of a response process. In some embodiments, the predictive model is dynamically updated or improved through reinforcement learning. Reinforcement learning can include generating a reward value based on either the prediction made by the predictive model (e.g., at the step 1008) and the accuracy of the prediction, or the impact of the automated response processes.

As an example, an automated response process that is determined to have a positive impact on correcting future compliance issues may be assigned a large or positive (e.g., when compared to an initial, baseline, or previous reward value) reward value. In another example, a prediction that is determined to be inaccurate may be assigned a small or negative reward value. Accordingly, large or positive reward values may indicate a "good" prediction or automated response that can be repeated or reused in the future for similar condition. When a reward value is negative or small, the associated prediction of response process may be identified as "bad", and the predictive model may be adjusted accordingly.

Temperature, Pressure, and Humidity System

Figure 14:
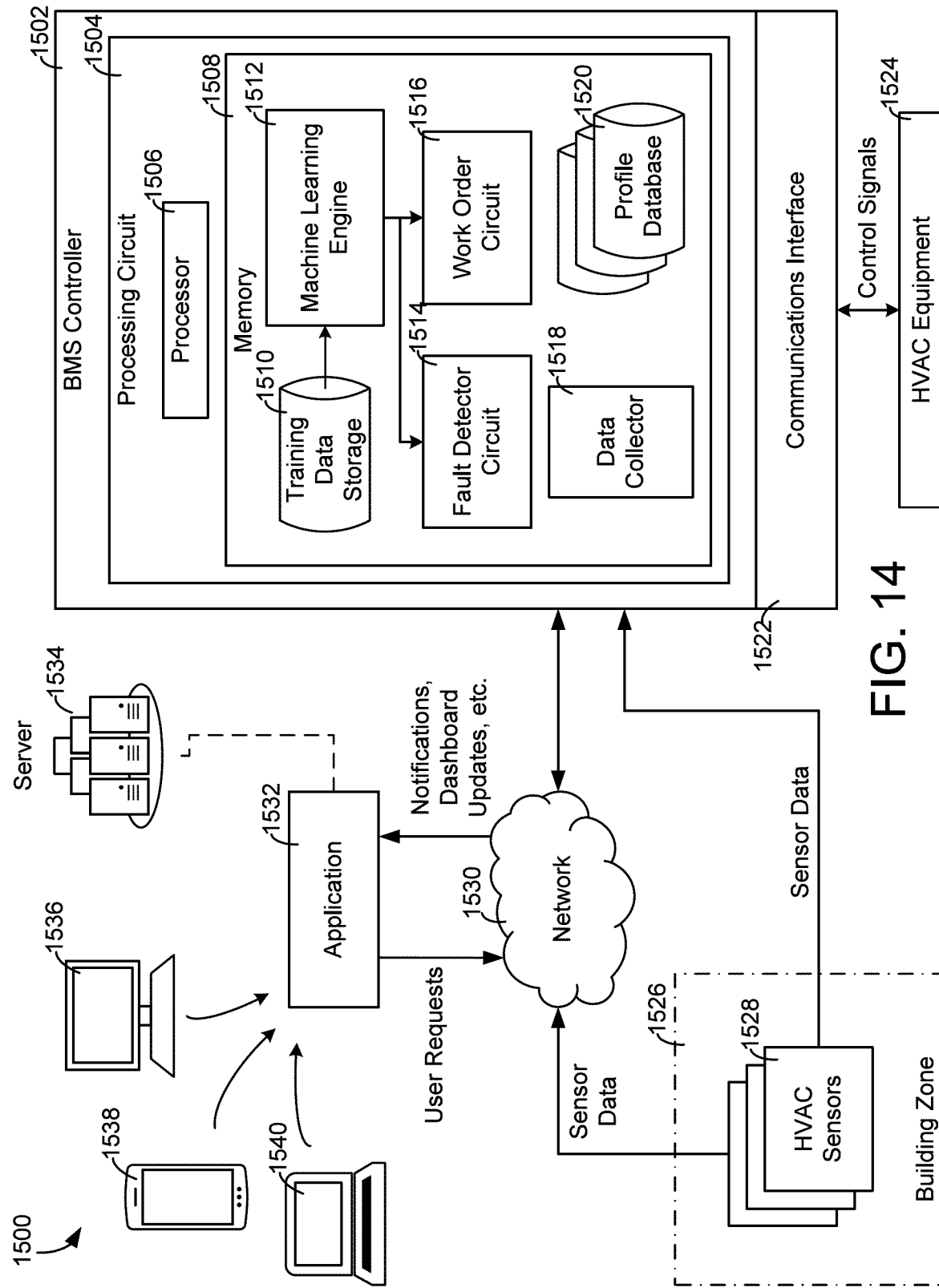
FIG. 14 is a diagram of a BMS for optimizing building conditions based on user input, which can be used in the building of FIG. 1, according to some embodiments.

As shown in FIG. 14, a system 1500 for controlling TPH is structured to receive user input regarding HVAC systems (e.g., the waterside system 200, the airside system 300, the BMS system 400, etc.) within the building 10, and adjust control based on the user input. The system 1500 may include any combination of aspects described herein. For example, the HVAC equipment 1524, as described below, may include the pumps 234 and the fan 338, described reference to FIGS. 2 and 3 or other components, as desired. The system 1500 includes a BMS controller 1502, the HVAC equipment 1524, a building zone 1526, a network 1530, an application 1532, a server 1534, and user devices 1536-1540.

In some embodiments, the BMS controller 1502 may be similar to BMS controller 366 as described above with reference to FIG. 4. In some embodiments, BMS controller 1502 incorporates additional features or functionality that allow for improved TPH control. The BMS controller 1502 includes a processing circuit 1504 communicably connected to a communications interface 1522 so that the processing circuit 1504 can send and receive data via the communications interface 1522. The processing circuit 1504 includes a processor 1506 and a memory 1508.

The processor 1506 can be implemented as a general purpose processor, an application specific integrated circuit (ASIC), one or more field programmable gate arrays (FPGAs), a group of processing components, or other suitable electronic processing components. The memory 1508 (e.g., memory, memory unit, storage device, etc.) can include one or more devices (e.g., RAM, ROM, Flash memory, hard disk storage, etc.) for storing data and/or computer code for completing or facilitating the processes, layers and modules described in the present application. Memory 1508 can be or include volatile memory or non-volatile memory. The memory 1508 can include database components, object code components, script components, or any other type of information structure for supporting the activities and information structures described in the present application. According to an example embodiment, the memory 1508 is communicably connected to the processor 1506 via the processing circuit 1504 and includes computer code for executing (e.g., by the processing circuit 1504 and/or the processor 1506) one or more processes described herein.

In some embodiments, the BMS controller 1502 is implemented within a single computer (e.g., one server, one housing, etc.). In some embodiments, the BMS controller 1502 is distributed across multiple servers or computers (e.g., that can exist in geographically separated locations). The memory 1508 includes a training data storage 1510, a machine learning engine 1512, a fault detector circuit 1514, a work order circuit 1516, a data collector 1518, and a profile database 1520. While the systems and methods disclosed herein generally refer to building control within hospitals and clinics, other types of buildings, campuses, and floorplans may implement the systems and methods disclosed herein, including data centers, fish hatcheries, pharmaceutical labs, and office buildings. Additionally, while the BMS controller 1502 is shown to handle processing related to collecting data, storing profile databases, artificial intelligence, etc., some or all of this functionality may be performed in a distributed group of processors, memories, etc., or within cloud processed applications (e.g., the application 1532).

The training data storage 1510 may be configured to store data used for training one or more machine learning components within the system 1500. For example, the training data storage 1510 is shown providing training data to the machine learning engine 1512. In some embodiments, training data includes previous fault data related to the system 1500 allowing the machine learning engine 1512 to develop intelligence that predicts solutions to faults in HVAC systems. For example, the training data storage 1510 may include hundreds of previous faults (e.g., stuck dampers, failed pumps, overheating boilers, stuck valves, incorrect installations, etc.) from HVAC equipment 1524. In some embodiments, the training data storage 1510 includes a remote database that can be queried by the BMS controller 1502 to receive the training data or a portion of the training data. In some embodiments, the training data storage 1510 is located locally within the BMS 502 and stores a local set of training data.

The machine learning engine 1512 is structured to receive the training data from the training data storage 1510 and determine trends in which solutions were implemented for correlated faults. For example, restarting a controller/actuator assembly in response to a stuck damper fault. Upon developing the intelligence for predicting solutions for particular faults, the BMS controller 1502 may then be able to provide the application 1532 with a recommended solution to a fault. The fault solution functionality described herein may be similar to fault prediction systems and methods described in U.S. Patent Publication Application No. 2019/0041882 filed Aug. 3, 2017, the entire disclosure of which is incorporated by reference herein.

In some embodiments, the training data includes previous fault data related to the system 1500 such that the machine learning engine 1512 can develop intelligence for predicting solutions to work orders in HVAC systems. Work orders may be submitted via one or more building occupants (these and other information and/or requests are submitted via the application 1532, which is described in greater detail below) or generated automatically either locally by a component that recognizes service is required, a central service prediction system, a fault detection system, or other automated systems. The work orders may include standard equipment updates such as "Pump A requires an oil change" or "Calibrate Actuator C." However, the work orders may also include specific requests from building occupants. For example, a nurse on a hospital floor may send a request from their user device 536 via the application 1532 to replace a lightbulb in a patient room. The BMS controller 1502 may receive the user request via the network 1530 and provide a recommended solution for the work order to a technician. The solution may be based on one or more previously filed work orders that may be similar to the current work order. In the above example, this solution may be "Replace single light bulb in Room A5—GE U-Bend Fluorescent Bulb (T8/Medium)." The inclusion of the recommended solution within the work order facilitates a quicker completion time of the work orders.

In some embodiments, the machine learning engine 1512 utilizes decision trees, generated models via a model predictive architecture, trend analyses, neural networks, deep neural networks, reinforcement learning, and other machine learning and artificial intelligence schemes that improve over time and improve predictions of the BMS controller 1502. No matter the specific implementation of the machine learning engine 1512, the training data is utilized to develop a machine learning scheme structured to receive inputs in the form of faults or work requests, and provide a recommended solution. As described herein, users may refer to facility managers, technicians, nurse managers, compliance officers, nurses, doctors, and other building occupants.

The fault detector circuit 1514 is structured to determine that a fault has occurred in a system of component. In some embodiments, the fault is a sensed failure of a system or component, a manually entered fault of a system or component, or a user request (e.g., the lightbulb example described above). The fault detector circuit 1514 is structured to provide the fault to the machine learning engine 1512, and to receive a recommended solution from the machine learning engine 1512. The fault detector circuit 1514 then sends the fault and the recommended solution to the work order circuit 1516. For example, the fault detector circuit 1514 may send the fault and recommended solution to the interface of a user device 536 via the application 1532.

The work order circuit 1516 is structured to receive the fault and recommended solution from the fault detector circuit 1514 and assemble a work order for distribution to relevant users via the network 1530 and the application 1532. In some embodiments, the work order circuit 1516 assigns a priority to the generated work order based on the urgency of the work order. For example, a light bulb change has a significantly lower priority than a work order directed to a chiller fault that may materially affect TPH in a critical area.

The data collector 1518 receives user requests for work orders, user requests for information, sensor data, queried database information, and other information via the communications interface 1522. In the event that a user requests information (e.g., TPH data for March, 2020 for building zone A, etc.), data collector 1518 may query a database for the requested information and provide the information to the user via the application 1532.

The profile database 1520 stores profiles of users of the application 1532. For example, if the application 1532 is implemented for employees of a hospital, the users may include nurses, service technicians, maintenance workers, administrators, doctors, facility managers, utilities managers, etc. may have access to the application 1532. In some embodiments, each individual provided access to the application 1532 is assigned a profile defining what information is available to the individual user. In some embodiments, each user profile defines a dashboard designed to provide information relevant to the user's role. For example, nurses may not need to see predicted fault solutions for faults being detected in a chiller bank. The nurse in this example may access a dashboard that provides available scheduling information related to TPH and room availability, real time monitors of assigned rooms TPH, etc. The profiles generated for each user (e.g., employee, building occupant, etc.) may be stored in a separate database (e.g., server 1534) or within the BMS controller 1502. The profiles may be generated for the users upon registration in the application 1532.

In some embodiments, the profile database 1520 allows users to adjust preferences within the assigned profile. For example, displayed TPH parameters and/or other parameters in building zone 1526 may be adjusted by the user. A doctor may prefer a cold and dry environment during surgery and may enter the preferences within their assigned profile. As such, the OR room in which the doctor is performing surgery is set to their preferred TPH levels, per a request sent via the application 1532. The BMS controller 1502 may maintain TPH levels within the OR according to compliant ranges, while making a best effort to satisfy the doctor's preferences. The above example shows how the BMS controller 1502 maintains compliance that is required per building code (e.g., ASHRAE standard 170, etc.) while also providing custom HVAC control and comfortability to users.

The communications interface 1522 can facilitate communications between the BMS controller 1502 and external systems (e.g., the application 1532, the HVAC equipment 1524, the monitoring and reporting applications 422, the enterprise control applications 426, the remote systems and applications 444, the applications residing on client devices 448, etc.) for allowing user control, monitoring, and adjustment to the BMS controller 1502. The communications interface 1522 can also facilitate communications between the BMS controller 1502 and the client devices 448. The communications interface 1522 may facilitate communications between the BMS controller 1502 and the building subsystems 428 (e.g., the HVAC, the lighting security, the lifts, the power distribution, the business, etc.). The communications interface 1522 may be configured to facilitate communication between components within the system 1500, including the network 1530, the HVAC sensors 1528, the HVAC equipment 1524, the server 1534, and the user devices 1536-1540.

The communications interface 1522 can be or include wired or wireless communications interfaces (e.g., jacks, antennas, transmitters, receivers, transceivers, wire terminals, etc.) for conducting data communications with the application 1532 or other external systems or devices. In embodiments, communications via the communications interface 1522 can be direct (e.g., local wired or wireless communications) or via a communications network such as the network 1530 (e.g., a WAN, the Internet, a cellular network, etc.). For example, the communications interface 1522 can include an Ethernet card and port for sending and receiving data via an Ethernet-based communications link or network. In another example, the communications interface 1522 can include a Wi-Fi transceiver for communicating via a wireless communications network. In another example, the communications interface 1522 can include cellular or mobile phone communications transceivers. In one embodiment, the communications interface 1522 is a power line communication. In other embodiments, the communications interface 1522 is an Ethernet interface.

The building zone 1526 may be configured to represent a region within building 10, including floors, spaces, zones, rooms, hallways, areas, and any other location within building 10. In one embodiment, the building zone 1526 is an operating room (OR) in a hospital. In another example, the building zone 1526 is a hospital floor. In another example, the building zone 1526 is a region within a building that spans one or more floors. The building zone 1526 may be known to the BMS controller 1502 such that information may be displayed on the application 1532 that is specific to the building zone 1526. In some embodiments, the building zone 1526 spans across several buildings, such that the building zone 1526 acts as a campus (e.g., a hospital campus, etc.). While only a single building zone (the building zone 1526) is shown in FIG. 14, several building zones may be monitored by the BMS controller 1502. For example, the BMS controller 1502 is providing TPH data to the application 1532 for 20 different building zones: five pertaining to OR's, five pertaining to administrative areas, five pertaining to waiting rooms, and five pertaining to patient rooms. The number of building zones and types of building zones are non-limiting.

The HVAC sensors 1528 can be or include any number and type of building sensors, including temperature sensors, pressure sensors, humidity sensors, flow sensors, and positional sensors. In some embodiments, the HVAC sensors 1528 include temperature, pressure, and humidity sensors configured to monitor the TPH levels within the building zone 1526. The HVAC sensors 1528 may be configured to transmit measurements wirelessly or wiredly. In some embodiments, the HVAC sensors 1528 are plug-n-play (PnP) sensors configured to transmit data wirelessly over a building automation protocol.

The network 1530 may include any combination of computational and/or routing devices configured to move data from one computer or device to another. The network 1530 may act as a local network than employs local area network (LAN) functionality. In other embodiments, the network 1530 includes campus, backbone, metropolitan, wide, cloud, and internet scope. For example, the network 1530 may be connected to off-premise servers that can implement cloud networking. This may allow the application 1532, for example, to access an off-premise server (e.g., server 1534) to retrieve data. In other embodiments, the application 1532 is stored in server 1534 off-premise and can be hosted on user devices 1536-1540 due to the cloud networking functionality of the network 1530.

In some embodiments, the network 1530 includes building automation protocol functionality (e.g., Building Automation and Control networks (BACnet), Modbus, etc.) such that devices within the system 1500 may communicate with one another with previously implemented software that allows for such. In some embodiments, the system 1500 is configured to operate under Metasys® protocols, as designed by Johnson Controls, Inc. In other embodiments, the system 1500 is configured to operate under Verasys® protocols, as designed by Johnson Controls, Inc. In embodiments, the network 1530 can facilitate communication across any number of building automation protocols, area networks, on premise networks, off-premise networks, and any combination thereof.

The application 1532 may include features and functionality that allow users (e.g., via user devices 1536-1540) to interact with the BMS controller 1502. In some embodiments, users can place requests for work orders, view TPH data relating to the building zone 1526, view faults within the system 1500, receive suggested fault solutions, and receive updates related to the application 1532. The application 1532 may be implemented entirely on a user device, or may merely be hosted on a user device and stored on a server. The application 1532 may be implemented as a software as a service (SaaS), infrastructure as a service (IaaS), platform as a service (PaaS), mobile backend as a service (MBaaS), or any other cloud computing method.

The server 1534 may be or include one or more servers, processing circuits, processors, memory, or any combination thereof for storing and hosting software applications, including the application 1532. The server 1534 may be located on premise (e.g., within building 10, on a server within building 10, on a computer's memory within building 10, hosted peer-to-peer between devices within building 10, etc.) or off-premise (e.g., via cloud computing, etc.). In some embodiments, the processes for implementing the application 1532 may be distributed across multiple servers.

User devices 1536-1540 may include any type of smartphone, tablet, computer, workstation (e.g., terminal, etc.), personal display device, or laptop. In some embodiments, user devices 1536-1540 host the application 1532 and communicate with the BMS controller 1502 via the network 1530. User devices 1536-1540, while shown to include only three devices in FIG. 14, can include more or less that three devices. For example, every employee may be given access and a profile for the application 1532. Each device used by a user to access the application 1532 may be considered a user device as described herein. In some embodiments, the user device may be permanently installed in a physical location and an interactive panel or kiosk. In some embodiments, a user can login into their profile using the user device so that a single user device is usable by more than one user.

BMS with Work Order Generation

Figure 15:
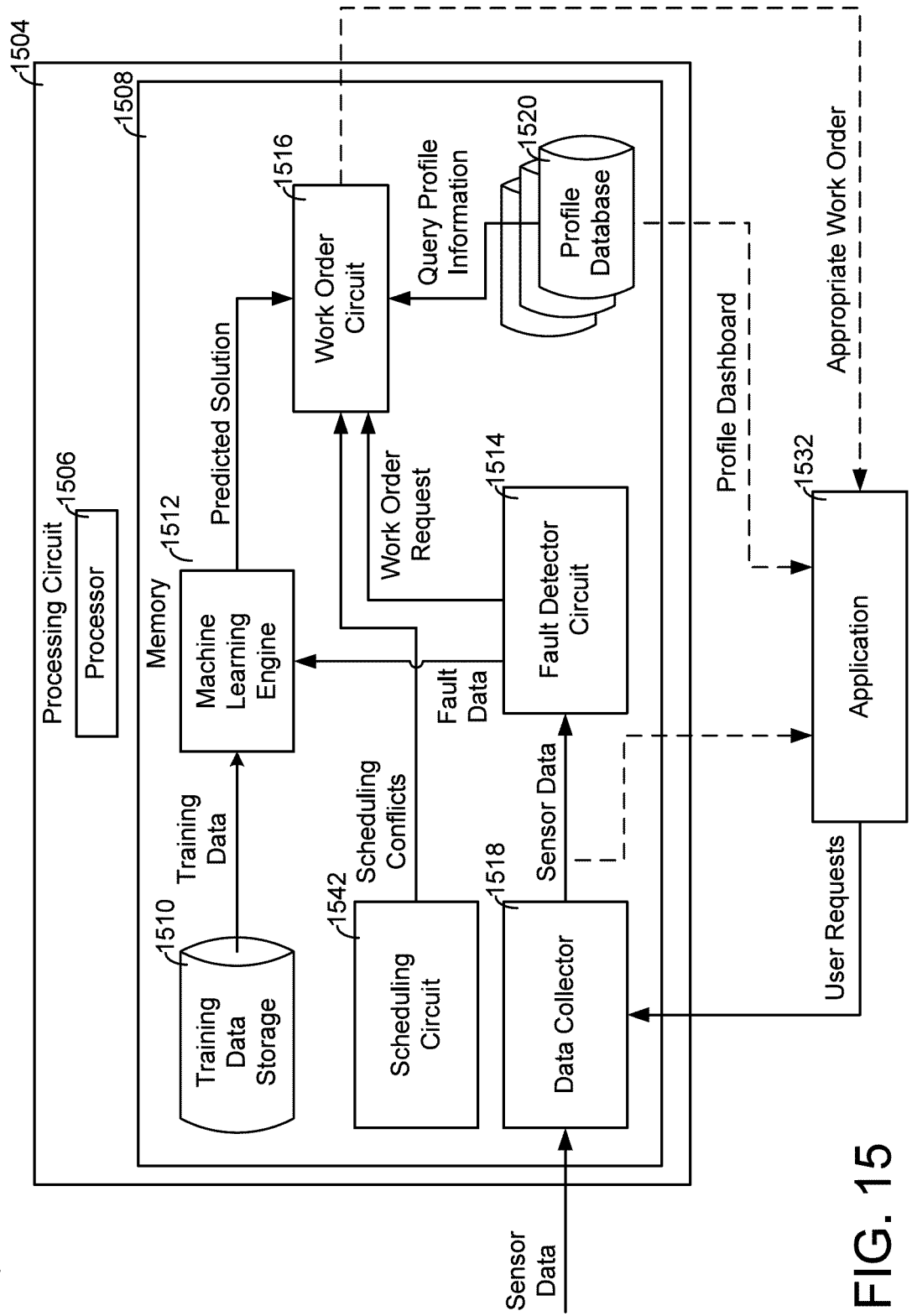
FIG. 15 is a diagram of a BMS for providing work orders to an application which can be performed by the controller of FIG. 14, according to some embodiments.

As shown in FIG. 15, the system 1500 is structured to generate and provide work order information to the application 1532. The memory 1508 of the processing circuit 1504 includes the training data storage 1510, the machine learning engine 1512, the fault detector circuit 1514, the work order circuit 1516, the data collector 1518, the profile database 1520, and a scheduling circuit 1542. In some embodiments, the system 1500 is configured to receive sensor data and, in some embodiments, user requests, and generate a work order for a particular user of application 1532. The data for the work order (e.g., contents of the work order, possible solutions, etc.) may be based on the inputs, machine learning functionality, the user's profile, scheduling conflicts, and any combination thereof. In some embodiments, system 1500 as shown in FIG. 15 may be a more detailed diagram of the memory 1508 as described above with reference to FIG. 14, wherein the processing is more specifically devoted to generating appropriate work orders for one or more users of application 1532. As described herein, FIGS. 15-17 may all be considered different embodiments of the memory 1508 as described above with reference to FIG. 14, wherein the memory 1508 may include some or all aspects of the components described therein.

The data collector 1518 may receive sensor data from the HVAC sensors 1528. In some embodiments, the data collector 1518 may also receive user requests that may affect the generation and/or providing of work orders (e.g., a user requests an update to a previously received work order, a user wishes to update their profile which affects the type of information they receive regarding work orders, etc.). The sensor data may include TPH data regarding the building zone 1526. The data collector 1518 may provide the sensor data to the fault detector circuit 1514 and the application 1532. In some embodiments, the data is provided to the application 1532 such that raw TPH data may be displayed on the application in real-time. However, circuitry may be included in memory 1508 that selectively provides the sensor data to the application 1532. For example, the dashboard of the application 1532 for a service technician is only provided the TPH data in 10 minute intervals of the TPH data, even though the TPH data is taken by the HVAC sensors 1528 every 5 minutes.

The fault detector circuit 1514 may receive the sensor data and process the sensor data to determine if any of the sensor data is indicative of a fault, or anything else that would necessitate a work order in system 1500. For example, the fault detector circuit 1514 may determine that the pressure and temperature levels of building zone 1526 are out of compliance (e.g., outside of acceptable ranges for pressure and temperature ranges in the buildings, etc.). Accordingly, the fault detector circuit 1514 provides a signal to work order circuit 1516 to begin the process of resolving the non-compliant issues of building zone 1526.

In some embodiments, the fault detector circuit 1514 provides fault data (e.g., sensor data, an indication of a fault, the type of detected fault, etc.) to the machine learning engine 1512 so that the machine learning engine 1512 can determine the appropriate solution and provide that to the work order circuit 1516. FIG. 15 shows the fault detector circuit 1514 providing a work order request to work order circuit 1516.

The work order circuit 1516 may receive the work order request as an input for providing a work order or a notification of a work order to a user of the application 1532. The work order circuit may also receive a predicted solution of the work order from the machine learning engine 1512. In the above example regarding non-compliant pressure and temperature levels in building zone 1526, the machine learning engine 1512 may use the training data storage 1510 to develop a neural network that can learn how to solve non-compliant TPH issues in the building zone 1526 (using AI techniques described above). The work order circuit 1516 may provide the issue relating to the work order to the machine learning engine 1512 (not shown) and, in response, the machine learning engine 1512 provides the solution of fixing a faulty damper in the air duct 312 (e.g., the damper 320).

The work order circuit 1516 may also receive profile information as an input. As described above, different amounts or types of information can be provided to the application 1532 depending on which profile is signed in to the application 1532. In some embodiments, the work order circuit 1516 queries the profile database 1520 for profile information relating to the multiple users of the application 1532. In the above example, the work order circuit queries the profiles for a nurse, a doctor, a service technician, and a facility manager. The work order circuit 1516 determines that merely a notice (e.g., an alert, a notification, etc.) that there is an issue with pressure and temperature levels in building zone 1526 is provided to the nurse's and the doctor's profile of the application 1532. The service technician (via the application 1532) may receive significantly more information, such as all of the relevant pressure and temperature data, where building zone 1526 is located, and the predicted solution to resolving the non-compliant TPH levels in the building zone 1526 (predicted by the machine learning engine 1512). The facility manager may receive more supervisory information related to the issue, such as the selected service technician who is resolving the issue of the work order, the progress of solving the issue, and the predicted solution.

In some embodiments, the work order circuit 1516 includes processing that organizes the predicted solutions, work order requests, and relevant data and appropriately provides the correct information to the users of the application 1532. This correct information may be considered the work order. Using the above example, the nurse may log into the application 1532 by singing into their profile and see that there was a non-compliance issue in building zone 1526 and, as such, he/she cannot reserve building zone 1526 for an upcoming surgery. The service technician may log into the application 1532 by signing into their profile and see that he/she has been assigned a new work order that needs to be completed and that a potential solution is fixing the damper 320 in the air duct 312. The facility manager may log into the application 1532 by signing into their profile and see that he/she has a work order that has almost been completed by the service technician, and that the service technician replaced the damper 320 to resolve the work order. The work order circuit 1516 may also receive scheduling information (e.g., scheduling conflicts, etc.) as an input from the scheduling circuit 1542.

In some embodiments, work order information, including TPH data, reporting data, summaries regarding one or more work orders, and any other work order information may be reported and/or provided for to other systems (e.g., external and internal) for further analytics. For example, TPH data for a particular week within building 10 may be reported to a compliance agency to determine whether system 1500 has been operating within compliance.

The scheduling circuit 1542 may be configured to facilitate reservations made by users of the application 1532 and provide scheduling conflicts to the work order circuit 1516. These reservations can include location reservations with additional TPH requirements. For example, the scheduling circuit 1542 may facilitate a reservation request from a nurse to request an OR room from 3:00-5:00 PM on Thursday, and that the OR room be substantially cold and dry, as the surgery is for a burn patient. In some embodiments, the scheduling circuit 1542 accounts for the time required to adjust from one reservation with certain TPH settings to another reservation with different TPH settings. Using the above example, the scheduling circuit may receive a reservation request to request the same OR room from 5:00 PM-7:00 PM on Thursday, and that the OR room be substantially hot and humid. The scheduling circuit 1542 may not allow this to occur, as there is not sufficient time to adjust to the new settings.

Other examples of scheduling conflicts include maintenance work (e.g., in response to receiving a work order, etc.) in building zone 1526 while the building zone 1526 is reserved. For example, an OR room is reserved on Wednesday for an all-day surgery. There is an issue with the chiller that supplies chilled air to the OR room. The work order generated by the work order circuit 1516 may require that a shutdown of the HVAC operation in the OR room (required to resolve the work order) cannot be performed on Wednesday as it would interfere with the reservation. In other embodiments, the scheduling conflict is resolved by the system 1500 moving the all-day surgery reservation to another date and/or location, such that the service technician can resolve the work order on Wednesday.

With reference to FIG. 15, the scheduling circuit 1542 may provide any number and types of scheduling conflicts, such as those described above, to the work order circuit 1516. The work order circuit 1516 may provide the work orders, work order notification, work order progress updates, and other transmissions related to the work orders to the application 1532.

BMS with Alert Functionality

Figure 16:
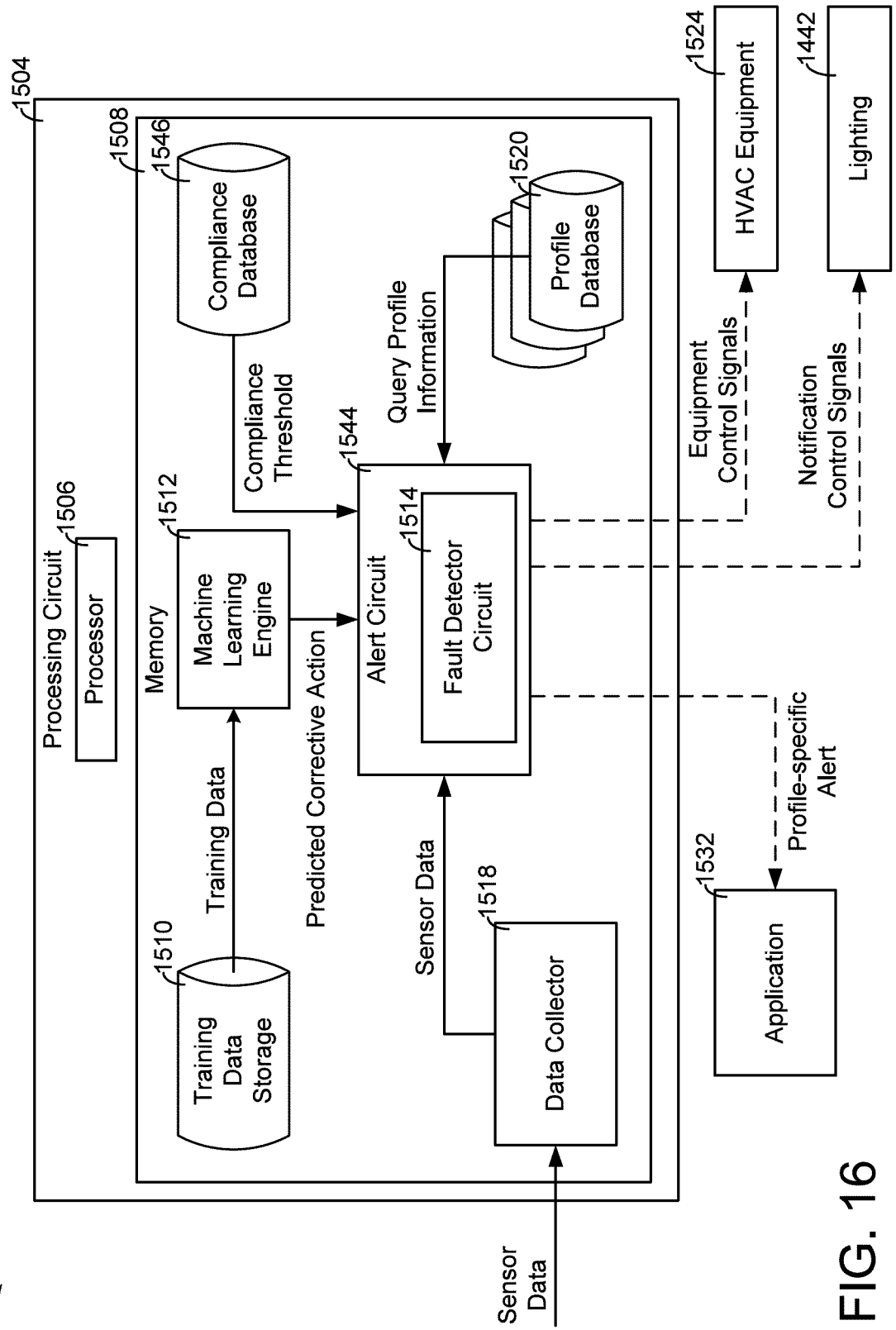
FIG. 16 is a diagram of a BMS with alert functionality which can be performed by the controller of FIG. 14, according to some embodiments.

As shown in FIG. 16, the system 1500 is structured to provide alerts to users of the application 1532 and/or building occupants of the building 10. The memory 1508 includes the training data storage 1510, the machine learning engine 1512, the fault detector circuit 1514, the data collector 1518, the profile database 1520, and the alert circuit 1544. The processing circuit 1504 may be configured to receive sensor data and appropriately detect a fault and generate/provide the appropriate alerts to one or more users of the application 1532. The data collector 1518 may receive sensor data from the HVAC sensors 1528 and provide the sensor data to the alert circuit 1544.

The alert circuit 1544 may be configured to detect a problem, issue, or fault in system 1500 and facilitate the appropriate corrective action. The alert circuit 1544 may be similar to the work order circuit 1516 as described above with reference to FIG. 15. In some embodiments, the alert circuit 1544 is configured to generate an alert and provide the alert information to the work order circuit 1516 to generate a new work order (not shown). In other embodiments, the alert circuit 1544 merely provides notifications that there is an issue occurring within system 1500. For example, in the event that TPH levels are out of compliance in building zone 1526, the alert circuit 1544 may turn on a notification light within building zone 1526 with an accompanying audio alert. In some embodiments, the notifications are provided to the application 1532 in a selective manner, such that the information is selectively displayed based on the user's profile. The alert circuit 1544 may also receive predicted corrective action from the machine learning engine 1512 as an input.

In some embodiments, the alert determined by the alert circuit 1544 requires corrective action for resolving the alert. For example, an alert that determines that temperature levels are significantly low in building zone 1526 due to a boiler failure may require the corrective action of filling up the fuel of a boiler (e.g., heating oil, kerosene, liquid propane (LP), etc.). This is a common task associated with HVAC boilers, and may be predicted as the solution to the generated alert by the machine learning engine 1512. In some embodiments, the machine learning engine 1512 is similar to the machine learning engine described above with reference to FIGS. 14-15. In some embodiments, the alert circuit 1544 may take in compliance information from a compliance database 1546.

In some embodiments, the BMS controller 1502 may receive information relating to compliance standards for the particular type of building that building 10 is. For example, if building 10 is a hospital, building 10 needs to conform to at least ASHRAE standard 170. The alert circuit 1544 may query the compliance database 1546 to gather this information and use the compliance information to determine whether the received sensor data is indicative of a compliance issue. In some embodiments, the alert circuit 1544 also receives profile information as an input.

As described above, different amounts or types of information can be provided to the application 1532 depending on which profile is signed in to the application 1532. In some embodiments, the alert circuit 1544 queries the profile database 1520 for profile information relating to the multiple users of the application 1532. This process may be similar to the querying processes via profile database 1520 as described above. In some embodiments, the alert circuit 1544 includes fault detector circuit 1514. The fault detector circuit 1514 may act as a subset of the alert circuit 1544, as a portion of the generated alerts by the alert circuit 1544 are faults within system 1500. In some embodiments, they are less problematic and only require a notification to be provided to the application 1532. They may not require and fault detection and/or fault correction.

The alert circuit 1544 may provide profile specific alerts to the application 1532. In some embodiments, the alerts include notifications, suggested solutions, selective information related to the alert, safety recommendations, and other alert elements for providing information to the user of the application 1532. In some embodiments, this alert information is selectively provided based on the profile of the user, as described above. The alert circuit 1544 may also provide equipment control signals to HVAC equipment 1524 and notification control signals to lighting 442. While not shown in FIG. 16, the alert circuit 1544 may also provide signals to a sound system within building 10 to provide audible notifications regarding the generated alert.

In some embodiments, the alert circuit 1544 includes a display panel positioned in a patient room. In some embodiments, the alert circuit 1544 includes a display panel positioned in a nurses station. In some embodiments, the alert circuit 1544 includes an audible alert. The audible alert may include an indication of a problem or a solution. In some embodiments, the alert generated by the alert circuit 1544 provides information regarding when the temperature, pressure, and humidity will be returned to compliance. The alert may also include a communication sent to a predetermined distribution list. The alert may also include a message (e.g., SMS message, email, text, push notification, etc.) sent to the user.

BMS with Scheduling System Integration

Figure 17:
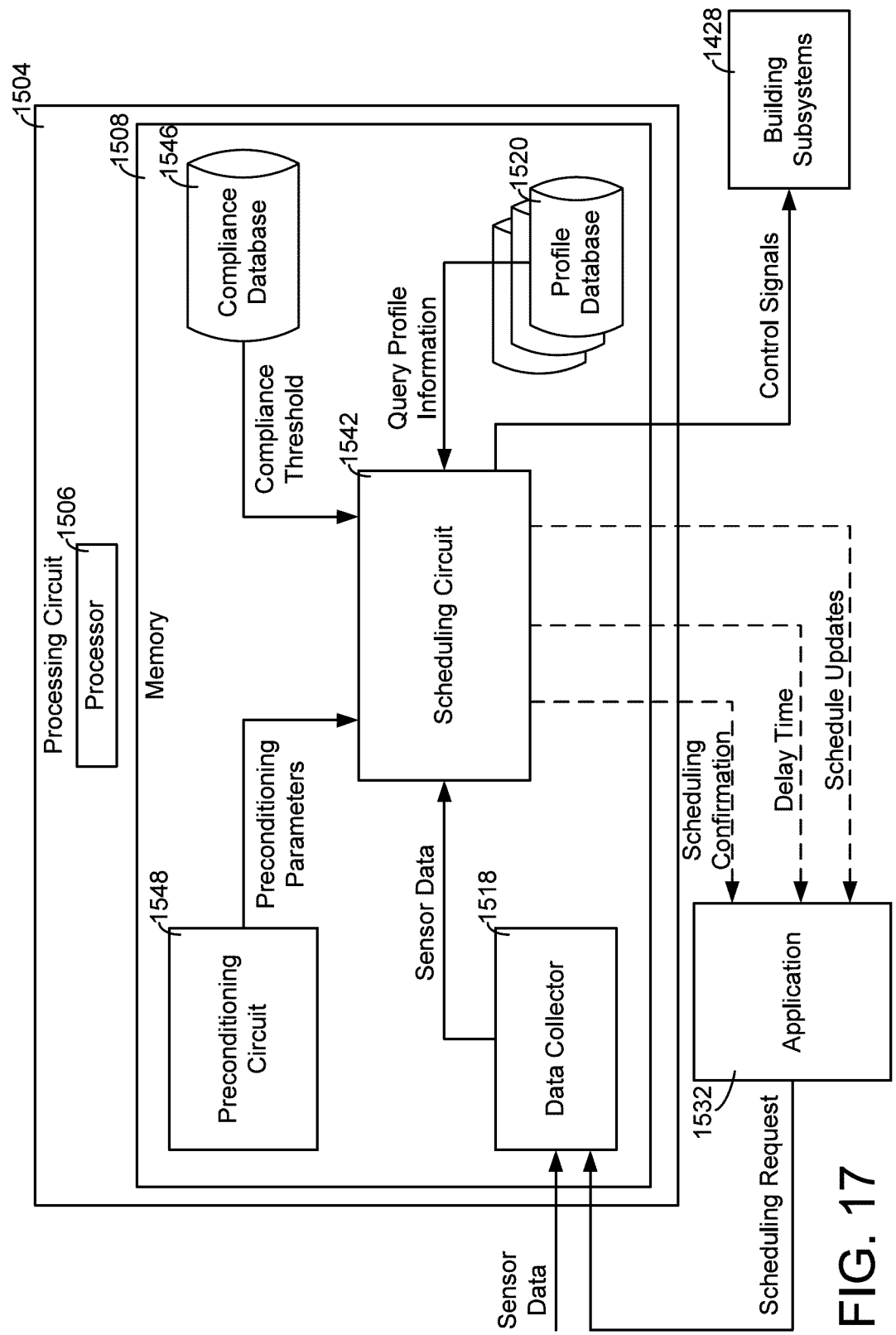
FIG. 17 is a diagram of a BMS with scheduling system integration which can be performed by the controller of FIG. 14, according to some embodiments.

As shown in FIG. 17, the system 1500 is structured to manage scheduling requests while attempting to maintain TPH compliance. The memory 1508 includes the data collector 1518, the profile database 1520, the scheduling circuit 1542, the compliance database 1546 and a preconditioning circuit 1548. The processing circuit 1504 may be configured to receive sensor data and scheduling requests, process the requests in light of compliance requirements, preconditioning parameters and scheduling conflicts, and provide information related to the scheduling back to the application 1532. The data collector 1518 may receive sensor data from HVAC sensors 1528 and scheduling requests from the application 1532.

In some embodiments, these scheduling requests include reservations to reserve a room (e.g., an OR room in a hospital, etc.). The scheduling requests may also include requests for particular HVAC parameters, including TPH levels. For example, a doctor requests the reservation of a room where surgery will be performed. He/she prefers a cooler, dryer environment and, as such, request a lower temperature and humidity percentage during the schedule reservation time. The scheduling circuit 1542 may also take into consideration whether the requested TPH levees would remain in compliance. The data collector 1518 may provide the sensor data and scheduling requests (not shown) to the scheduling circuit 1542.

The scheduling circuit 1542 may receive the sensor data and the scheduling requests and determine the allowability of the request. The scheduling circuit 1542 may also receive preconditioning parameters from the preconditioning circuit 1548. In some embodiments, the preconditioning circuit 1548 is configured to organize a schedule for an operating room in coordination with the HVAC control of system 1500. Integration of the scheduling system with the controller may allow the system to incorporate draw down time (e.g., the time is takes to sufficiently cool the room and stabilize TPH before a surgery) into the schedule to avoid overlap of procedures or delays in the schedule do to a room that is not ready on time.

In some embodiments, the preconditioning circuit 1548 includes a sanitization system (e.g., UV soak system, a fumigation system, etc.) that executes a preconditioning routine when desired. In some embodiments, the time for preconditioning is accounted for by the scheduling circuit 1542. The preconditioning circuit 1548 may determine the various preconditioning parameters required for the reservation and provide the parameters to the scheduling circuit 1542. The scheduling circuit 1542 may also receive the compliance information from the compliance database 1546.

In some embodiments, the BMS controller 1502 may receive information relating to compliance standards for the particular type of building that building 10 is. For example, if building 10 is a hospital, building 10 needs to conform to at least ASHRAE standard 170. The alert circuit 1544 may query the compliance database 1546 to gather this information and use the compliance information to determine whether the received sensor data is indicative of a compliance issue. In some embodiments, the alert circuit 1544 also receives profile information as an input.

The scheduling circuit 1542 may also receive profile information from the profile database 1520. In some embodiments, different amounts or types of information can be provided to the application 1532 depending on which profile is signed in to the application 1532. In some embodiments, the scheduling circuit 1542 queries the profile database 1520 for profile information relating to the multiple users of the application 1532. This process may be similar to the querying processes via profile database 1520 as described above.

In an exemplary embodiment, the operating room administrator enters a reservation request via the application 1532. The scheduling circuit 1542 receives the request and populates a schedule including any preconditioning and/or draw down required. If the preconditioning or draw down routines will exceed the available time slot requested, an alert will be provided to the application 1532. Once the operation is scheduled, preconditioning and draw down requests are automatically generated by the BMS controller 1502 and at the scheduled time, the controller operates the HVAC system and the preconditioning system to prepare the room on time for the scheduled operation. The scheduling circuit 1542 may provide scheduling confirmations, time delay indications, and scheduling updates to the application 1532. The scheduling circuit 1542 may also be configured to provide control signals to HVAC equipment within building subsystems 428.

Application Dashboard

Figure 18:
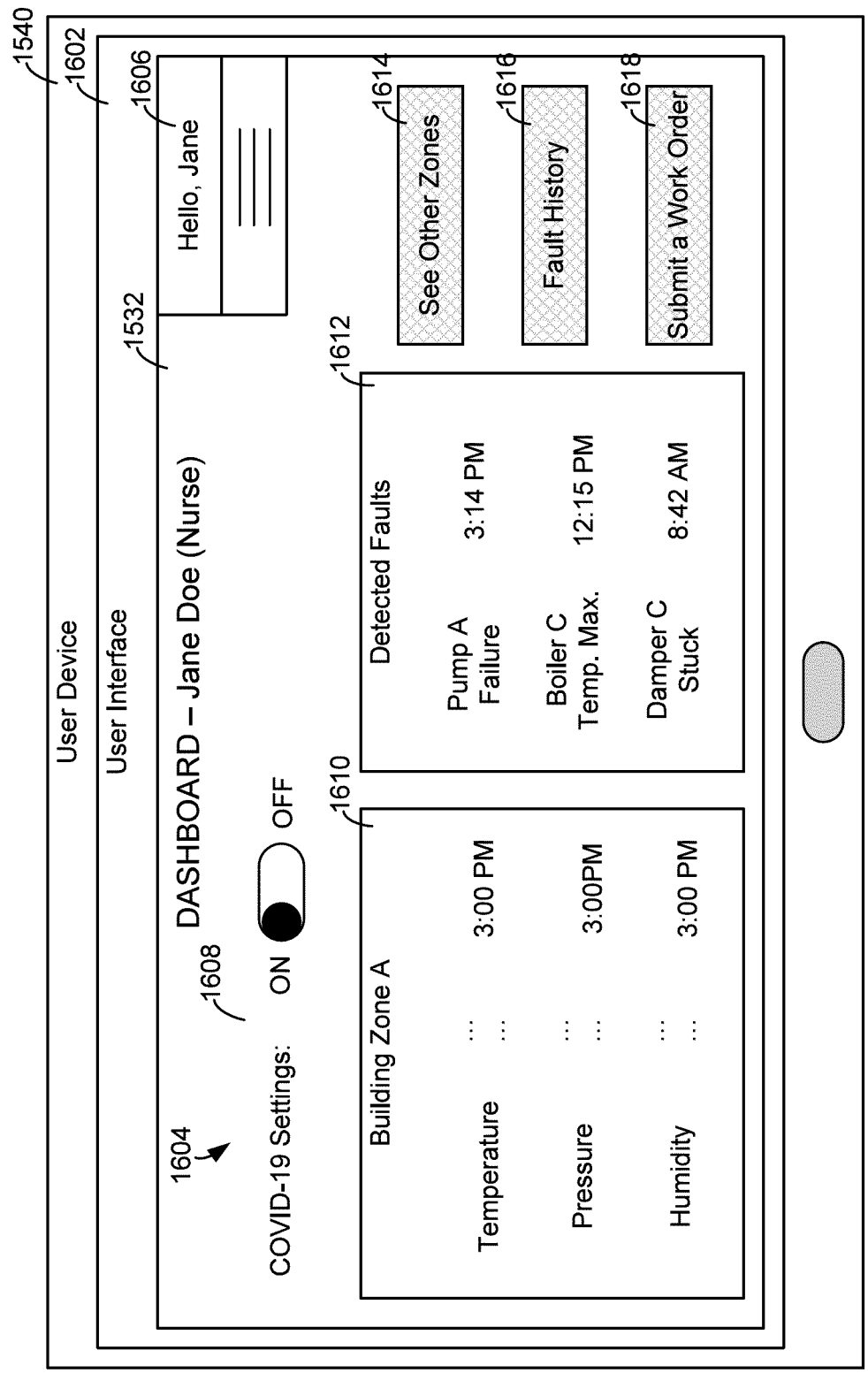
FIG. 18 is a diagram of an application on a user interface, which can be generated by the server of FIG. 14, according to some embodiments.

As shown in FIG. 18, the user device 1540 includes a user interface 1602. The user interface 1602 displays the application 1532 described above. In some embodiments, the application 1532 includes display icons, interactive buttons, charts, historical data, predictions, schedules, work orders, recommended solutions, potential uses for a building zone, and other information, as desired. In some embodiments, the application 1532 provides a dashboard 1604 or a series of display windows 1604 that the user can access to view information and/or interact with the BMS controller 1502. In one non-limiting example, the dashboard 1604 includes a profile header 1606, a settings widget 1608, a TPH window 1610, a fault window 1612, and a selection widgets 1614-1618.

In some embodiments, the user interface 1602 includes the dashboard 1604 that displays real time TPH information and other information relevant to TPH compliance. In some embodiments, the dashboard includes a display panel mounted in a room. The display panel can provide digital readouts of TPH within the room. In some embodiments, the display panel includes physical sensors (e.g., a ball-in-the-wall pressure sensor, etc.) that hospital rooms have traditionally used for quick confirmation of the readouts displayed on the dashboard. The display panel may include digital displays of temperature, pressure, and humidity shown as speedometer type readouts, bar displays, or other display types. In some embodiments, the display panel shows color coded elements indicating TPH compliance status. For example, a background may change to yellow when TPH is approaching a compliance standard, and red when TPH is out of compliance.

In some embodiments, the dashboard 1604 includes a computer monitor at a nursing station or another central location accessible near the monitored rooms. The dashboard 1604 may provide audible alerts or instructions regarding TPH compliance when a TPH compliance problem is sensed or predicted by the controller. The dashboard 1604 may include a user interface that allows a user to input TPH demands (e.g., a change of temperature) within the allowable range for TPH compliance.

In some embodiments, the dashboard 1604 provides the user with available options for temperature, pressure, and humidity so that compliance can be maintained. Additionally, the dashboard 1604 can include a display or indication of energy consumption and/or cost savings attributed to TPH selections. For example, a warmer room temperature in the summer may lower energy consumption thereby reducing costs associated with TPH and also meeting compliance standards.

In some embodiments, the dashboard 1604 can include a mobile device (e.g., a smartphone) structured to interact with the controller. The mobile device can include an executable program stored on a non-transitory storage medium and capable of interacting via a wireless network with the controller to display information and provide feedback from the user to the controller.

In some embodiments, the dashboard 1604 can include a parts inventory accessible by a facilities director and a technician. The parts inventory can interface with the work order system to provide a listing of relevant parts in inventory and their location within the work order. The parts inventory can save valuable time by auto-generating a list of required parts and tools to address the work order.

In some embodiments, the dashboard 1604 includes head-up-display (HUD) interface that can be used hands free to interact with the controller. The HUD interface may be especially useful for a technician fulfilling a work order. For example, the HUD may allow for augmented reality displays to aid in the completion of the work order. Instructional diagrams, videos, or audio recordings could be displayed via the HUD interface while leaving the technicians hands free to complete work.

In some embodiments, the dashboard 1604 includes a help function as described briefly above and structured to convey TPH information and current system status in addition to providing access to other help functions related the TPH (e.g., TPH of a hallway or adjacent rooms). The help function may also include additional details for the facility director or technician to access in deTPH details of a system or component relevant to a work order.

In some embodiments, the dashboard 1604 includes a root cause determination system that is structured to receive input from a large number of rooms and areas service by the HVAC system. The root cause determination system analyzes data from different sources to identify a root cause of a TPH problem. For example, by comparing TPH readings in adjacent rooms, and remote rooms, service by the same HVAC system, a correlation between problematic readings may be found and the controller may be able to identify and common component that is causing the problem. The root cause determination system is capable of analyzing available information to determine a root cause and then generating a work order to address the root cause. In some embodiment, the root cause determination system utilizes artificial intelligence or machine learning to better analyze and understand the HVAC system and efficiently identify the root cause.

In some embodiments, the dashboard 1604 includes a compliance standards system that directly links with a third party system to retrieve TPH compliance standards. For example, the dashboard can display the relevant TPH standards set by CMS for the current use of the relevant room. In some embodiments, the dashboard 1604 includes an audio interface capable of communicating with the user audibly. In some embodiments, the dashboard 1604 includes a holographic interface capable of displaying a hologram that the user can interact with. The holographic interface can be used for augmented reality when diagnosing a problem and/or completing a work order.

In some embodiments, the dashboard 1604 includes a scheduling interface in communication with the scheduling circuit 1542 to allow interaction with the schedule. Preconditioning times and draw down times may be preprogrammed into the scheduling circuit 1542 so that the entry of a specific operation includes any TPH preparation time automatically. In some embodiments, the dashboard 1604 includes an indicator providing visual confirmation that a draw down, or a preconditioning routine is in progress. The scheduling circuit 1542 may be integrated with a security or other door control system to inhibit access to the operating room during a preconditioning routine or a draw down.

The exemplary dashboard 1604 shown in FIG. 18 is assigned to Jane Doe, who is a service technician permitted to see TPH data for building zones, fault windows (e.g., showing work orders including faults and recommended solutions), and other information. As discussed above, each user profile may be assigned a different dashboard 1604 so that a different user with a different profile may display different, more, or less information and options. The dashboard 1604 may provide general information to all occupants (e.g., real time TPH information, etc.). The profile header 1606 may merely act as an identifier to the specific profile associated with the displayed dashboard 1604. In some embodiments, the profile header 1606 includes a drop-down navigation tree to access more features of the application 1532.

The settings widget 1608 may act as a selection tool for choosing different settings for the application 1532. In some embodiments, operational criteria may be implemented that is particularly suited for an epidemiological pandemic (e.g., COVID-19). For example, during the COVID-19 pandemic, it may be necessary to maintain the temperature, humidity, and pressure levels within a desired range. In some embodiments, multiple types of selection rules can be considered and are not limited to a single selection that can be turned on or off. The settings widget 1608 may provide instructions to the BMS controller 1502 to maintain control based on certain criteria that are specific to the current setting. For example, the BMS controller 1502 may include instructions that, when the COVID-19 setting is set, the TPH parameters of the building zone 1526 should conform to ASHRAE Standard 170. In some embodiments, the setting widget 1608 can be updated universally such that the settings are changed without input from the user and all settings are updated within each dashboard 1604. For example, the COVID-19 settings may be updated in view of new studies or new standards (e.g., an advantageous temperature range, a particular humidity threshold, a negative pressure differential, etc.). As disclosed herein, "widget" may refer to any component or interactive item on an interface that a user can interact with, including buttons, scroll devices, windows, calendars, and navigation trees.

The settings widget 1608 may change depending on the location of the user device 1540 and the user profile. For example, the setting widget 1608 may be integrated with a scheduling system and recognize that a nurse is accessing the dashboard within an OR. The settings widget 1608 then displays OR specific settings. In some embodiments, the settings widget 1608 includes a burn procedure setting that dictates an increased ambient temperature, an orthopedics procedure setting that dictates a lower temperature, or other settings specific to the use of the OR. In some embodiments, the dashboard 608 receives information from a scheduling system and determines the room use and provides a room specific setting. For example, if the room is being used for an infection disease control, the dashboard may recognize the use from the scheduling system and provide pressure settings via the settings widget 1608.

The TPH window 1610 displays pressure, temperature, humidity measurements, and time stamps. In some embodiments, the HVAC sensors 1528 provide sensor data to the BMS controller 1502 at consistent sample rates (e.g., every second, every 10 seconds, every minute, every hour, etc.) and the BMS controller 1502 provides the time stamp associated with the last received information. In other embodiments, the user of the user device 1540 determines the time intervals for display. For example, a nurse may not want real time display of temperature which may fluctuate. The nurse may prefer an average temperature over a five minute interval. The user profile preferences can be updated to reflect the desired display mode. In some embodiments, the TPH window 1610 displays the ASHRAE Standard 170 TPH values. For example, the ASHRAE Standard 170 may state that temperature measurements are maintained in a temperature range of 20-24° C. and humidity is maintained in a humidity range of 20-60% for a particular room use.

The fault window 1612 displays fault information. In some embodiments, the fault window 1612 displays potential fault causations and/or solutions that may be determined at least in part by the machine learning engine 1512 as discussed above. Fault information can include a time of the fault, a raw fault code, a location of fault, a particular controller that discovered the fault, a particular sensor that measured the parameter that the fault was based on, required tools, required replacement parts, inventory of replacement parts on hand, etc.

A first selection widget 1614 displays "See other zones." A user may select the selection widget 1614 to toggle between different zones within building 10. While not shown in FIG. 18, another window may open that allows the user to pick other building zones to view their respective information. For example, while zone A (currently shown in FIG. 18) may refer to a first OR, and other OR rooms are accessible via the selection widget 1614. The user may interact with the selection widget 1614 to access information for a second OR.

A second selection widget 1616 displays "Fault History." In some embodiments, the second selection widget 1616 allows a user to access previous fault information related to the system 1500. For example, a service technician may wish to see previous data for building zone A.

A third selection widget 1618 displays "Submit a Work Order." In some embodiments, the third selection widget 1618 allows a user to submit one or more work orders requests. For example, if a TPH issue is identified, the user can interact with the third selection widget to report an issue.

The application 1532 may also include functionality to reserve certain building zones and/or operating rooms to avoid cross-contamination. For example, if a COVID-19 patient has been held in a particular room, it may be beneficial to wait until the room is no longer hazardous (e.g., low risk of spreading the disease, etc.) before bringing in a patient that does not have COVID-19. As such, reservation functionality that incorporates "hot-desking" features may be implemented. As described herein, hot-desk functionality may refer to determining when a desk, room, zone, or other location is no longer hazardous such that reservations may be held at or proximate to the location. In some embodiments, this hot desk functionality may take into account the air pathways within the building zone 1526. For example, if a COVID-19 patient is within a patient room that is directly in an air pathway from an HVAC blower fan, the application 1532 may register this and determine that all reservable locations within the air path are no longer reservable until they are considered no longer hazardous. In some embodiments, flush functionality may be implemented that allows all of the air in between surgeries to be flushed from the rooms. This is described in greater detail with reference to FIG. 14-17 above.

Systems and methods for incorporating air pathways into HVAC control may utilize systems described in U.S. patent application Ser. No. 16/927,063 filed Jul. 13, 2020, U.S. patent application Ser. No. 16/927,281 filed Jul. 13, 2020, U.S. patent application Ser. No. 16/927,318 filed Jul. 13, 2020, U.S. Provisional Patent Application No. 63/044,906 filed Jun. 26, 2020, U.S. patent application Ser. No. 16/927, 759 filed Jul. 13, 2020, U.S. patent application Ser. No. 16/927,766 filed Jul. 13, 2020, and U.S. Provisional Patent Application No. 63/071,910 filed Aug. 28, 2020, the entire disclosures of which are incorporated by reference herein.

Figure 19:
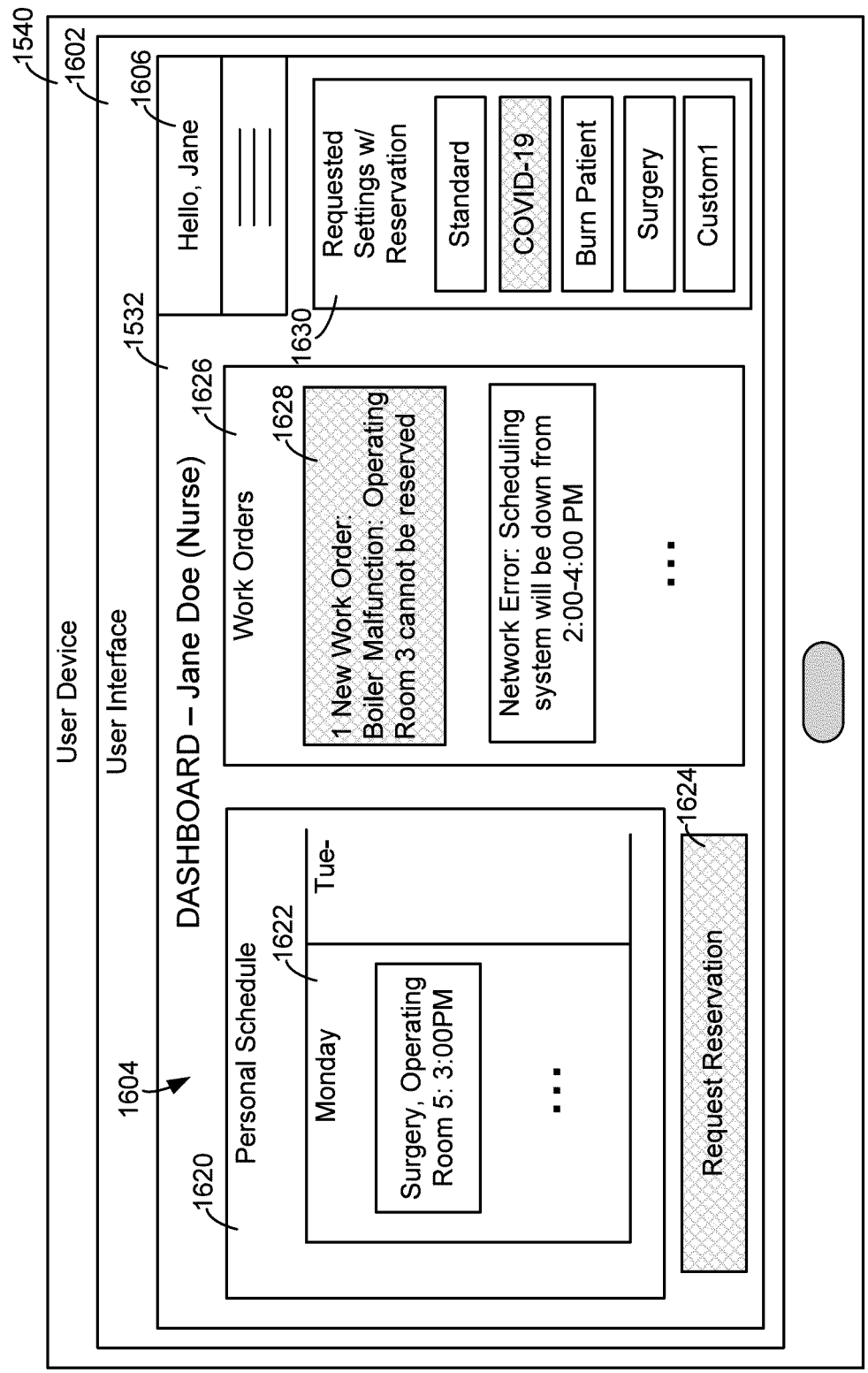
FIG. 19 is a diagram of an application on a user interface, which can be generated by the server of FIG. 14, according to some embodiments.

As shown in FIG. 19, the user interface 1602 shows another embodiment of application 1532 and the dashboard 1604. The dashboard 1604 includes a personal schedule 1620, a work order window 1626, and a settings window 1630. In some embodiments, FIG. 19 shows more functionality and display features that can be displayed on application 1532. The personal schedule 1620 includes a schedule 1622 which shows current reservations for the user. In some embodiments, the reservations are specific to the user. Dashboard 1604 also includes reservation request button 1624. Reservation request button 1624 may be selected by a user to request a room reservation, such as the reservations described above with reference to FIG. 17.

Work order window 1626 includes new work order 1628. In some embodiments, the user-specific work order is provided to the application 1532, as described above with reference to FIG. 15. These user-specific work orders may be displayed in work order window 1626 for viewing. In some embodiments, the information relating to the work order or other notification (e.g., alert, update, etc.) is specific to the profile of the user signed in to the application 1532.

The dashboard 1604 includes settings window 1630. In some embodiments, settings window allows a user to set particular settings for the building zone 1526. In some embodiments, settings window 1630 is used to provide HVAC settings when making a reservation. For example, a user selections request reservation button 1624 and, when prompted for additional information, the user indicates that "Burn Patient" setting from the settings window 1630 should be applied during the reservation.

In some embodiments, dashboard 1604 includes functionality for viewing or checking the progress of a work order. This may provide real-time status of the completion of the work order or various checkpoints throughout the process. This functionality may be embedded on dashboard 1604 to be selected by a user via a button or other widget. For example, a user selects a work order progress button to view the status of a pending work order.

TPH Control Processes

Figure 20:
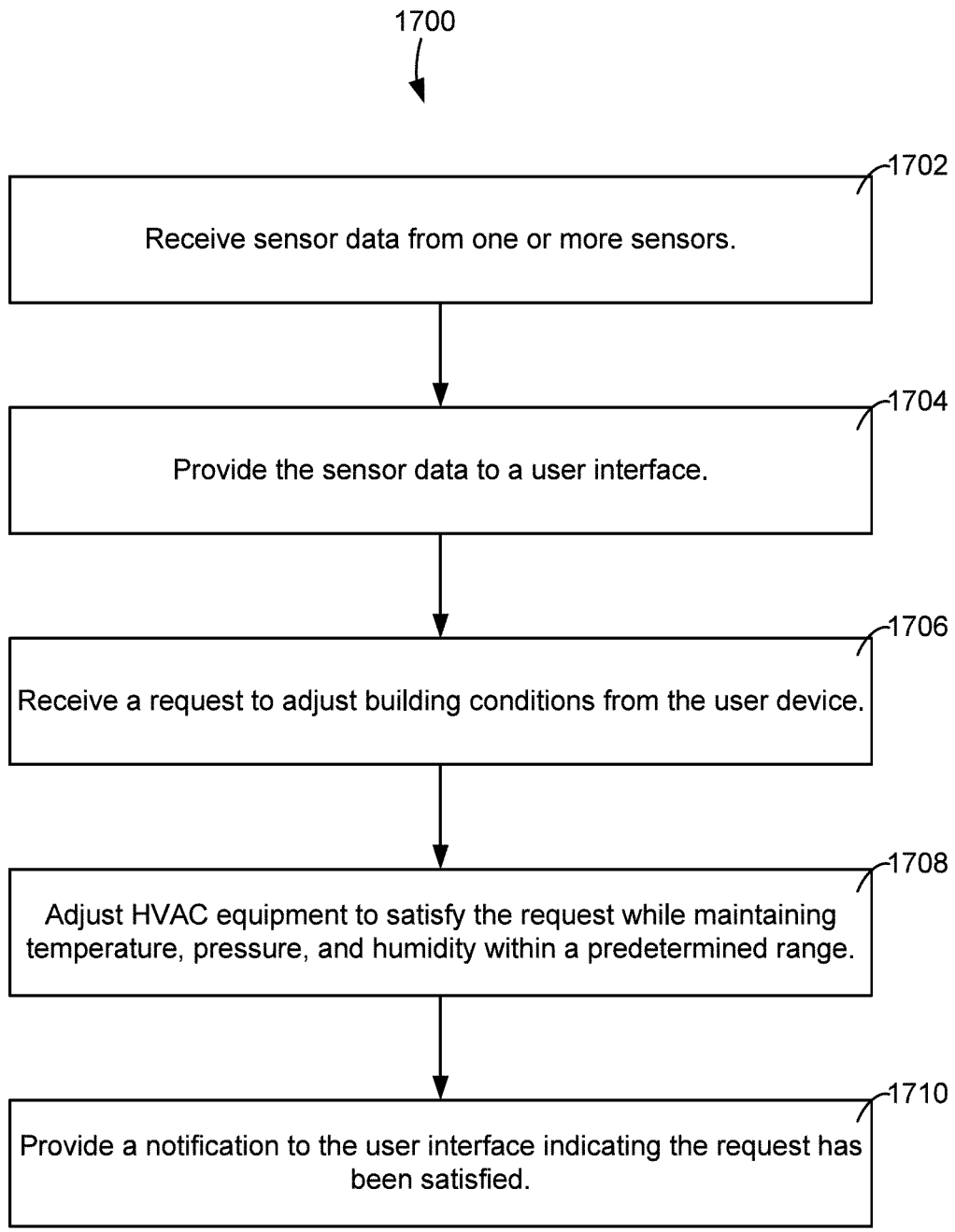
FIG. 20 is a flow diagram of a process for optimizing building conditions based on user input, which can be performed by the BMS controller of FIG. 14, according to some embodiments.

As shown in FIG. 20, a process 1700 for controlling building conditions based on user input is performed by the BMS controller 1502, or partially or entirely by any other processing device in the system 1500. For example, the BMS controller 1502 performs steps 1702-1704, and the application 1532 performs steps 1706-1710.

At step 1702, the process 1700 receives sensor data from one or more sensors. In some embodiments, the HVAC sensors 1528 can provide sensor data to the BMS controller 1502 for processing. While not shown in FIG. 14, the server 1534 may handle the processing of all the sensor data and the HVAC sensors 1528 provide the sensor data to the server 1534 for processing. The BMS controller 1502 may receive the sensor data wirelessly via plug-n-play functionality or wiredly, which may be performed over BACnet protocol or other building automation protocols.

At step 1704, the process 1700 provides the sensor data to a user interface. In some embodiments, the user may want to simply view the raw data from the HVAC sensors 1528 and the BMS controller 1502 may simply receive the sensor data and provide the data to the application 1532 for display on the user interface 1602. In some embodiments, the BMS controller 1502 may selectively provide data based on the user's request. For example, the user may not want to see all sensor data from all the HVAC sensors 1528 in the building zone 1526, and may only wish to see TPH information from a single room.

At step 1706, the process 1700 receives a request to adjust building conditions from the user device. In some embodiments, a user requests a change in building conditions via the application 1532. For example, a user may want to adjust the TPH levels of an operating room in a hospital, as the surgeon prefers a cooler, more dry room. Accordingly, a nurse requests (via the application 1532) a TPH change. This change may be requested digitally (e.g., the nurse can select an actual value for the TPH parameters, etc.), or via analog (e.g., the nurse can rotate a dial to adjust TPH parameters, etc.). The BMS controller 1502 may receive the request and adjust HVAC equipment 1524 to satisfy the request.

At step 1708, the process 1700 adjusts HVAC equipment to satisfy the request while maintaining temperature, pressure, and humidity within a predetermined range. As described above, this step may be performed by the BMS controller 1502 by sending control signals to HVAC equipment 1524. In some embodiments, the BMS controller 1502 takes into account and predictions or trends analyzed by the machine learning engine 1512 when providing control signals.

At step 1710, the process 1700 provides a notification to the user interface indicating that the request has been satisfied. The application 1532 may display a completion notice that the TPH levels have been adjusted accordingly. In some embodiments, notifications to the application 1532 may be provided for completed workers and resolved faults in the system 1500 as well. Notifications may include text messages, picture messages, or a combination of both. In some embodiments, the application 1532 sends a text message to the user device using the application 1532 to notify them that their request was satisfied.

Figure 21:
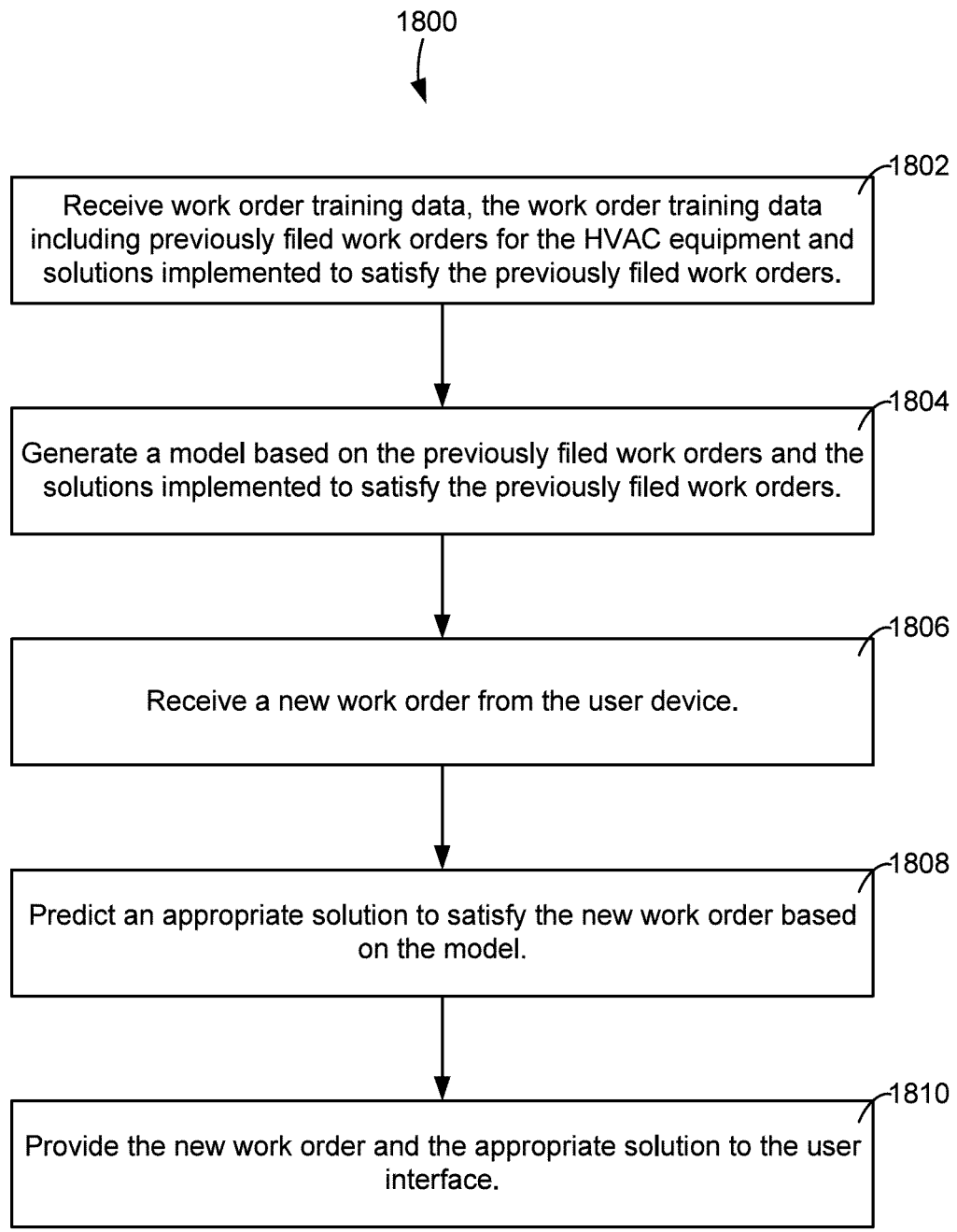
FIG. 21 is a flow diagram of a process for predicting solutions to issues in an HVAC system, which can be performed by the BMS controller of FIG. 14, according to some embodiments.

As shown in FIG. 21, a process 1800 for predicting solutions to faults in an HVAC system is performed by the BMS controller 1502, or partially or entirely by any other processing device in the system 1500. For example, the BMS controller 1502 may perform the steps 1802-1810.

At step 1802, the process 1800 receives the work order training data including previously filed work orders for the HVAC equipment and solutions implemented to satisfy the previously filed work orders. In some embodiments, the training data storage 1510 provides the work order training data to the machine learning engine 1512 for processing.

At step 1804, the process 1800 generates a policy based on the work order training data and the solutions implemented to satisfy the work orders within the work order training data. In some embodiments, the machine learning engine 1512 generates a policy that is initially trained, then continues to learn as new faults are entered and addressed over time. In some embodiments, the machine learning engine 1512 uses reinforcement learning based on a time to address a fault, a neural network, deep learning networks, or other machine learning architectures. The policy can include mathematical algorithms that are trained using the training data perhaps human input (for verification purposes) to replicate a decision that an expert would make when provided the same information. These algorithms may be supervised or unsupervised.

At step 1806, the process 1800 receives a new work order from the user device 538. The fault detector circuit 1514 provides the work order to the machine learning engine 1512 may provide an educated guess on how to resolve or complete the work order, as described in step 1808. Process 1800 includes predicting an appropriate solution to satisfy the new work order based on the model (Step 808).

Process 1810 includes providing the new work order and the appropriate solution to the user interface (step 1810). Step 1810 may include keeping the user updated throughout the work order process. The BMS controller 1502 may provide a notification that the work order has been received, a notification that the work order is being completed, and a notification that the work order has been completed.

Figure 22:
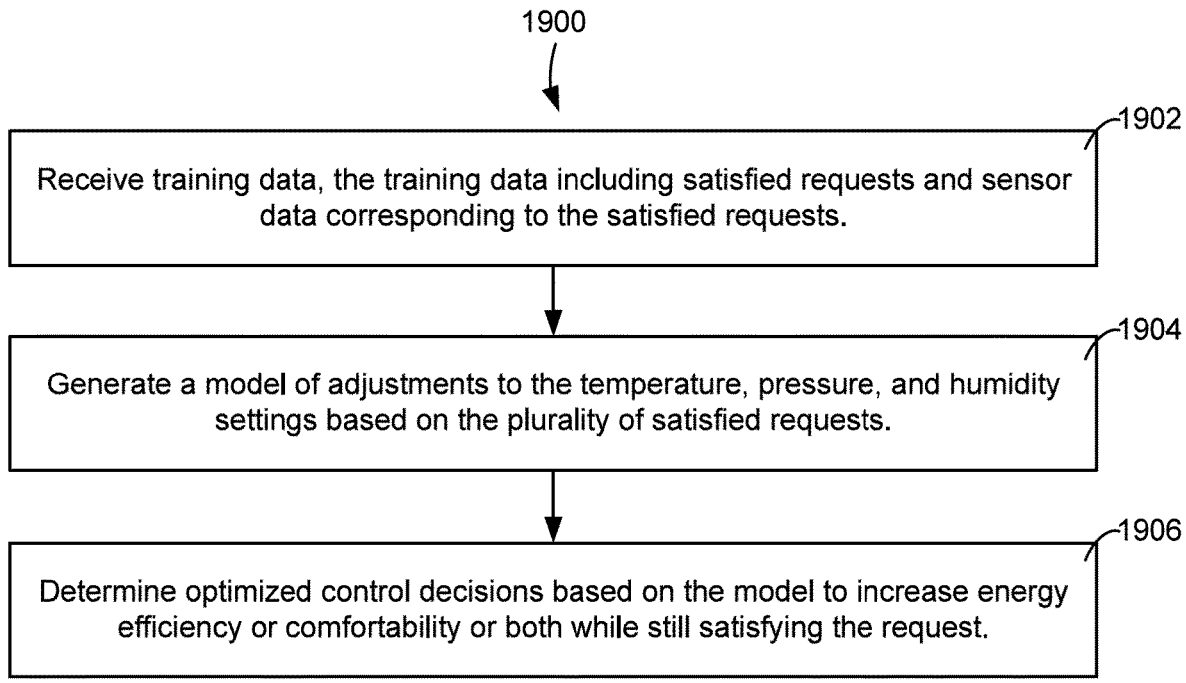
FIG. 22 is a flow diagram of a process optimizing control decisions for HVAC control in a building based on machine learning, which can be performed by the BMS controller of FIG. 14, according to some embodiments.

As shown in FIG. 22, a process 1900 for controlling the HVAC control in a building based on machine learning is shown, according to exemplar embodiments. Process 1900 may be similar to process 1800 in that a machine learning module is being implemented to make predictions on how to solve issues within the system 1500. Process 1900 may be performed by The BMS controller 1502, or partially or entirely by any other processing device in the system 1500. For example, The BMS controller 1502 may perform steps all steps 1902-1906.

At step 1902, the process 1900 receives training data, the training data including satisfied requests and sensor data corresponding to the satisfied requests. Step 1902 may act as a more generalized embodiment of the processes disclosed above with reference to FIG. 21. Step 1902 may be implementing machine learning for the entire TPH control within the building zone 1526. As TPH management may be difficult due to the dependency between the variables: pressure, temperature, and humidity, the machine learning functionality may improve management of TPH levels in necessary regions while maintaining user comfortability for building occupants.

At step 1904, the process 1900 generates a model of adjustments to the temperature, pressure, and humidity settings based on the plurality of satisfied requests. At step 1906, the process 1900 determines optimized control decisions based on the model to increase energy efficiency or comfortability or both while still satisfying the request. This may be similar to the machine learning described above, where training data is received to train a model. As described herein, machine learning may refer to training algorithms that model a system of data trend. For example, the temperature, pressure, and humidity parameters may have a nonlinear relationship. Due to this, an algorithm (e.g., a neural network matrix, etc.) may be generated to attempt to understand and learn the nonlinear relationship. One method of training the algorithm may include separating the previous data points of the TPH measurements—acting as the training data—and providing them to a neural network as time series data. In this example, the neural network may be a Long Short-Term Model (LSTM), as the inputs are time-series data. The neural network may provide the predicted outcome of the variables based on the historical data (e.g., the training data). A human may verify the decisions of the neural network via supervised learning. types of artificial intelligence, machine learning techniques, and types of neural networks may be considered.

Figure 23:
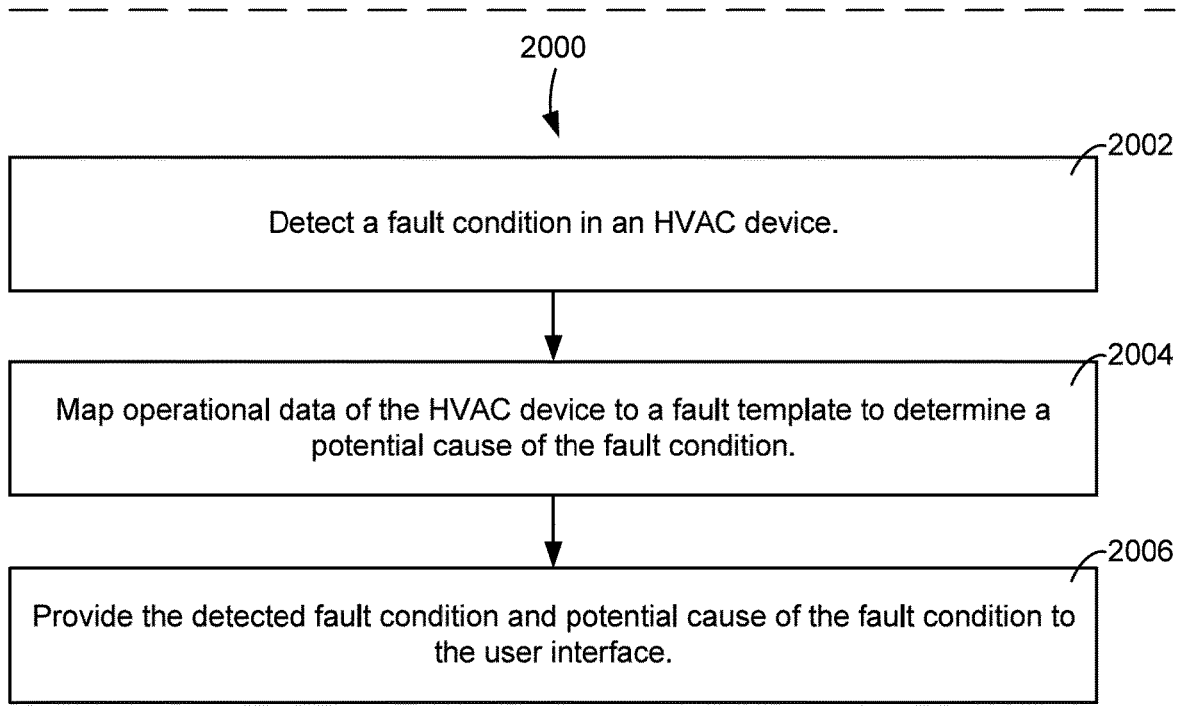
FIG. 23 is a flow diagram of a process for determining fault causes in a BMS, which can be performed by the BMS controller of FIG. 14, according to some embodiments.

As shown in FIG. 23, a process 2000 determines fault causes in a BMS. Process 2000 may be performed by the BMS controller 1502. Process 2000 may implement machine learning to optimizing the mapping process described therein.

At step 2002, the process 2000 includes detecting a fault condition in an HVAC device. In some embodiments, the HVAC device is part of the HVAC equipment 1524. The fault condition can include any type of fault that would occur in an HVAC system and/or the system 1500. Common faults can include stuck dampers, stuck actuators, inoperable pumps, incorrect temperatures, low operating voltages, and low pump speed. While the systems and methods disclosed herein generally refer to a user using the application 1532 to report information, HVAC sensors measuring parameters in the building zone 1526 (or operations of HVAC equipment 1524) may automatically provide fault indications to the BMS controller 1502.

At step 2004, the process 2000 includes mapping operational data of the HVAC device to a fault template to determine a potential cause of the fault condition. In some embodiments, a fault causation template may be used that facilitates the relationship between operational data and predicted faults to determine potential fault causations. In other embodiments, machine learning techniques can be used (as described above). Other types of methods to determine solutions to resolve faults may also be considered, such as querying a database of previously resolved faults.

At step 2006, the process 2000 includes providing the detected fault condition and potential cause of the fault condition to the user interface. Step 2006 may include keeping the user updated throughout the fault detection and solution process. The BMS controller 1502 may provide a notification that the fault detection has occurred, a notification that the fault is in the process of being resolved, and a notification that the fault has been resolved. This may also include the predicted fault solution being provided to a service technician via the application 1532.

Figure 24:
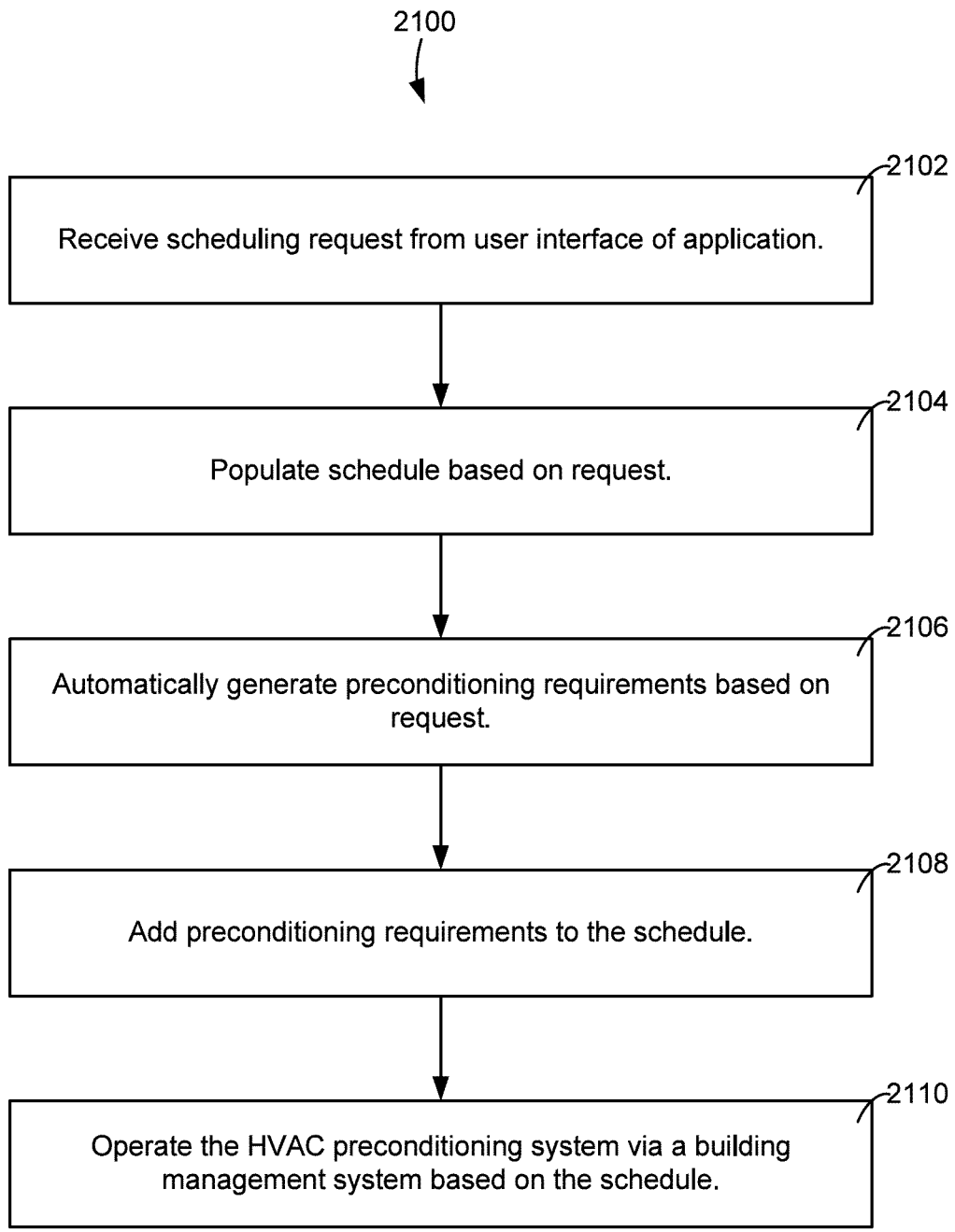
FIG. 24 is a flow diagram of a process for operating an HVAC system based on scheduling requests, which can be performed by the BMS controller of FIG. 14, according to some embodiments.

As shown in FIG. 24, a process 2100 adjusts HVAC parameters based on received scheduling requests. In some embodiments, process 2100 is performed by scheduling circuit 1542. Process 2100 may be implemented to determine the appropriate preconditioning requirements for a scheduling reservation requested by a user.

At step 2102, the process 2100 receives a scheduling request form a user interface of an application. In some embodiments, the application 1532 provides a scheduling request to the data collector 1518. The data collector 1518 may also receive sensor data from HVAC sensors 1528. The scheduling request may be performed by clicking reservation button 1624 via dashboard 1604.

At step 2104, the process 2100 populates a schedule based on the request from the user. The data collector 1518 may provide the sensor data and request to the scheduling circuit 1542. The scheduling circuit 1542 may then provide the appropriate updates to the schedule. In some embodiments, the preconditioning parameters related to the scheduling request, compliance thresholds, user's profile, and scheduling conflicts are taken into account prior to providing the scheduling updates to the application 1532.

At step 2106, the process 2100 automatically generates preconditioning requirements based on the request. At step 2108, the process 2100 adds preconditioning requirements to the schedule. In some embodiments, preconditioning circuit 1548 determines the appropriate conditioning services that are required prior to the reservations. These could include different sanitization techniques (e.g., UV wash, disinfecting the room, etc.), TPH changes, equipment changes, and other adjustments. The preconditioning circuit 1548 may determine which of these services are required for the scheduling request and provide these to the scheduling circuit 1542. The scheduling circuit 1542 may take these into consideration when determining whether the request can be approved. For example, the schedule request is for a time in which the room is reserved up to 10 minutes before the requested reservation time and the preconditioning services would take approximately 20 minutes to complete, the scheduling circuit 1542 may deny the scheduling request.

At step 2110, the process 2100 operates the HVAC equipment to satisfy the preconditioning requirements for the reservation. Scheduling circuit 1542 may provide control signals to HVAC equipment 1524 to adjust the HVAC parameters to satisfy the scheduling request. In some embodiments, the scheduling circuit 1542 may also provide control signals to the lighting subsystem 442 (e.g., for a UV wash that is required prior to the reservation, etc.).

TPH Management

Figure 25:
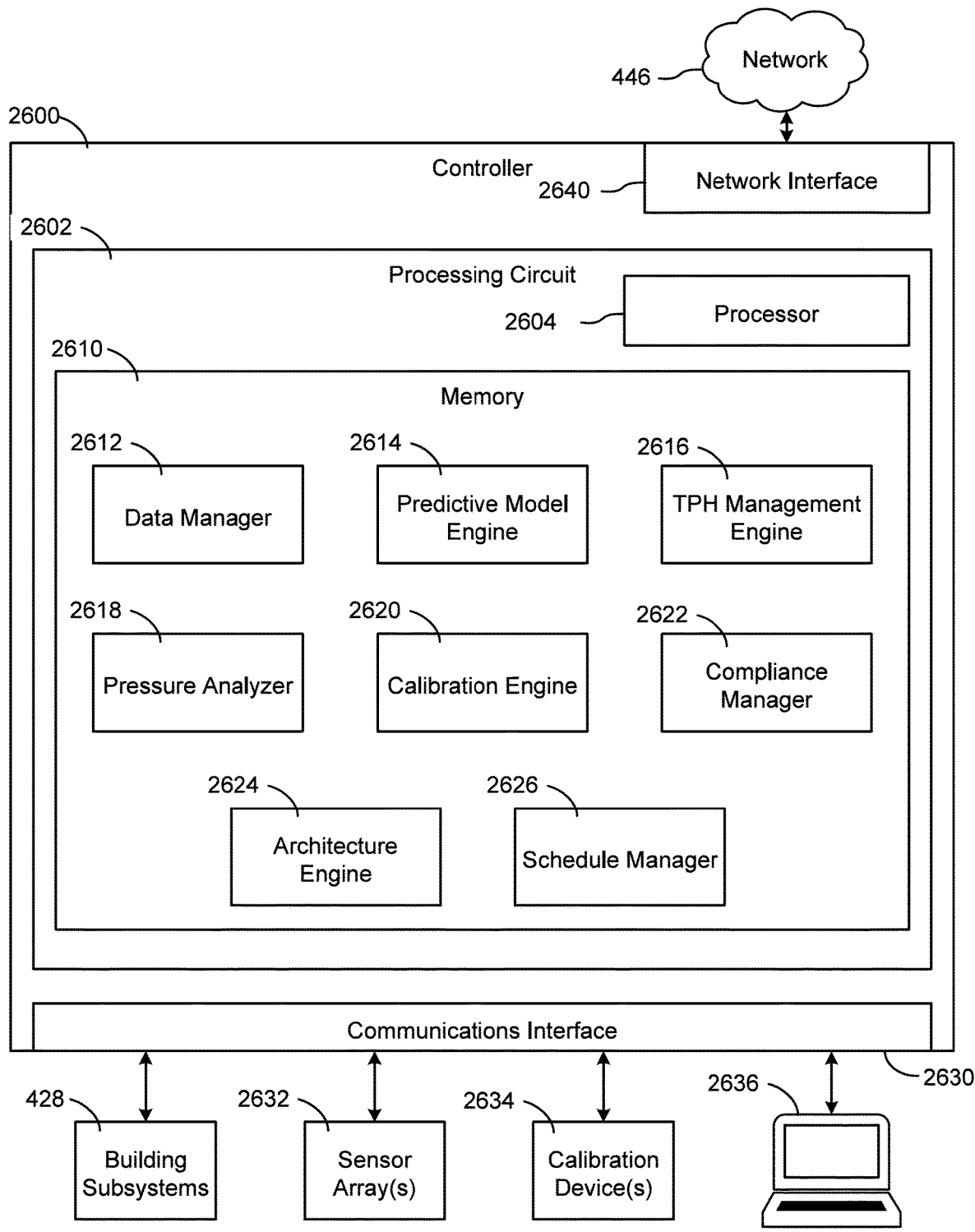
FIG. 25 is a block diagram of a controller for smart building control, according to some embodiments.

As shown in FIG. 25, a controller 2600 is generally structured for smart building control, according to some embodiments. More specifically, the controller 2600 may be structured to monitor and/or predict TPH of one or more areas (e.g., rooms) within a building (e.g., a hospital) in order to adjust climate control devices (e.g., HVAC equipment) accordingly. In some cases, the climate or environment (e.g., at least TPH) of an area or room within a building may be affected by other, adjacent areas. For example, adjacent rooms may affect the TPH of one another, and opening and closing doors to a room can change the TPH within the room or an adjacent area (e.g., a hallway). Accordingly, the controller 2600 described herein may be configured to analyze sensor data to predict TPH changes and adjust equipment operations accordingly.

The controller 2600 may be structured to receive data from various sensors and subsystems of the building 10 and/or the BMS 400 or 500, and may analyze the data to identify compliance issues and/or to predict the TPH of different areas with the building 10. As described in more detail below, the controller 2600 may even be at least partially implemented within the BMS 400 or the BMS 500. The controller 2600 may provide automated or semi-automated control over the climate within areas of a building in order to maintain TPH compliance (e.g., based on standards set by TJC or CMS, as described above). Unlike certain other systems, the controller 2600 may be interfaced with various building subsystems (e.g., the building subsystems 428) in addition to an HVAC subsystem (e.g., the HVAC 440). This may lead to increased accuracy in future TPH predictions, increased energy efficiency, and increasingly compliant systems.

The controller 2600 is shown to include a communications interface 2630 for exchanging data with a wide variety of external systems, devices, or components. In other words, the communications interface 2630 may be configured to facilitate the exchange (i.e., sending and receiving) of data between the controller 2600 and one or more other components. In some embodiments, the communications interface 2630 provides an interface between the controller 2600 any of the components of the BMS 400 or the BMS 500 described above. In this regard, the communications interface 2630 can include a BACnet interface in addition to other types of communications interfaces (e.g., Modbus, LonWorks, DeviceNet, XML, etc.). For example, the controller 2600 is shown to communicate with the building subsystems 428 via a communications interface 2630. In some embodiments, the communications interface 2630 may be configured to exchange data via the network 446 and may include appropriate interfaces for communicating on the network 446. For example, the communications interface 2630 may include a wired and/or wireless interface for connecting the controller 2600 to the Internet, or to an intranet. In other embodiments, as shown in FIG. 25, the controller 2600 includes a network interface 2640 configured to facilitate the exchange of data between the controller 2600 and the network 446.

As mentioned, the controller 2600 is shown to be communicably coupled to any of the building subsystems 428, as described above. In this regard, the controller 2600 may receive data regarding one or more parameters of the various building subsystems, analyze or process the data, and control one or more of the building subsystems 428 based on the data. In some embodiments, the controller 2600 may be integrated with at least the security subsystem 438 and the HVAC subsystem 440. In this regard, the controller 2600 may receive data from sensors and/or access control devices of the security subsystem 438, and may control various devices of the HVAC subsystem 440. In embodiments, the controller 2600 may be coupled to the building subsystems 428 either directly (e.g., through a wired connection) or indirectly (e.g., via the network 446).

In some embodiments, the communications interface 2630 also facilitates communication between the controller 2600 and one or more sensor arrays 2632. The sensor arrays 2632 can include any number of sensors for measuring any of a variety of parameters associated with an area (e.g., a room) within a building and/or the building subsystem devices associated with the area (e.g., HVAC equipment). The sensor arrays 2632 can include, for example, humidity sensors, temperature sensors, pressure sensors, and other sensors. More generally, the sensor arrays 2632 can include any sensors that measure factors indicative of an environment within an area of a building. In some embodiments, such as when the area is an operating room or a patient room in a hospital, the sensor arrays 2632 can include any sensors that are necessary to ensure patient comfort and safety, and to monitor/maintain an environment that meets compliance standards for hospitals. In general, the sensor arrays 2632 include sensors configured to measure at least TPH of an area.

In some embodiments, the communications interface 2630 also facilitates communication between the controller 2600 and one or more calibration devices 2634. The calibration devices 2634 can include a calibrated sensor array that includes one or more sensors that are functionally equivalent to, or the same as, the sensors of the sensor arrays 2632. For example, the calibration devices 2634 can include one or more sensors configured to measure TPH. In some embodiments, the calibration devices 2634 include a portable unit that includes one or more sensors and that can be wirelessly coupled to the controller 2600 to perform calibration procedures. In some embodiments, calibration devices 2634 are a direct replacement for one of the sensor arrays 2632. The calibration devices 2634 may be shipped to a particular location or user after having been calibrated by a manufacturer or calibration specialist. Accordingly, the calibration devices 2634 may be utilized to calibrate the sensor arrays 2632.

As shown, the communications interface 2630 also facilitates communication between the controller 2600 and at least one user device 2636. The user device 2636 may be any electronic device that allows a user to interact with the controller 2600 through a user interface. Examples of user devices include, but are not limited to, mobile phones, electronic tablets, laptops, desktop computers, workstations, and other types of electronic devices. The user device 2636 may be similar to the client device 368 and/or the client devices 448, as described above. The user device 2636 may display graphical user interfaces or other data on a display, thereby enabling a user to easily view data and interact with the controller 2600.

In some embodiments, the controller 2600 may also store and/or retrieve data from one or more external system (e.g., servers, computers, databases, etc.). In such embodiments, the controller 2600 may communicate with any external systems via network interface 2640, and thereby via network 446. The external systems many include the remote systems and applications 444, described above, for example. In some embodiments, at least one of the remote systems and applications 444 is an external database. The external database can be implemented in a variety of ways. For example, the external databases may include one or more memory devices or remote storage devices. The external databases may also include workstations, personal computers, servers, etc., and may include one or more on-premises server computers/databases and/or one or more cloud-based databases. In this sense, the external databases may be distributed across a variety of physical hardware devices.

Still referring to FIG. 25, the controller 2600 includes a processing circuit 2602, which further includes a processor 2604 and memory 2610. It will be appreciated that these components can be implemented using a variety of different types and quantities of processors and memory. The processing circuit 2602 can be communicably connected to the communications interface 2630 and/or the network interface 2640 such that processing circuit 2602 and the components thereof can send and receive data via the communications interface 650 and/or the network interface 2640. The processor 2604 can be implemented as a general purpose processor, an application specific integrated circuit (ASIC), one or more field programmable gate arrays (FPGAs), a group of processing components, or other suitable electronic processing components.

The memory 2610 (e.g., memory, memory unit, storage device, etc.) can include one or more devices (e.g., RAM, ROM, Flash memory, hard disk storage, etc.) for storing data and/or computer code for completing or facilitating the processes, layers and modules described in the present application. The memory 2610 can be or include volatile memory or non-volatile memory. The memory 2610 can include database components, object code components, script components, or any other type of information structure for supporting the activities and information structures described in the present application. According to an example embodiment, the memory 2610 is communicably connected to the processor 2604 via the processing circuit 2602 and includes computer code for executing (e.g., by the processing circuit 2602 and/or the processor 2604) one or more processes described herein.

In some embodiments, the controller 2600 is implemented within a single computer (e.g., one server, one housing, etc.). In other embodiments the controller 2600 can be distributed across multiple servers or computers (e.g., that can exist in distributed locations). In some embodiments, the controller 2600 is embodied in the BMS 400 or the BMS 500 as described above, and accordingly, the processing circuit 2602, the processor 2604, and/or the memory 2610 may be similar to or the same as the processing circuit 404, the processor 406 and/or the memory 408 as described above. Additionally, in such embodiments, the components of the memory 2610, described below, may be embodied in the BMS 400. In other embodiments, the controller 2600 is a stand-alone device or component not embodied in the BMS 400 or the BMS 500, and therefore includes its own dedicated processing circuit 2602, processor 2604, and/or memory 2610. In yet other embodiments, the controller 2600 is embodied as a portion of the BMS 400 or the BMS 500, a differently arranged BMS, or a building automation system (BAS), and accordingly may share a processing circuit, processor, and/or memory with any of these other BMSs or BASs.

The memory 2610 is shown to include a data manager 2612. The data manager 2612 may be configured to receive and/or preprocess signals or data from the building subsystems 428, the sensor arrays 2632, and/or the calibration devices 2634. In some embodiments, the data manager 2612 receives at least TPH data from the sensor arrays 2632 and directs the TPH data to other components of memory 2610. As briefly described above, the TPH data can be any sort of sensor data or signal relating to temperature, pressure, and humidity of an area, and measured by one or more sensors of the sensor arrays 2632. In some embodiments, the data manager 2612 preprocesses the TPH data, or any of the other data described below, such as by reformatting the data, modifying the data to remove outliers, reducing noise in signals, etc. It will be appreciated that the data manager 2612 may implement any suitable preprocessing based on the type and format of received data.

In some embodiments, the data manager 2612 also receives data from the building subsystem 428, and more specifically from the HVAC subsystem 440 and the security subsystem 438. Data from the HVAC subsystem 440 may include, for example, operational data or parameters relating to any HVAC equipment within a building (e.g., the building 10). As another example, the HVAC data may include operational states, power consumption values, sensor measurements, operating schedules, or any other data associated with the operation of HVAC equipment. The data received from the security subsystem 438 generally includes access control data, such as door sensor data. The door sensor data indicates a state (e.g., open or closed) of doors throughout a building. In some embodiments, door sensor data may be received directly from access control devices, such as door sensors, and the data manager 2612 is accordingly coupled to the access control devices rather than an entire security subsystem. s In some embodiments, the data manager 2612 is also configured to manage data storage and retrieval (i.e., data management). The data manager 2612 may be configured to store received data in an internal database (e.g., a partition within memory 2610), for example. In some embodiments, the internal database may be a separate memory device that is internal to the controller 2600 and/or the BMS 400. In some embodiments, the data manager 2612 may transmit data to one or more of the external databases, as previously described, via network interface 2640. In this regard, the data manager 2612 may also retrieve data from either an internal database or external database for additional processing or analysis.

The memory 2610 is also shown to include a predictive model engine 2614. The predictive model engine 2614 is generally configured to generate, train, and/or execute a predictive model for predicting TPH for an area or areas of a building. The predictive model can be any suitable type of neural network, machine learning model, or other artificial intelligence system. In some embodiments, the predictive model may include a model based predictive engine based on previous data, decision trees, and other algorithms. The predictive model is generally selected or designed for a specific installation or building. For example, an artificial intelligence system may be structured to learn the specific TPH dynamics of a hospital area (e.g., patient rooms, operating rooms, commons paces, etc.). The predictive model engine 2614 may also be configured to continuously update the predictive model based on real-time senor data. In some embodiments, the predictive model is dynamically modified using a reinforcement learning schema to improve the accuracy of trend data predictions over time.

In some embodiments, sensor data relating to TPH for a first area and any adjacent areas, along with door sensor data indicating a state (e.g., open or closed) of doors within the first area or adjacent areas, is used to execute the predictive model. Accordingly, the predictive model engine 2614 may receive TPH data from the sensor arrays 2632 and door sensor data from the security subsystem 438 via data manager 2612. The predictive model may then be executed using the sensor and door data to generate a prediction of future TPH within a target room (e.g., the first room). In this manner, the predictive model may take into account the impact of opening and closing of doors to the space or room, which is known to effect the TPH of a space. Additionally, the predictive model may indicate the impact of rooms or spaces that are adjacent to a target space with respect to TPH.

In some embodiments, the sensor data may include ambient temperature, pressure, or humidity information. In some embodiments, the ambient temperature, pressure, or humidity information is received from a weather station located at the building or remotely (e.g., a remote weather service). The predictive model engine 2614 receives the ambient information and predicts an impact of the ambient information on the TPH within the target space. For example, if the ambient conditions predict a heat spike in the afternoon, the predictive model engine 2614 is able to predict the effect of the ambient conditions and control the HVAC equipment to successfully avoid compliance issues due to changing ambient conditions.

The memory 2610 is also shown to include a TPH management engine 2616. The TPH management engine 2616 is generally configured to generate parameters or control decisions for controlling HVAC equipment in order to maintain or adjust TPH within an area of a building. Additionally, the memory 2610 may include a pressure analyzer 2618 configured to monitor pressure within an area of between adjoining areas of a building, and to adjust pressure within an area. In some embodiments, the TPH management engine 2616 and the pressure analyzer 2618 are integrated to accurately monitor TPH within an area and/or pressure between adjacent areas, and/or to generate control decisions to maintain TPH based on compliance standards.

In some embodiments, the TPH management engine 2616 and/or the pressure analyzer 2618 are configured to adjust parameters of HVAC equipment (e.g., of the HVAC subsystem 440) in response to the detection of compliance issues, or the prediction of future compliance issues, by a compliance manager 2622. Accordingly, the TPH management engine 2616 and/or the pressure analyzer 2618 can control the HVAC equipment to adjust any of the TPH parameters within an area to maintain compliance, or to bring the TPH of the area back into compliance. For example, if the compliance manager 2622 determines that the pressure of a room may become non-compliant within a future time interval (e.g., based on the predictive model), one of the TPH management engine 2616 and/or the pressure analyzer 2618 may operate HVAC equipment (e.g., an AHU) to increase the pressure in the room to maintain compliance.

The compliance manager 2622 is generally configured to identify TPH compliance issues and compare information received from the sensor arrays 2632 to compliance standards established by the TJC and the CMS. In some embodiments, the compliance manager 2622 can query a remote database or server to retrieve stored compliance standards. In some such embodiments, the compliance manager 2622 may query a third party system in order to receive the most up-to-date compliance standards. For example, the compliance manager 2622 may receive compliance standards directly from a server or website associated with TJC. In some embodiments, the compliance manager 2622 may query an external system or database at a regular time interval, to maintain accurate compliance standards. As such, the compliance manager 2622 may provide enhanced compliance analysis over other systems and methods by avoiding out-of-date standards. However, in certain other embodiments, compliance standards may be manually entered (e.g., by a user).

In some embodiments, the compliance manager 2622 is configured to identify future compliance issues based on predictions generated by the predictive model engine 2614. For example, the compliance manager 2622 can compare predicted future TPH for a target space by comparing the predictions to compliance standards. If compliance issues are predicted, the compliance manager 2622 and/or the TPH management engine 2616 can initiate preventative maintenance to correct or avoid the compliance issues.

In some embodiments, the compliance manager 2622 analyzes real-time or near real-time data received from the sensor arrays 2632 to detect compliance issues. In such embodiments, the compliance manager 2622 may compare the TPH measurements to a range of acceptable TPH values, as identified by the compliance standards. TPH trend data developed by the predictive model engine 2614 for a room and/or building may be used to identify potential future non-compliance issues. TPH values that fall outside of an acceptable range may indicate non-compliance. In some embodiments, the compliance manager 2622 may analyze predicted future TPH data generated by the predictive model engine 2614 to identify future compliance issues before they occur. In such embodiments, the compliance manager 2622 can predict future compliance issues based on the predicted TPH data.

The memory 2610 is also shown to include a calibration engine 2620. The calibration engine 2620 may be configured to identify sensors (e.g., of the sensor arrays 2632) that require calibration and may facilitate the calibration of identified sensors or sensor arrays. For example, one or more of the sensor arrays 2632 may need calibration at a regular interval (e.g., every six months) to maintain compliance and improve the accuracy of measurements. The calibration engine 2620 may identify upcoming calibration requirements and may perform a calibration of any particular sensors or sensor arrays. In some embodiments, the calibration engine 2620 receives first data from a first, calibrated sensor array and compares the first data to second data received from a second, non-calibrated sensor array. The second sensor array can then be calibrated (e.g., by adjusting weights or other parameters for processing the second data) to match the first data. In other embodiments, a non-calibrated sensor array (e.g., of the sensor arrays 2632) may be completely replaced with a calibrated sensor array. The various functions of the calibration engine 2620 are described in more detail below, with respect to FIGS. 28 and 29.

The memory 2610 is also shown to include an architecture engine 2624. The architecture engine 2624 may be configured to identify how the structure of a building or room effects TPH for the building or room. Accordingly, the architecture engine 2624 may determine improvements to the layout of an area and/or to the design or structure of the building. For example, the architecture engine 2624 may identify a non-optimal room design, layout, or construction that results in frequent compliance issues, or difficulty maintaining compliant TPH. The architecture engine 2624 may determine how the design, layout, or construction of the room may be improved (e.g., in new construction, with renovation) to increase efficiency and compliance.

The memory 2610 is also shown to include a schedule manager 2626. The schedule manager 2626 may be configured to generate and/or implement equipment operating schedules and/or calibration schedules. For example, the schedule manager 2626 may generate or determine operating schedules for various building equipment (e.g., HVAC equipment). In some embodiments, the schedule manager 2626 generates a schedule for calibrating sensors or the sensor arrays 2632. In such embodiments, the schedule manager 2626 can generate and transmit a notification of upcoming calibration requirements to user device 2636 or another system. In some embodiments, the schedule manager 2626 can even initiate a routine calibration process based on the schedule. In some embodiments, a calibration schedule is determined by a manufacturer of a sensor or sensor array (e.g., the sensor arrays 2632), and/or is determined by a manufacturer of a calibration unit, as described below with respect to FIGS. 28 and 29.

In some embodiments, the schedule manager 2626 also receives schedules associated with an area (e.g., a room) to improve predictions of future TPH for the area. In a hospital, for example, the schedule manager 2626 may receive an indication of future occupancy in a patient room or operating room, and the predictive model engine 2614 may utilize this indication in generating a TPH prediction for the room. To continue this example, if a surgeon request particular TPH settings in an operating room at a particular time, the TPH of the operating room and adjacent rooms may be affected. In some embodiments, the schedule manager 2626 may interface with an external scheduling system to receive such indications.

Figure 26:
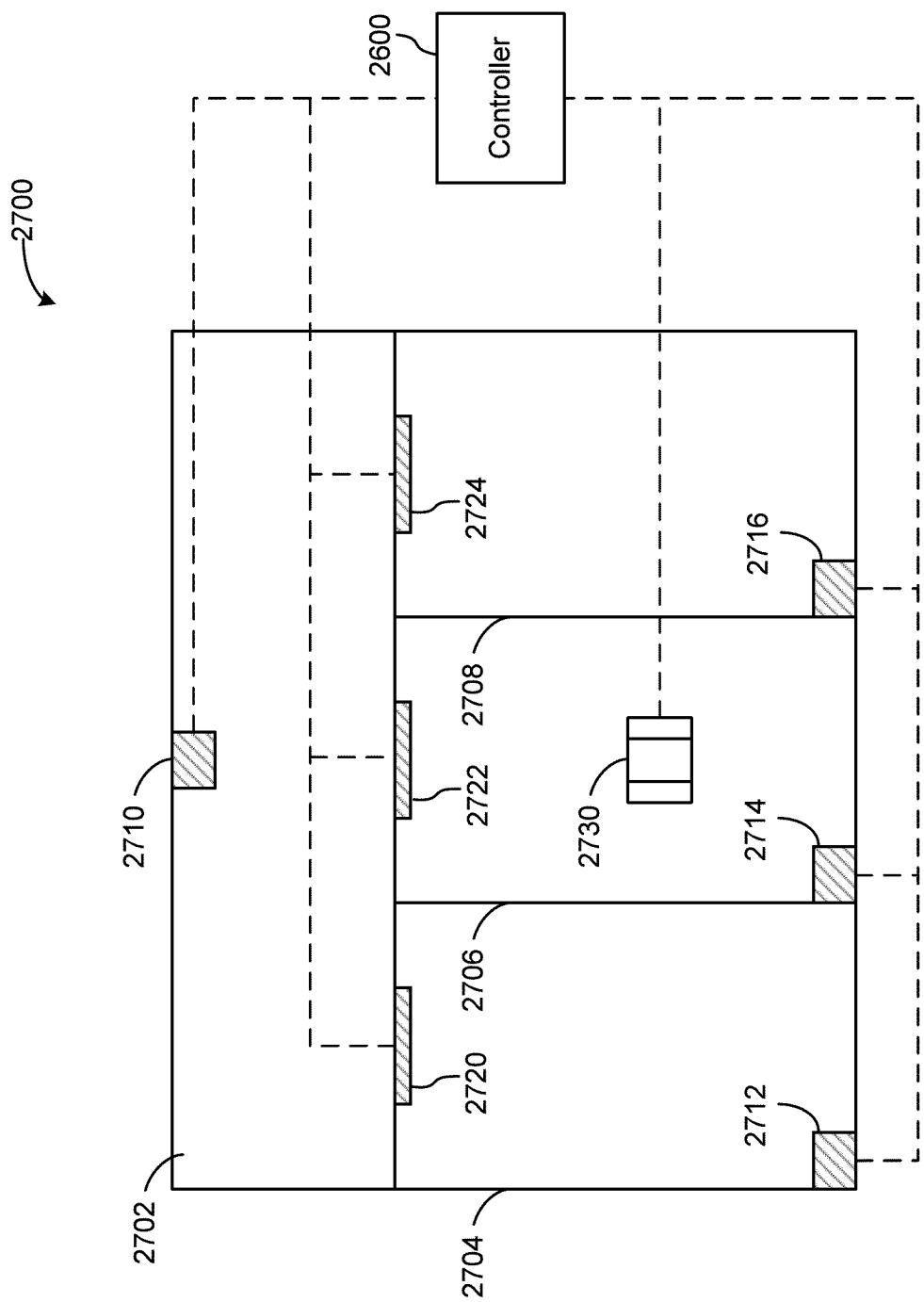
FIG. 26 is a block diagram of a system for climate control of one or more areas of a building, according to some embodiments.

Referring now to FIG. 26, a system 2700 for climate control of one or more areas of a building (e.g., building 10) is shown, according to some embodiments. FIG. 26 may illustrate, for example, at least a portion of a building that includes the BMS 400 and/or 500, as described above, and the controller 2600, also described above. In one example, FIG. 26 is an example of a rooms and a hallway within a hospital. The system 2700 may be configured to monitor data from various sensor arrays and access control sensors, in order to determine control decisions for various other systems of the building. Further, the system 2700 may determine how areas (e.g., rooms) within a building affect TPH in other, adjacent rooms, as described in detail below.

The system 2700 is shown to include a hallway 2702 and rooms 2704-2708. The hallway 2702 and the rooms 2704-2708 can represent any similar areas of a building, and are used here to represent various types of spaces that may be included in a building such as a hospital. In one example, each of rooms 2704-2708 may be patient rooms and/or operating rooms in a hospital. Similarly, hallway 2702 may represent a hallway or a common area in the hospital. In any case, each of the hallway 2702 and the rooms 2704-2708 are distinct spaces within a building that are separated by walls, doors, windows, etc.

Each of the rooms 2704-2708, along with the hallway 2702, are shown to include a sensor array, shown as sensor arrays 2710-2716. As described above with respect to FIG. 25, each of the sensor arrays 2710-2716 can include any number of sensors for measuring any of a variety of parameters associated with an area (e.g., a room) within a building and/or the building subsystem devices associated with the area (e.g., HVAC equipment). In general, the sensor arrays 2710-2716 may include humidity sensors, temperature sensors, pressure sensors, and other sensors for measuring TPH within a corresponding room.

Each of the rooms 2704-2708 are also shown to include a door sensor, shown as door sensors 2720-2724. The door sensors 2720-2724 may be access control devices attached to a corresponding door and coupled to the security subsystem 438. The door sensors 2720-2724 may indicate a position of the correspond door (e.g., open or closed) and an open time indicating how long a door was in the open position. Each of the sensor arrays 2710-2716 and the door sensors 2720-2724 are shown to be communicably coupled to the controller 2600. Accordingly, the controller 2600 may receive data from each of the sensor arrays 2710-2716 and the door sensors 2720-2724. As described in greater detail below with respect to FIG. 27, sensor data received from the sensor arrays 2710-2716 and the door sensors 2720-2724 can be utilized to predict future TPH for any of the hallway 2702 and/or the rooms 2704-2708.

The system 2700 is also shown to include a calibration unit 2730. The calibration unit 2730 may be a calibrated sensor array, similar to one of the sensor arrays 2710-2716, that may be coupled to the controller 2600 (e.g., wired or wirelessly) to perform a calibration routine. In some embodiments, the calibration unit 2730 is carried into a room (e.g., room 2706, in this example) and wirelessly connected to the controller 2600. The calibration unit 2730 measures TPH within room 2706 and transmits the TPH values to the controller 2600. Subsequently, the controller 2600 compares TPH values from the sensor array 2714 to the values from the calibration unit 2730 and calibrates either the sensor array 2714 or the analysis processes performed by the controller 2600 itself accordingly (e.g., to match the calibration unit 2730). In some embodiments, the calibration unit 2730 is a replacement for one of the sensor arrays 2710-2716. In such embodiments, a user may remove one of the sensor arrays 2710-2716 from a corresponding area and replace the removed sensor array with the calibration unit 2730. Calibration processes for system 2700 are described in greater detail below with respect to FIGS. 28 and 29.

Figure 27:
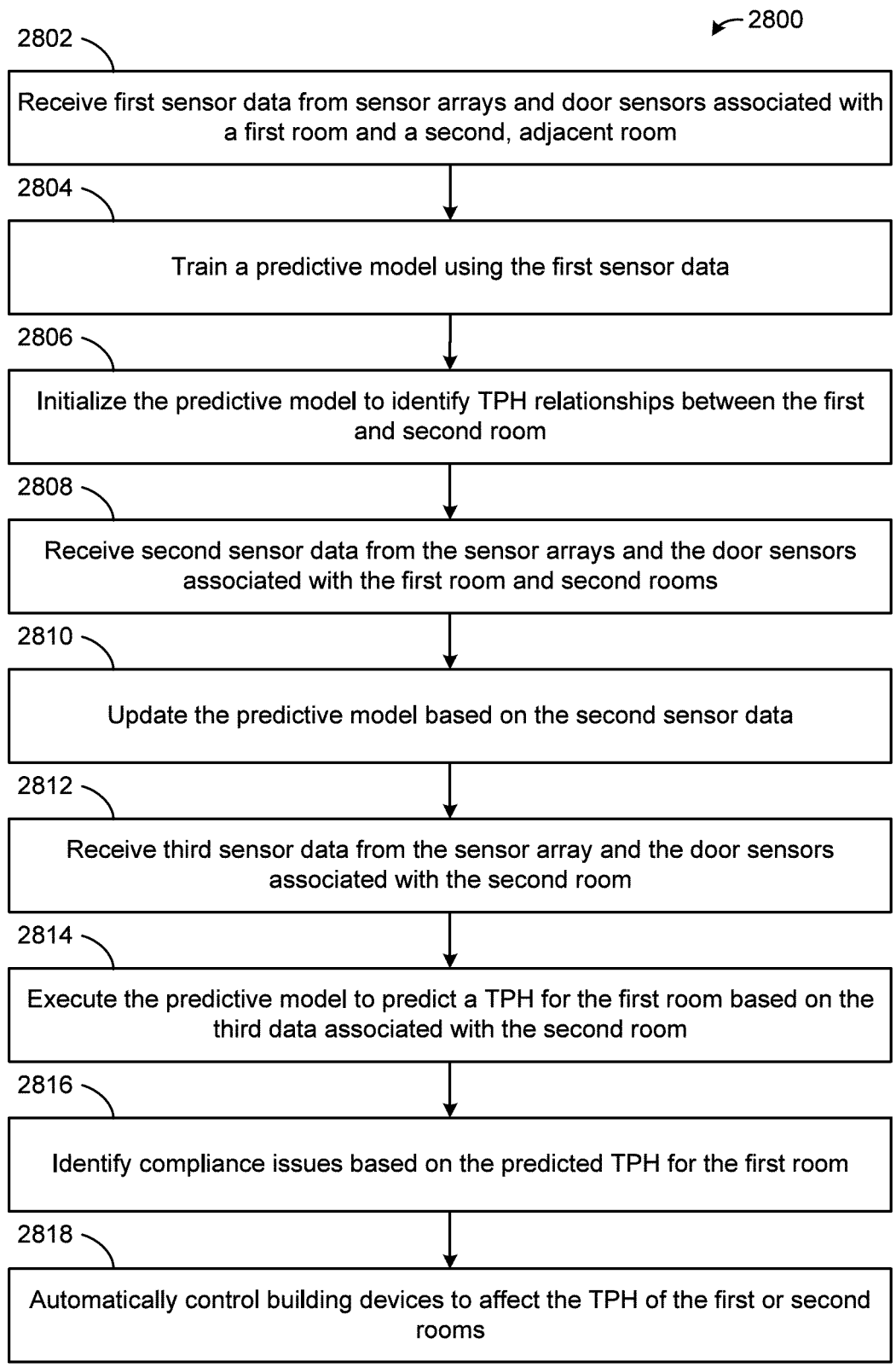
FIG. 27 is a flow diagram of a process for controlling building equipment based on the interactions between adjacent areas of a building, according to some embodiments.

Referring now to FIG. 27, a process 2800 for controlling building equipment based on the interactions between adjacent areas of a building is shown, according to some embodiments. The process 2800 can be implemented by the controller 2600, in some cases. As described above, the climate or environment (e.g., at least TPH) of an area or room within a building may be affected by other, adjacent areas. For example, a very cold room may cause the temperature in an adjacent room to drop (e.g., by removing heat through a wall). Additionally, opening and closing doors to an area can change the TPH within the area. By implementing the process 2800, a controller (e.g., controller 2600), BMS, BAS, or other similar system may predict future TPH values for a target area within a building based on at least door sensor data and the TPH of other, adjacent areas, and may adjust operations of climate control devices (e.g., HVAC equipment) accordingly. It will be appreciated that certain steps of the process 2800 may be optional and, in some embodiments, the process 2800 may be implemented using less than all of the steps.

At step 2802, first sensor data is received from sensor arrays and/or door sensors associated with a first room and a second, adjacent room. It will be appreciated that, while denoted herein as a first and second "room," the first and second room may be any space or area within a building (e.g., a hallway, a common area, etc.). As mentioned above, the second room may be any space that is adjacent to the first room such that the first and second rooms share a wall, floor, ceiling, window, doorway, etc., such as described above with respect to FIG. 26. Accordingly, the first room may be a "target room" for the analysis of process 2800, although it will also be appreciated that the second room could be the target room. The first data generally includes at least TPH for the first room and the second room, measured by a sensor array (e.g., the sensor arrays 2632). The first data also generally includes door sensor data received from an access control system of the building (e.g., the security subsystem 438) that indicates whether one or more doors of associated with the first and/or second rooms are open or closed. In some cases, the door sensor data is optional, and process 2800 may be implemented using only sensor array data corresponding to TPH.

In some embodiments, the first sensor data is received (e.g., by controller 2600) and stored in an internal or external database. In this regard, the first data may be stored and/or retrieved from a database at step 2802. In some embodiments, the first data is stored at step 2802 and is retrieved at subsequent steps. Accordingly, in some embodiments, the first data is historical TPH and/or door sensor data for a plurality of previous time steps. In some cases, the first data is collected over time from a target building or from other buildings that are similar in structure to the target building. In other embodiments, the first data is a generic or simulated data set.

At step 2804, a predictive model is trained using the first sensor data. Training the predictive model prepares the model for future execution, by adjusting weights and/or parameters, or otherwise modifying the model based on a training data set. In some embodiments, the first sensor data is divided into the training set and a test set, where the training set is used to train and tune the model (e.g., the weights and other parameters of the model, the nodes of a neural network, the reinforcement rewards of a reinforcement learning scheme, etc.). As described herein, for example, the predictive model may be trained using TPH and/or door sensor data from multiple, adjacent rooms, in order to improve the predictive model. The test set may be used to validate the training of the model and/or to further fine-tune the model.

As an example, the training data set may indicate a TPH for the first and second rooms at a plurality of time steps. In this regard, the training set may include, for each time step, TPH measurements for the first and second rooms, along with an indication of whether doors of the first and second rooms were open at the time step. The predictive model may be trained to determine how the TPH of the second rooms affect the first room, or vice-versa. Similarly, the predictive model may be trained to determine how the opening or closing of doors in the first and/or second rooms affects the TPH within the other, adjacent spaces.

At step 2806, the predictive model is initialized to identify a TPH relationship between the first room and the second room. In other words, the predictive model, having been trained and validated using the first sensor data, may be executed a first time based on the first sensor data in order to identify how the first and second rooms affect one another. For example, based on the predictive model, it may be determined that when the second room is 3° F. warmer than the first room, the first room can be expected to increase in temperature at a rate of +0.2° F./hour. In another example, if a door to the first room is opened, the pressure of the adjacent second room or an adjacent hallway may increase or decrease proportionally.

At step 2808, second sensor data is received from the sensor arrays and/or the door sensors associated with the first room and the second room. Similar to the first data, the second data generally includes at least TPH for the first room and the second room, measured by a sensor array (e.g., the sensor arrays 2632), and in some cases includes door sensor data received from an access control system of the building (e.g., the security subsystem 438) that indicates whether one or more doors of associated with the first and/or second rooms are open or closed. The second data may be received only after training and initializing the predictive model to identify an "initial" relationship between the first and second rooms.

At step 2810, the predictive model is updated based on the second sensor data. In other words, the predictive model may be regenerated or dynamically modified based on the second data. In doing so, the predictive model may be improved over time by continually adjusting the relationship between the first and second rooms. In some embodiments, updating the predictive model may include changing parameters of the model such as the weights assigned to various algorithms or variables within the model or updating policies within a machine learning scheme. It will be appreciated that steps 2808 and 2810 may, in some cases, be optional (e.g., the predictive model may not be updated prior to implementation), and may also be implemented at any point during the implementation of process 2800. For example, the predictive model may learn the system operating habits and parameters in place without prior programing based on historical data.

At step 2812, third sensor data is received from the sensor array and/or the door sensors associated with the second room. Like the first and second data, the third data generally includes at least TPH and in some cases door sensor data. However, unlike the first and second data, in some embodiments, the third data includes TPH and door sensor data for only the second (i.e., adjacent) room, in cases where the first room is the "target room" for predicting future TPH. In some embodiments, data may also be received for the first room when predicting TPH for the second room. In some embodiments, the third data may also include a schedule for the second room that indicates future (e.g., pre-programmed) TPH values for the second room. For example, the second room may be programmed to change the TPH at a future time interval. As contemplated above, a change to the TPH of the second room, even in the future, may affect the TPH of the first room. Accordingly, the third data may indicate the future TPH values, if known.

At step 2814, the predictive model is executed to predict TPH for the first room based on the third data received at step 2812. As mentioned above, for example, the predictive model may be trained to identify a relationship between the first and second rooms. In other words, the predictive model is executed to predict future TPH values for the first (i.e., target) room based on the third data corresponding to the TPH of the second room and/or the door sensor data. In some embodiments, output of the predictive model is TPH values for one or more time steps of a time horizon. For example, for one or more time steps, the predictive model may indicate a magnitude and direction of a change in TPH values for the first room based on the second room. In a more specific example, the predictive model may indicate that the temperature of the first room is expected to increase at a rate of X° F./minute, or that the humidity of the first room is expected to drop by a specific percentage. In other embodiments, the predictive model may indicate particular TPH values for each of the future time steps.

At step 2816, compliance issues are identified based on the predicted TPH for the first room. More specifically, the predicted future TPH values for the first room may be compared to a compliance standard (e.g., received from a compliance entity such as TJC or CMS). The comparison may indicate whether one or more of the TPH values for the first room are predicted to exceed a threshold as indicated by the compliance standard. For example, the compliance standard may indicate that a particular type of room (e.g., an operation room), corresponding to the type of the first room, should maintain between 40-60% humidity. Accordingly, if the predictive model indicates that the humidity of the first room is expected to exceed either the upper or lower limit of the range at any point over the time horizon, a compliance issue may be predicted.

At step 2818, building devices (e.g., HVAC equipment) are automatically controlled to affect the TPH of the first and/or the second room. The building devices may be controlled to in order to maintain the TPH of the first and/or second room within the compliance standards. In this regard, if one of the TPH values for the first or second rooms is predicted to become non-compliant in the future, the building devices may be controlled to counter the predicted non-compliance. For example, one of the TPH for the first or second room could be increased or decreased to compensate for detected or predicted compliance issues.

As an example, the third data may indicate that the second room (e.g., an operating room) will be in use for a period of time two hours from a current time. When in use, the TPH of the second room may be adjusted according to the preferences of a surgeon, for example. The predictive model may generate a prediction that the TPH of the first room will change accordingly. Based on this prediction, HVAC equipment that serves the first room may be controlled to compensate for the predicted TPH change. For example, specific setpoints may be set for the future time period, or the equipment may be operated to adjust the TPH of the first room in advance, such as to prevent drastic TPH fluctuations when the second room is in use.

Figure 28:
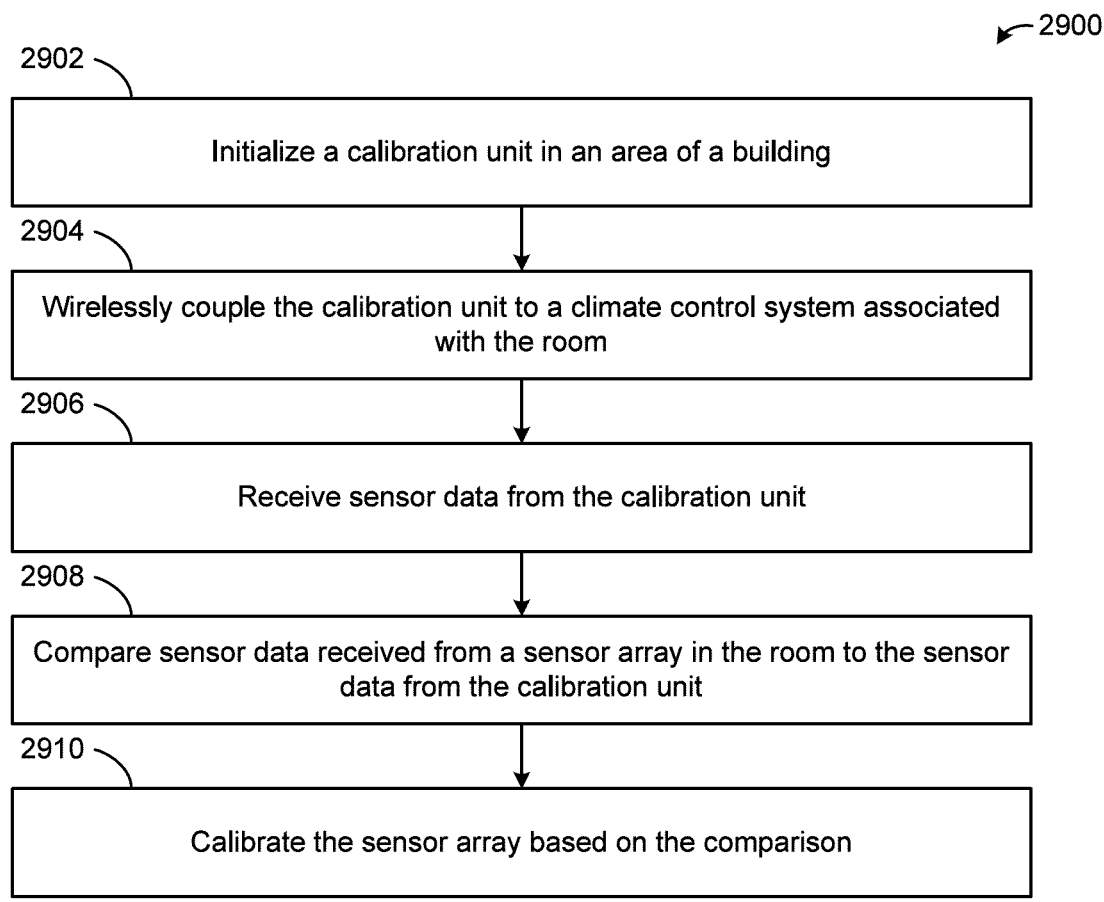
FIGS. 28 and 29 are flow diagrams of a processes for calibrating a sensor array, according to some embodiments.
Figure 29:
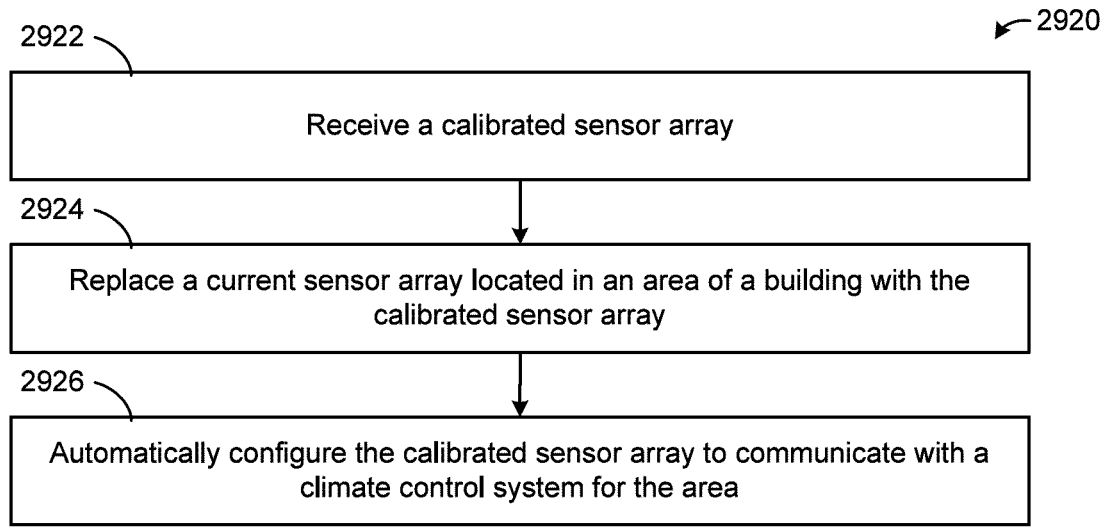

Referring now to FIGS. 28 and 29, various processes for calibrating a sensor array are shown, according to some embodiments. More specifically, FIGS. 28 and 29 illustrate two different processes for calibrating a sensor array for use with a controller, such as controller 2600 described above. Both of the processes described below provide intuitive and easy-to-implement calibration procedures that can be initiated by a wide range of users at regular intervals. These processes are easy to follow and do not require significant experience by the technician or downtime for the system. Certain steps of either of these processes can be implemented by the controller 2600, in some cases, although some steps of either process may be implemented manually (e.g., by a user). It will be appreciated that certain steps of the process described below may be optional and, in some embodiments, the processes may be implemented using less than all of the steps.

As described briefly above, sensors within a room or space (e.g., the sensor arrays 2632) may be regularly calibrated to ensure accurate and precise measurements. TPH measurements, in particular, may need to be accurate to within a threshold set by a compliance governing body, for example. Accordingly, the sensors or sensor arrays may be calibrated to ensure accuracy at regular intervals (e.g., every six months, every year, etc.). In some embodiments, a particular calibration schedule may be set by a manufacturer of a sensor or sensor array. In other embodiments, the compliance governing body (e.g., TJC, CMS) may determine the calibration schedule.

Turning first to FIG. 28, a process 2900 for calibrating a sensor array utilizing a calibration unit is shown. At step 2902, the calibration unit is placed in an area of a building and initialized. The calibration unit (e.g., calibration unit 2730) is generally a sensor array, similar to one of the sensor arrays 2632 or 2710-2716, configured to measure TPH within an area. In this regard, the calibration unit can include at least a temperature, a pressure, and a humidity sensor. The calibration unit may be received directly from a manufacturer or a calibration specialist having been previously calibrated itself. Accordingly, the calibration unit is known to provide highly accurate TPH measurements prior to use. The calibration unit may be placed in a target room or array by a user. Initializing the calibration unit may be as simple as turning the calibration unit on or connecting the calibration unit to a power source.

At step 2904, the calibration unit is communicably coupled to a climate control system associated with the room. In some embodiments, the calibration unit is wirelessly coupled to the climate control system, and in other embodiments the calibration is coupled via a wired connection. The climate control system may be a controller, such as the controller 2600, or an entire BMS such as the BMS 400 or the BMS 500. In any case the climate control system is generally configured to affect the TPH within the room containing the calibration unit. Coupling the calibration unit to the climate control system allows the climate control system to receive sensor data relating to TPH measurements for the room.

At step 2906, sensor data is transmitted to the climate control system by the calibration unit. As mentioned, the sensor data can include at least TPH measurements for the room. The climate control system may receive the sensor data and, at step 2908, can compare the received sensor data to additional sensor data received from a sensor array within the room. In this regard, at step 2906, the climate control system may also receive or retrieve data from a sensor array positioned within the same room as the calibration unit. The sensor data from the sensor array and the sensor data from the calibration unit may be compared to determine an offset between the two sets of data. For example, the comparison may indicate that the sensor array data is a percentage higher or lower that the calibration unit data, or may otherwise indicate how close the sensor array data matches the calibration unit.

At step 2910, the sensor array associated with the room is calibrated based on the comparison. In some embodiments, calibrating the sensor array may include adjusting one or more parameters of a sensor or sensors within the sensor array. In some embodiments, calibrating the sensor array may include weighting or adjusting the sensor array data after it is received by the climate control system. For example, if the sensor data is determined to be 5% less than the data received from the calibration unit, then the sensor data values may be increased by 5% to compensate.

In other embodiments, the sensor array is flagged for repair or replacement. For example, if the sensor array data and calibration unit data are determined to be off by more than a threshold amount, the sensor array may be deemed faulty. Accordingly, the climate control system (e.g., controller 2600) may generate an alert (i.e., a notification) that indicates the faulty sensor array and requests repair or replacement. The notification may be transmitted to a user device associated with a system manager, a maintenance technician, etc. In some cases, maintenance may also be automatically scheduled if a faulty sensor array is detected. In some embodiments, information regarding the calibration of the sensor array and/or an indication of a faulty sensor array may also be transmitted to a user device (e.g., user device 2636), for display via a user interface of the user device.

FIG. 29 shows a process 2920 for calibrating a sensor array by replacing a sensor array currently installed in an area with a new, calibrated sensor array. Process 2920 may be an alternative calibration method implemented in place of, or in addition to, process 2900. At step 2922, a calibrated sensor array is received. Like the calibration unit described above with respect to process 2900, the calibrated sensor array is generally similar to one of the sensor arrays 2632 or 2710-2716, and is configured to measure TPH within an area. In this regard, the calibrated sensor array can include at least a temperature, a pressure, and a humidity sensor. The calibrated sensor array may be received directly from a manufacturer or a calibration specialist having been previously calibrated prior to shipping. Accordingly, the calibrated sensor array is known to provide highly accurate TPH measurements prior to use.

At step 2924, a sensor array currently installed in an area of a building (e.g., a room) is replaced with the calibrated sensor array. In other words, the currently installed sensor array may be removed and the calibrated sensor array may be installed in its place. This may include dismounting the original sensor array from within the area or room it is located in, and disconnecting the original sensor array from a climate control system (e.g., the controller 2600). Disconnecting the original sensor array may include wirelessly disconnecting the unit or physically unplugging the unit from the system. Subsequently, the calibrated sensor array may be mounted and connected to the system, such as by wirelessly connecting the calibrated sensor array or by plugging the calibrated sensor array into a hardwired connection.

At step 2926, a climate control system for the area is automatically coupled (i.e., configured) to the calibrated sensor array and configured to receive data from the calibrated sensor array. In other words, the calibrated sensor array is automatically configured to interact with the climate control system, such as by sending and receiving data. In this regard, automatically coupling or configuring the calibrated sensor array can include installing updated drivers for the sensors of the calibrated sensor array, adjusting system parameter, etc. More generally, the calibrated sensor array is automatically configured to exchange data with the system in the same manner as the previously installed (e.g., original) sensor array. In this regard, process 2920 provides a simple plug-and-play method of calibrating the climate control system.

Reporting

Figure 30:
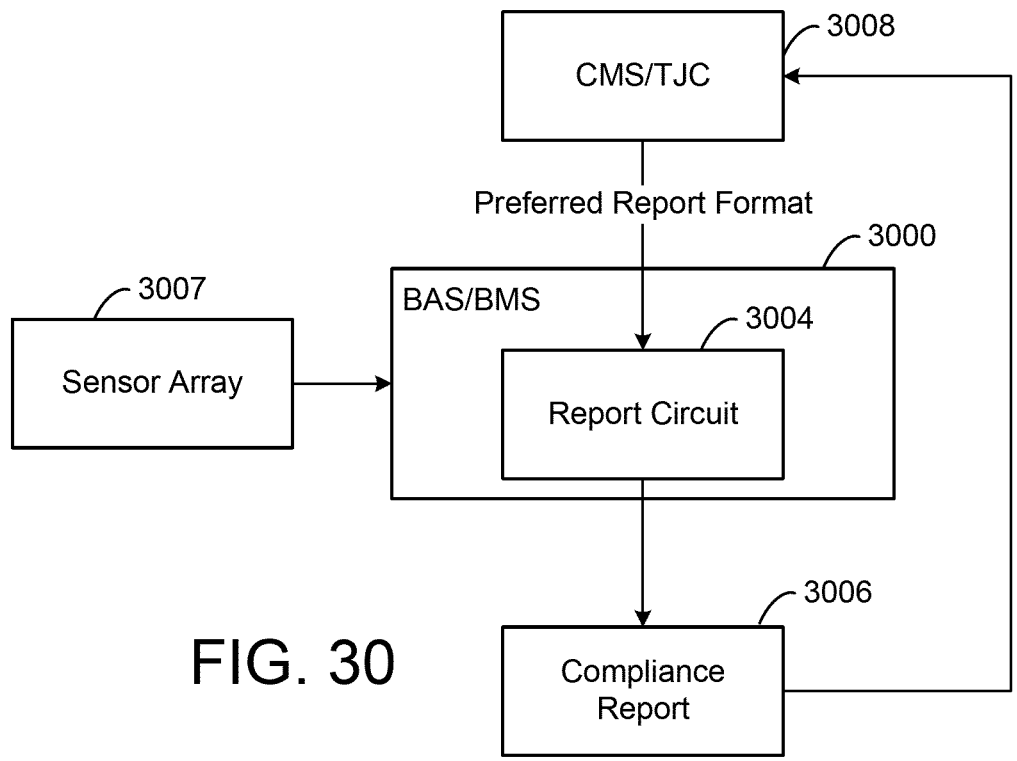
FIG. 30 is a schematic representation of a report generation system, according to some embodiments.

As shown in FIG. 30, a controller in the form of a BAS and/or BMS 3000 (e.g., the BMS 400 or the BMS 500 discussed above, or a standalone controller) can include a report circuit 3004 structured to generate reports 3006 summarizing TPH compliance based on information received from a sensor array 3007 (e.g., sensors as discussed herein, including temperature sensors, pressure sensors, humidity sensors, particulate concentrations sensors, door open sensors, air quality sensors, etc.). In some embodiments, the report circuit 3004 receives a preferred report format from a third party system 3008 (e.g., CMS or TJC) including an indication of information required to show compliance and including a preferred format for the arrangement of the information. The report circuit 3004 is structured to receive the format, and fill in fields of the report 3006 automatically to satisfy the compliance reporting requirements of the third party system 3008.

In some embodiments, the report circuit 3004 generates a pdf formatted report 3006 for distribution to an inspector. In some embodiments, the report circuit 3004 is structured to allow the third party system 3008 to query information directly from the controller 3000. The report 3006 generated by the report circuit 3004 can be separated into different sections detailing rooms by type, use, or other organizations categories, as desired by the third party system 3008. In some embodiments, the report 3006 can include compliance problems identified and the corrective action taken to maintain TPH within compliance. The report 3006 can include predictive information and preventative maintenance performed to maintain the TPH in compliance.

User Interface

Figure 31:
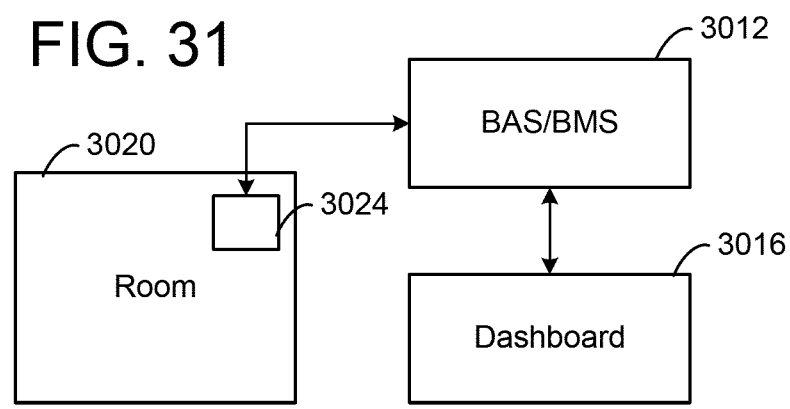
FIG. 31 is a schematic representation of a dashboard system, according to some embodiments.

As shown in FIG. 31, controller in the form of a BAS and/or BMS 3012 (e.g., the BMS 400 or the BMS 500 discussed above, or a standalone controller) can communicate with a dashboard 3016 that displays real time TPH information and other information relevant to TPH compliance collected from a sensor array associated with a room 3020. In some embodiments, the dashboard 3016 includes a display panel 3024 mounted in the room 3020. The display panel 3024 can provide digital readouts of TPH within the room 3020. In some embodiments, the display panel 3024 includes a sensor array including physical sensors (e.g., a ball-in-the-wall pressure sensor, etc.) that hospital rooms 3020 have traditionally used for quick confirmation of the readouts displayed on the dashboard 3016. The display panel 3024 may include digital displays of temperature, pressure, and humidity shown as speedometer type readouts, bar displays, or other display types. In some embodiments, the display panel 3024 shows color coded elements indicating TPH compliance status. For example, a background may change to yellow when TPH is approaching a compliance standard, and red when TPH is out of compliance.

In some embodiments, the dashboard 3016 includes a computer monitor at a nursing station or another central location accessible near the monitored rooms. The dashboard 3016 may provide audible alerts or instructions regarding TPH compliance when a TPH compliance problem is sensed or predicted by the controller 3012. The dashboard 3016 may include a user interface that allows a user to input TPH demands (e.g., a change of temperature) within the allowable range for TPH compliance.

In some embodiments, the dashboard 3016 provides the user with available options for temperature, pressure, and humidity so that compliance can be maintained. Additionally, the dashboard 3016 can include a display or indication of energy consumption and/or cost savings attributed to TPH selections. For example, a warmer room temperature in the summer may lower energy consumption thereby reducing costs associated with TPH and also meeting compliance standards.

As shown in FIG. 32, a method 3028 can be used in the event of a problem with the HVAC system or any other problem affecting TPH within the room 3020. The dashboard 3016 communicates with the controller 3012 to communicate information to the user. In some embodiments, an alert is displayed on the dashboard 3016 and/or an audible alert is generated at step 3032. The alert can provide the user with information regarding the nature of the problem and instructions for response. For example, in some situations, it may be necessary to move a patient to a different room or area, close dampers manually, etc.

After recognition of a problem at step 3036, the controller 3012 then determines a problem, or receives manual input regarding a problem and generates a work order at step 3040. The work order describes the nature of the problem and what corrective action needs to be taken. Once the work order is created, the work order is assigned to an individual at step 3044 who is to take the corrective action. Once the work order is completed at step 3048, the individual marks the work order complete and the action is closed. From the time of the recognition of the compliance problem at step 3036, to the closing of the work order at step 3048, the controller 3012 records criticality information regarding the TPH problem at step 3052. In some embodiments, the criticality information includes a time the problem was detected, the time TPH returned to compliance, values of TPH during the event, and a log of actions taken.

In some embodiments, each user of the BAS and/or BMS system 3012 (technicians, maintenance crew, facilities director, nurses, operating room administrator, chief compliance officer, etc.) have a dashboard profile. Dashboard profiles can be created with individual categories such that relevant TPH information is shared within the different categories. For example, a nurse may have a dashboard 3016 that displays current TPH for rooms under the nurse's care. A facilities director's dashboard 3016 may include overall HVAC system health indicators and an alerts panel for easily accessing and diagnosing TPH compliance issues or projected TPH compliance issues. The facility director's and a technician's dashboards 3016 may include open and assigned work orders and allow for communication between individuals regarding open work orders to facilitate fast and efficient fulfillment of work orders. Dashboards 3016 can be customizable by individual and/or by category of user.

In some embodiments, the dashboard 3016 includes useful information regarding TPH management within the room 3020. For example, the dashboard 3016 may indicate potential uses for the room 3020 based on HVAC capabilities of the space. The dashboard 3016, may include a help function capable of providing efficient feedback regarding TPH questions (e.g., what is the interaction between temperature and humidity in this room as configured, what temperatures are available while maintaining compliance, etc.).

In some embodiments, the dashboard 3016 provides instructions for completion of the work order. The dashboard 3016 can display step-by-step instructions for repair of an HVAC component or other system component that needs to be fixed, recalibrated or replaced. In some embodiments, the dashboard 3016 provides audio or video instructions for completion of the work order complete with correct tools and parts to address the issues. The inclusion of instructions can improve the speed of completion of work orders and allow less experience technicians to successfully complete work orders.

As shown in FIG. 33, the dashboard 3016 can be hosted on (e.g., as an application) or include a mobile device 3056 (e.g., a smartphone) structured to interact with the controller 3012. The mobile device 3056 can include an executable program stored on a non-transitory storage medium and capable of interacting via a wireless network 3060 with the controller 3012 to display information and provide feedback from the user to the controller 3012.

In some embodiments, the dashboard 3016 can include a parts inventory 3064 accessible by a facilities director and a technician. The parts inventory 3064 can interface with the work order system to provide a listing of relevant parts in inventory and their location within the work order. The parts inventory 3064 can save valuable time by auto-generating a list of required parts and tools to address the work order.

In some embodiments, the dashboard 3016 includes head-up-display (HUD) interface 3068 that can be used hands free to interact with the controller 3012. The HUD interface 3068 may be especially useful for a technician fulfilling a work order. For example, the HUD interface 3068 may allow for augmented reality displays to aid in the completion of the work order. Instructional diagrams, videos, or audio recordings could be displayed via the HUD interface 3068 while leaving the technicians hands free to complete work.

In some embodiments, the dashboard 3016 includes a help function 3072 as described briefly above and structured to convey TPH information and current system status in addition to providing access to other help functions related the TPH (e.g., TPH of a hallway or adjacent rooms). The help function 3072 may also include additional details for the facility director or technician to access in depth details of a system or component relevant to a work order.

In some embodiments, the dashboard 3016 includes a root cause determination system 3076 that is structured to receive input from a large number of rooms and areas service by the HVAC system. The root cause determination system 3076 analyzes data from different sources to identify a root cause of a TPH problem. For example, by comparing TPH readings in adjacent rooms, and remote rooms, service by the same HVAC system, a correlation between problematic readings may be found and the controller 3012 may be able to identify and common component that is causing the problem. The root cause determination system 3076 is capable of analyzing available information to determine a root cause and then generating a work order to address the root cause. In some embodiment, the root cause determination system 3076 utilizes artificial intelligence or machine learning to better analyze and understand the HVAC system and efficiently identify the root cause.

In some embodiments, the dashboard 3016 includes a compliance standards system 3080 that directly links with a third party system to retrieve TPH compliance standards. For example, the dashboard 3016 can display the relevant TPH standards set by CMS for the current use of the relevant room 3020.

In some embodiments, the dashboard 3016 includes an audio interface 3084 capable of communicating with the user audibly.

In some embodiments, the dashboard 3016 includes a holographic interface 3088 capable of displaying a hologram that the user can interact with. The holographic interface 3088 can be used for augmented reality when diagnosing a problem and/or completing a work order.

The mobile device 3056 connects and communicates with the controller via a wireless network 3060. This allows the mobile device 3056 to stay with the individual so that the entire relevant dashboard 3016 is available to the user at any time. For example, a technician may complete a work order, mark the work order as complete, and a notification is sent to the facilities director indicating that the work order has been completed. Similarly, when a new work order is generated, the facilities director may assign the work order to a specific individual. The individuals' dashboard 3016 could then alert them that they have a new work order demanding attention.

Configurations of Exemplary Embodiments

The construction and arrangement of the systems and methods as shown in the exemplary embodiments are illustrative only. Although only a few embodiments have been described in detail in this disclosure, many modifications are possible (e.g., variations in sizes, dimensions, structures, shapes and proportions of the elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the connection steps, processing steps, comparison steps and decision steps.

What is claimed is:

1. A critical environment monitoring system comprising:
a sensor array structured to provide sensor data indicative of temperature, pressure, and humidity in an interior space, wherein the interior space is a first room of a building; and
one or more processing circuits comprising one or more memory devices coupled to one or more processors, the one or more memory devices storing instructions thereon that, when executed by the one or more processors, cause the one or more processors to:
obtain, based on sensor data from the sensor array, trend data indicative of the temperature, pressure, and humidity of the interior space over a period of time;
generate, based on the trend data, a prediction of future trend data for the interior space using a predictive model trained on additional sensor data from a second room of the building;
perform a comparison of the prediction to a compliance standard defined by a standard setting body;
provide, based on the sensor data from the sensor array, a graphical user interface displaying the comparison of the prediction to the compliance standard; and
generate an alert in response to one of:
a predicted temperature value of the future trend data being outside a compliance standard temperature,
a predicted pressure value of the future trend data being outside a compliance standard pressure, or
a predicted humidity value of the future trend data being outside a compliance standard humidity;
automatically receive criticality information including a log of actions taken, a time, a location, and a result of a diagnostic test;
record the criticality information related to the alert; and
generate a compliance report including the alert and the criticality information related to the alert, wherein the compliance report comprises individual room-based compliance information.

2. The critical environment monitoring system of claim 1, wherein the graphical user interface further displays a history of the compliance standard temperature, a temperature value of the trend data, the compliance standard pressure, a pressure value of the trend data, the compliance standard humidity, and a humidity value of the trend data over time.

3. The critical environment monitoring system of claim 1, wherein the instructions, when executed by the one or more processors, further cause the one or more processors to:
receive a compliance report format from the standard setting body;
automatically identify the alert and the criticality information; and
automatically generate a compliance report document using the compliance report format, and including the alert and the criticality information.

4. The critical environment monitoring system of claim 1, wherein the prediction of future trend data is further based on adjacent area sensor array data from an adjacent area adjacent to the interior space.

5. The critical environment monitoring system of claim 1, further comprising a wall mounted display panel, wherein the graphical user interface is presented using the wall mounted display panel.

6. The critical environment monitoring system of claim 1, wherein the sensor array includes an occupancy sensor and the alert is generated at least in part based on information received from the occupancy sensor.

7. The critical environment monitoring system of claim 1, wherein the instructions, when executed by the one or more processors, further cause the one or more processors to:
generate a work order based on the alert and the criticality information.

8. The critical environment monitoring system of claim 1, wherein the sensor array includes a non-TPH (temperature, pressure, humidity) sensor providing non-TPH information, and
wherein the instructions, when executed by the one or more processors, further cause the one or more processors to generate the alert further based on the non-TPH information.

9. The critical environment monitoring system of claim 1, wherein the criticality information includes non-TPH (temperature, pressure, humidity) information received from a non-TPH sensor.

10. The critical environment monitoring system of claim 1, wherein automatically recording criticality information includes automatically receiving the criticality information from a building management system.

11. A critical environment monitoring system comprising:
a sensor array structured to provide sensor data indicative of temperature, pressure, and humidity in an interior space, wherein the interior space is a first room of a building; and
one or more processing circuits comprising one or more memory devices coupled to one or more processors, the one or more memory devices configured to store instructions thereon that, when executed by the one or more processors, cause the one or more processors to:
obtain, based on sensor data from the sensor array, trend data indicative of the temperature, pressure, and humidity of the interior space over a period of time,
generate, based on the trend data, a prediction of future trend data for the interior space using a predictive model trained on additional sensor data from a second room of the building;

generate an alert in response to at least one of:
   a predicted temperature value of the future trend data being outside a compliance standard temperature,
   a predicted pressure value of the future trend data being outside a compliance standard pressure, or
   a predicted humidity value of the future trend data being outside a compliance standard humidity;

automatically receive criticality information including a log of actions taken, a time, a location, and a result of a diagnostic test; and generate a compliance report document including the alert and the criticality information related to the alert, wherein the compliance report document comprises individual room-based compliance information.

12. The critical environment monitoring system of claim 11, wherein the instructions further cause the one or more processors to generate a graphical user interface displaying a history of the compliance standard temperature, temperature values of the trend data, the compliance standard pressure, pressure values of the trend data, the compliance standard humidity, and humidity values of the trend data over time.

13. The critical environment monitoring system of claim 11, wherein the critical environment monitoring system is configured to:
   receive a compliance report format from a standard setting body;
   automatically identify the alert and the criticality information; and
   automatically generate the compliance report document using the compliance report format, and including the alert and the criticality information.

14. The critical environment monitoring system of claim 11, wherein the prediction of future trend data is based on additional sensor array data from an adjacent area of the interior space.

15. The critical environment monitoring system of claim 11, further comprising a wall mounted display panel or a mobile device, wherein the alert is presented using the wall mounted display panel or the mobile device.

16. The critical environment monitoring system of claim 11, wherein the sensor array includes an occupancy sensor and the alert is generated at least in part based on information received from the occupancy sensor.

17. A non-transitory computer-readable storage media having computer-executable instructions stored thereon that, when executed by one or more processors, cause the one or more processors to perform operations comprising:
   obtaining, based on sensor data from a sensor array, trend data indicative of the temperature, pressure, and humidity of an interior space over a period of time, wherein the interior space is a first room of a building, and
   generating, based on the trend data, a prediction of future trend data for the interior space using a predictive model trained on additional sensor data from a second room of the building;
   generating an alert in response to one of:
      a predicted temperature value of the future trend data being outside a compliance standard temperature,
      a predicted pressure value of the future trend data being outside a compliance standard pressure, or
      a predicted humidity value of the future trend data being outside a compliance standard humidity,
   automatically recording criticality information related to the alert, the criticality information including a log of actions taken, a time, a location, and a result of a diagnostic test; and
   generating a compliance report document including the alert and criticality information related to the alert, wherein the compliance report document comprises individual room-based compliance information.

18. The non-transitory computer-readable storage media of claim 17, wherein the sensor data from the sensor array includes occupancy sensor data and the alert is generated at least in part based on the occupancy sensor data.

* * * * *